(12) United States Patent
Kishine et al.

(10) Patent No.: US 11,627,263 B2
(45) Date of Patent: Apr. 11, 2023

(54) IMAGING APPARATUS

(71) Applicant: FUJIFILM Corporation, Tokyo (JP)

(72) Inventors: Yasunobu Kishine, Saitama (JP); Shuji Ono, Saitama (JP); Kazuyoshi Okada, Saitama (JP)

(73) Assignee: FUJIFILM Corporation, Tokyo (JP)

(*) Notice: Subject to any disclaimer, the term of this patent is extended or adjusted under 35 U.S.C. 154(b) by 4 days.

(21) Appl. No.: 17/528,171

(22) Filed: Nov. 16, 2021

(65) Prior Publication Data
US 2022/0078359 A1 Mar. 10, 2022

Related U.S. Application Data

(63) Continuation of application No. PCT/JP2020/021935, filed on Jun. 3, 2020.

(30) Foreign Application Priority Data

Jun. 11, 2019 (JP) .............................. JP2019-108829

(51) Int. Cl.
H04N 5/33 (2023.01)
H04N 9/04 (2006.01)
G02B 5/30 (2006.01)

(52) U.S. Cl.
CPC ........... *H04N 5/332* (2013.01); *G02B 5/3025* (2013.01); *H04N 9/04559* (2018.08)

(58) Field of Classification Search
CPC ............... H04N 5/332; H04N 9/04559; H04N 9/04521; H04N 5/225; G02B 5/3025; G02B 5/201; G03B 11/00
See application file for complete search history.

(56) References Cited

U.S. PATENT DOCUMENTS 9,118,796 B2 8/2015 Hiramoto et al.
2009/0244355 A1 10/2009 Horie
(Continued)

FOREIGN PATENT DOCUMENTS

JP 2009258618 11/2009
JP 2012247645 12/2012
(Continued)

OTHER PUBLICATIONS

"International Search Report (Form PCT/ISA/210) of PCT/JP2020/021935," dated Jul. 28, 2020, with English translation thereof, pp. 1-5.
(Continued)

*Primary Examiner* — Timothy J Henn
(74) *Attorney, Agent, or Firm* — JCIPRNET

(57) ABSTRACT

Provided is an imaging apparatus that captures a multispectral image of four bands or more. An imaging apparatus (1) includes an imaging optical system (10), an image sensor (100), and a signal processing unit (200). The imaging optical system (10) includes a bandpass filter unit (16) of which at least one of aperture regions transmits light beams of a plurality of wavelength ranges, and a polarization filter unit (18) that polarizes the light beams transmitted through the bandpass filter unit (16) in a plurality of directions, in a vicinity of a pupil thereof. The image sensor (100) receives light beams transmitted through a plurality of types of spectral filter elements and a plurality of types of polarization filter elements. The signal processing unit (200) processes signals output from the image sensor (100) to generate a plurality of image signals. In the imaging apparatus (1), the number of transmission wavelength ranges of at least one of the aperture regions of the bandpass filter unit (16) is equal to or less than the number of transmission wavelength ranges of the spectral filter element.

10 Claims, 36 Drawing Sheets

(56) References Cited

U.S. PATENT DOCUMENTS

| | | | |
|---|---|---|---|
| 2010/0085537 A1* | 4/2010 | Ramella-Roman | A61B 5/14555 359/619 |
| 2013/0083172 A1 | 4/2013 | Baba | |
| 2014/0192255 A1* | 7/2014 | Shroff | G01N 21/27 348/362 |
| 2016/0065938 A1* | 3/2016 | Kazemzadeh | H04N 5/332 348/46 |
| 2020/0241262 A1* | 7/2020 | Bodkin | H04N 5/332 |
| 2022/0272234 A1* | 8/2022 | Mordechai | G01S 17/931 |

FOREIGN PATENT DOCUMENTS

| | | |
|---|---|---|
| JP | 2013077935 | 4/2013 |
| WO | 2014020791 | 2/2014 |

OTHER PUBLICATIONS

"Written Opinion of the International Searching Authority (Form PCT/ISA/237)" of PCT/JP2020/021935, dated Jul. 28, 2020, with English translation thereof, pp. 1-6.

* cited by examiner

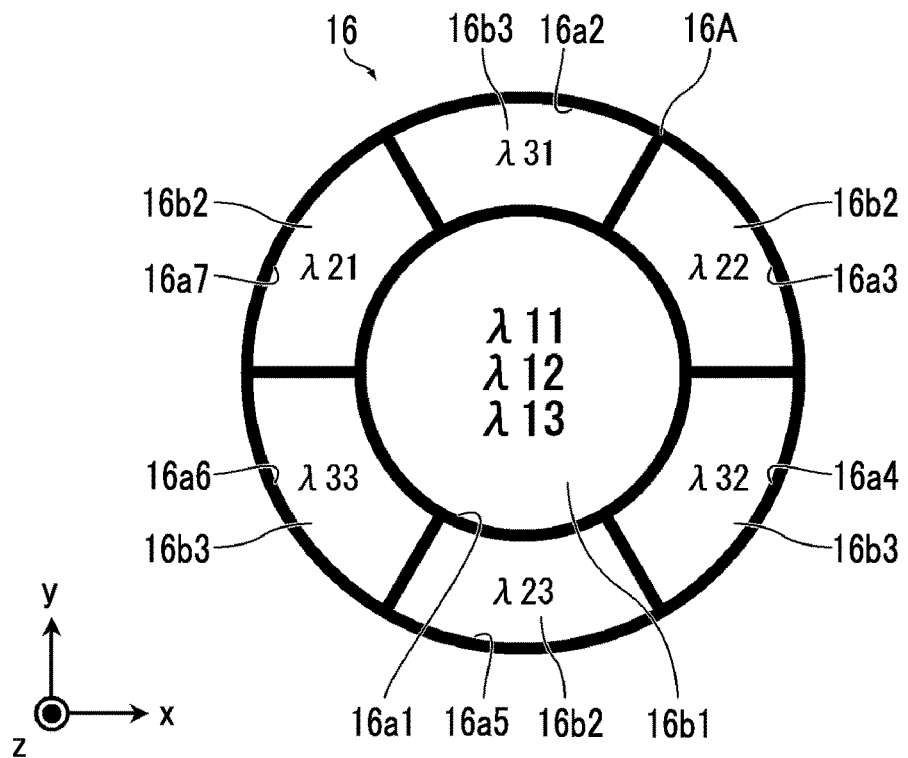
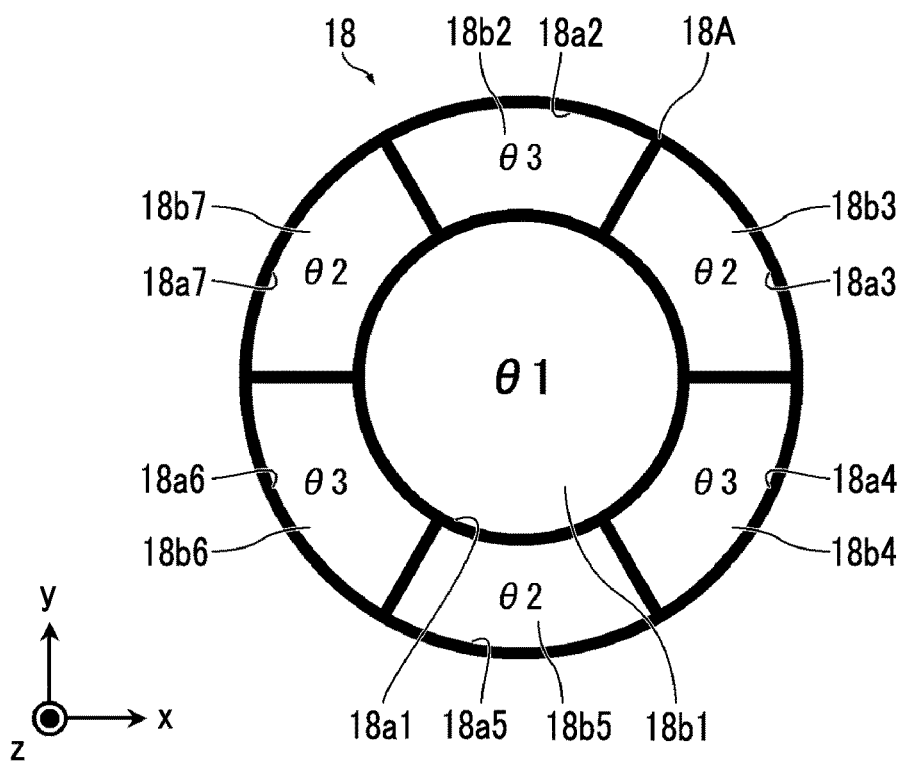

IMAGING APPARATUS

CROSS-REFERENCE TO RELATED APPLICATIONS

The present application is a Continuation of PCT International Application No. PCT/JP2020/021935 filed on Jun. 3, 2020 claiming priority under 35 U.S.C. § 119(a) to Japanese Patent Application No. 2019-108829 filed on Jun. 11, 2019. Each of the above applications is hereby expressly incorporated by reference, in its entirety, into the present application.

BACKGROUND OF THE INVENTION

1. Field of the Invention

The present invention relates to an imaging apparatus.

2. Description of the Related Art

WO2014/020791A discloses the technology of using a polarization color filter plate having three light transmission regions having different polarization characteristics and color characteristics (wavelength selectivity) and an imaging element which comprises three polarization filters having different polarization characteristics and capturing an image of three wavelength ranges (so-called multispectral image of three bands).

SUMMARY OF THE INVENTION

One embodiment according to the technology of the present disclosure provides an imaging apparatus that captures a multispectral image of four bands or more.

(1) An imaging apparatus comprising an imaging optical system including a first optical element having a plurality of aperture regions of which at least one transmits light beams of a plurality of types of wavelength ranges, and a second optical element that polarizes the light beams transmitted through the first optical element in a plurality of directions, in a vicinity of a pupil of the imaging optical system, an image sensor that receives the light beams transmitted through the imaging optical system, the image sensor receiving light beams transmitted through a plurality of types of third optical elements having different transmission wavelength ranges and a plurality of types of fourth optical elements having different transmission polarization directions, and a signal processing unit that processes signals output from the image sensor to generate a plurality of image signals, in which the number of transmission wavelength ranges of at least one of the aperture regions of the first optical element is equal to or less than the number of transmission wavelength ranges of the third optical element.

(2) The imaging apparatus according to (1) above, in which all of the aperture regions of the first optical element transmits light beams of the plurality of types of wavelength ranges.

(3) The imaging apparatus according to (1) above, in which at least one of the aperture regions of the first optical element transmits a light beam of one type of a wavelength range.

(4) The imaging apparatus according to any one of (1) to (3) above, in which the second optical element allows a part of the light beams transmitted through the first optical element to pass as an unpolarized light beam.

(5) The imaging apparatus according to (1) or (2) above, in which the number of aperture regions provided in the first optical element is equal to or less than the number of transmission polarization directions of the fourth optical element, and all of the aperture regions have the same number of transmission wavelength ranges as the number of transmission wavelength ranges of the third optical element.

(6) The imaging apparatus according to any one of (1) to (4) above, in which at least one of the aperture regions of the first optical element has a transmission wavelength range that partially overlaps with a plurality of the wavelength ranges of the third optical element.

(7) The imaging apparatus according to any one of (1) to (6) above, in which in a case in which the number of transmission wavelength ranges of the imaging optical system is defined as k, the number of transmission wavelength ranges of the third optical element is defined as m, and the number of transmission polarization directions of the fourth optical element is defined as n, the imaging optical system and the image sensor satisfy a relationship of $k \leq m \times n$.

(8) The imaging apparatus according to any one of (1) to (7) above, in which at least one set of the aperture regions of the first optical element transmits light beams of the same wavelength ranges.

(9) The imaging apparatus according to any one of (1) to (8) above, in which at least one of the aperture regions of the first optical element is disposed on an optical axis.

(10) The imaging apparatus according to any one of (1) to (9) above, in which the signal processing unit performs interference removal processing to generate the plurality of image signals.

BRIEF DESCRIPTION OF THE DRAWINGS

FIG. 54 is a front view showing an example of the bandpass filter unit.

FIG. 55 is a front view showing an example of the polarization filter unit.

DESCRIPTION OF THE PREFERRED EMBODIMENTS

Hereinafter, preferred embodiments of the present invention will be described in detail with reference to the accompanying drawings.

First Embodiment

[Configuration of Imaging Apparatus]

Figure 1:
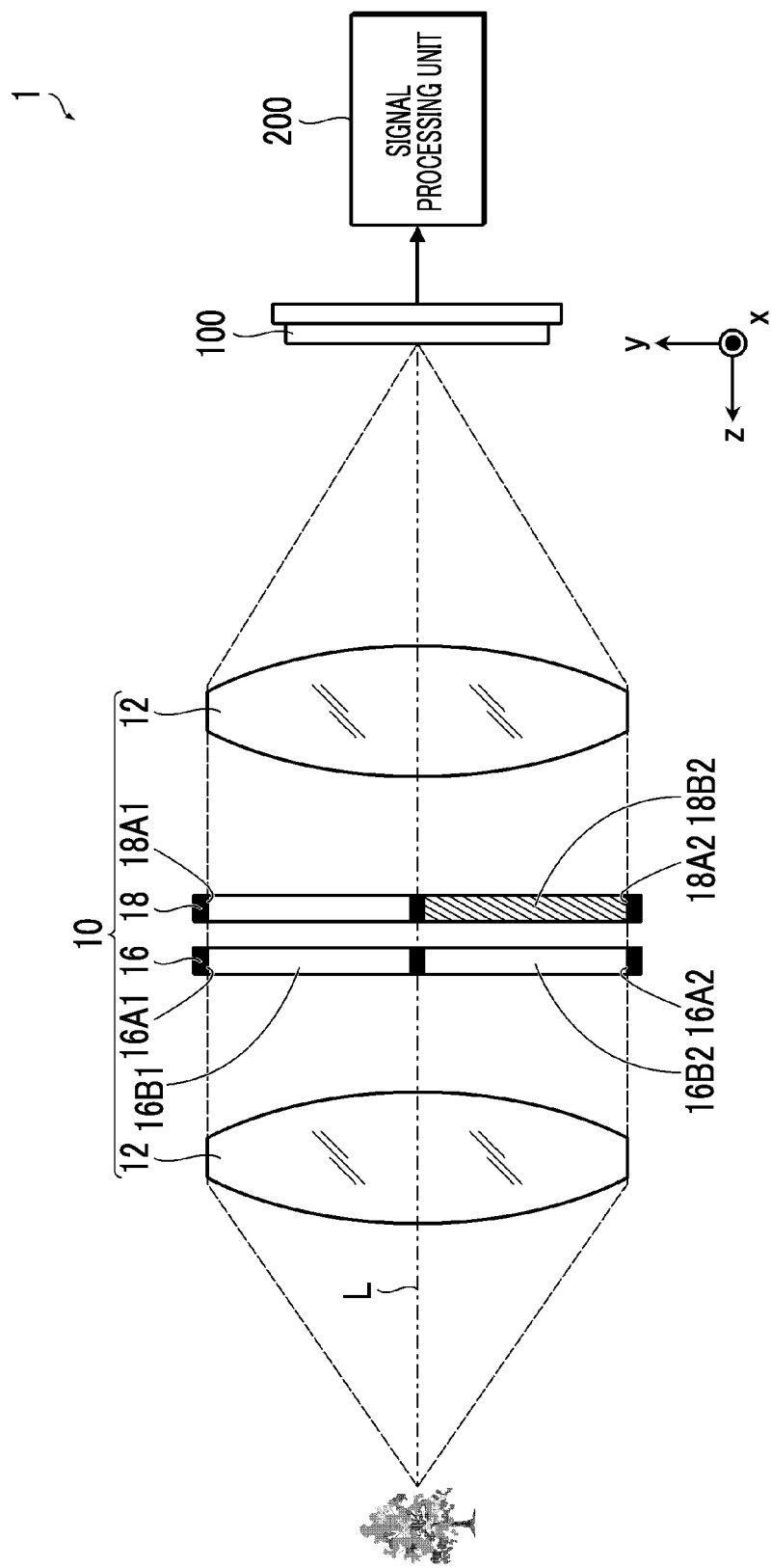
FIG. 1 is a diagram showing a schematic configuration of an imaging apparatus according to a first embodiment of the present invention.

FIG. 1 is a diagram showing a schematic configuration of an imaging apparatus according to a first embodiment of the present invention.

The imaging apparatus according to the present embodiment is an imaging apparatus that captures a multispectral image of four bands. The imaging apparatus according to the present embodiment mainly comprises an imaging optical system 10, an image sensor 100, and a signal processing unit 200.

[Imaging Optical System]

The imaging optical system 10 is composed of a combination of a plurality of lenses 12. The imaging optical system 10 includes a bandpass filter unit 16 and a polarization filter unit 18 in a vicinity of a pupil thereof. In addition, the imaging optical system 10 includes a focus adjustment mechanism (not shown). The focus adjustment mechanism adjusts a focus by, for example, moving the entire imaging optical system 10 back and forth along an optical axis L.

Figure 2:
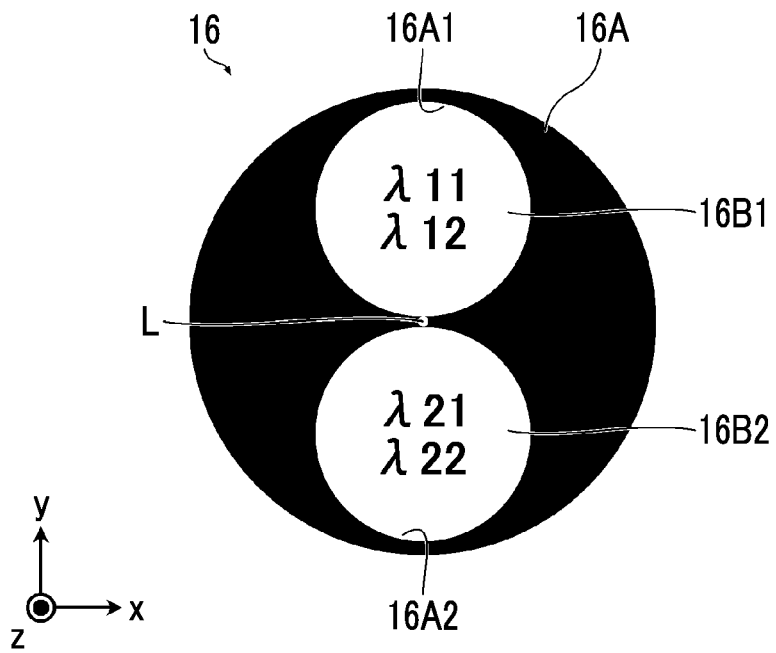
FIG. 2 is a front view of a bandpass filter unit.

FIG. 2 is a front view of the bandpass filter unit.

The bandpass filter unit 16 is an example of a first optical element. The bandpass filter unit 16 is configured by a frame 16A comprising two aperture regions 16A1 and 16A2, and two bandpass filters 16B1 and 16B2 provided in the frame 16A. Note that in the following, if necessary, the two aperture regions 16A1 and 16A2 are distinguished from each other by referring one aperture region 16A1 provided in the frame 16A to as a first aperture region 16A1 and referring the other aperture region 16A2 to as a second aperture region 16A2. In addition, the two bandpass filters 16B1 and 16B2 are distinguished from each other by referring the bandpass filter 16B1 provided in the first aperture region 16A1 to as a first bandpass filter 16B1 and referring the bandpass filter 16B2 provided in the second aperture region 16A2 to as a second bandpass filter 16B2.

The two aperture regions 16A1 and 16A2 provided in the frame 16A have a circular aperture shape and are disposed symmetrically with the optical axis L interposed therebetween. The frame 16A has a light shielding property and allows light beams to pass through only the two aperture regions 16A1 and 16A2.

Each of the first bandpass filter 16B1 and the second bandpass filter 16B2 is configured by a so-called multi-bandpass filter, and transmits the light beams of a plurality of types of the wavelength ranges. In the imaging apparatus according to the present embodiment, each of the first bandpass filter 16B1 and the second bandpass filter 16B2 transmits the light beams of two types of the wavelength ranges. Note that the first bandpass filter 16B1 and the second bandpass filter 16B2 transmit the light beams of the wavelength ranges different from each other.

Figure 3:
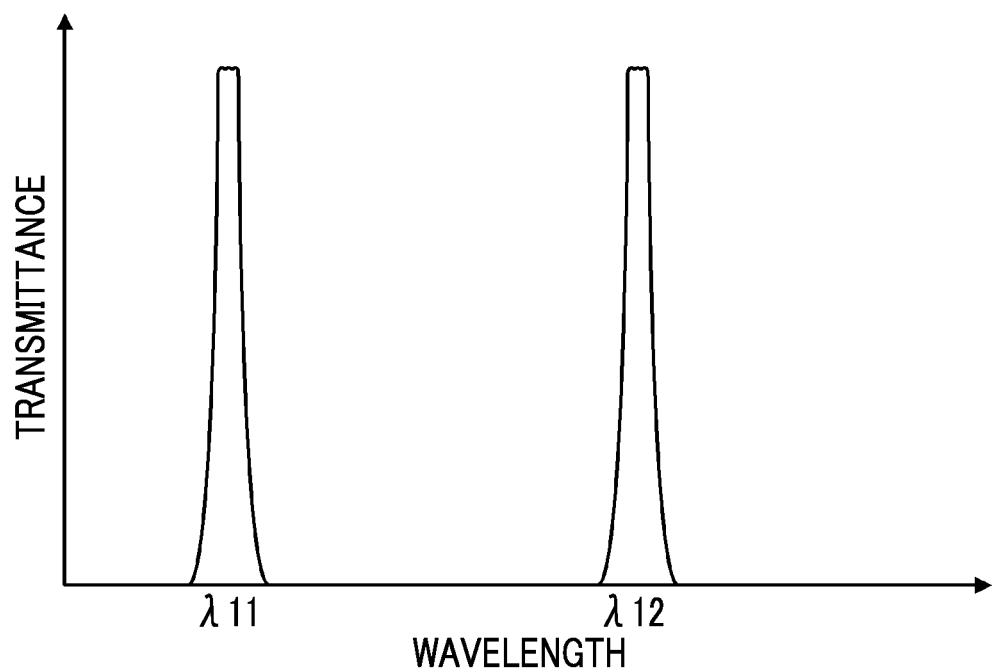
FIG. 3 is a graph showing a transmission wavelength characteristic of a first bandpass filter.

FIG. 3 is a graph showing a transmission wavelength characteristic of the first bandpass filter.

As shown in FIG. 3, the first bandpass filter 16B1 transmits the light beam of a wavelength range $\lambda 11$ and the light beam of a wavelength range $\lambda 12$.

Figure 4:
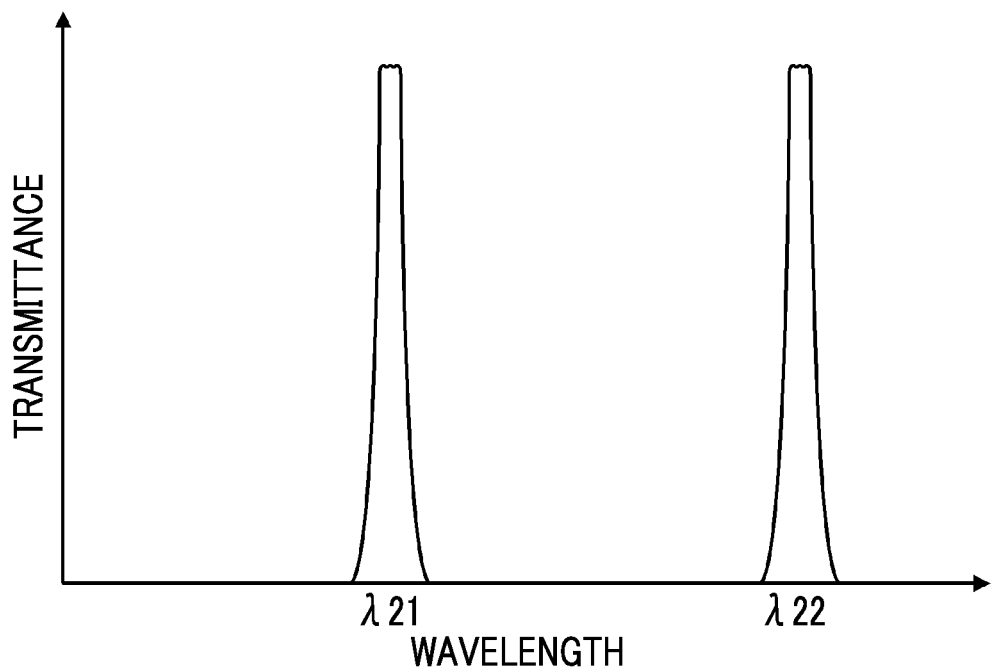
FIG. 4 is a graph showing a transmission wavelength characteristic of a second bandpass filter.

FIG. 4 is a graph showing a transmission wavelength characteristic of the second bandpass filter.

As shown in FIG. 4, the second bandpass filter 16B2 transmits the light beam of a wavelength range $\lambda 21$ and the light beam of a wavelength range $\lambda 22$.

Figure 5:
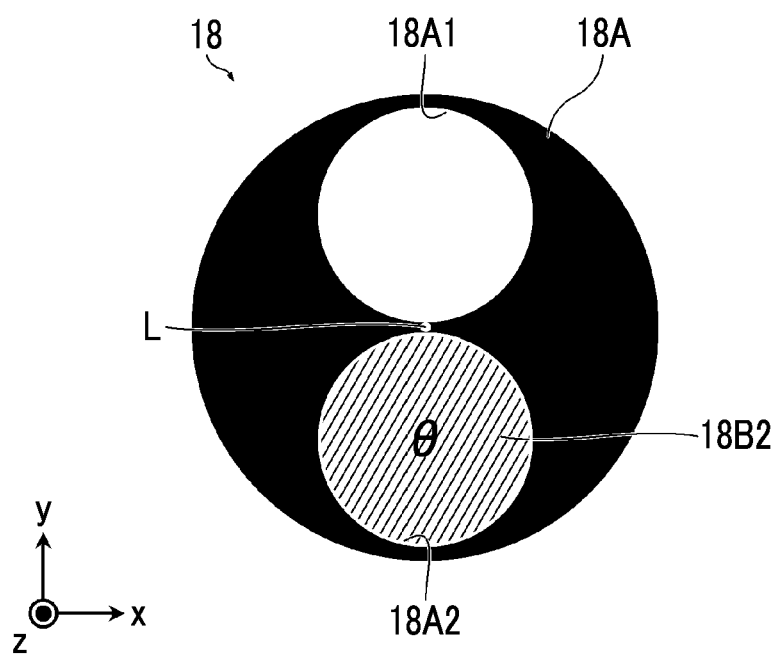
FIG. 5 is a front view of a polarization filter unit.

FIG. 5 is a front view of the polarization filter unit.

The polarization filter unit 18 is an example of a second optical element. The polarization filter unit 18 polarizes the light beams transmitted through the bandpass filter unit 16 in a plurality of directions. The polarization filter unit 18 is configured by a frame 18A comprising two aperture regions 18A1 and 18A2, and one polarization filter 18B2 provided in one aperture region 18A2 of the frame 18A. Note that in the following, if necessary, the two aperture regions 18A1 and 18A2 are distinguished from each other by referring one aperture region 18A1 provided in the frame 18A to as a first aperture region 18A1 and referring the other aperture region 18A2 to as a second aperture region 18A2. The polarization filter 18B2 is provided in the second aperture region 18A2.

The frame 18A has a light shielding property and allows the light beams to pass through only the two aperture regions 18A1 and 18A2. The two aperture regions 18A1 and 18A2 correspond to the two aperture regions 16A1 and 16A2 of the bandpass filter unit 16 and are disposed so as to overlap with the aperture regions 16A1 and 16A2 at the same position. That is, the first aperture region 18A1 has the same aperture shape (circular shape) as the first aperture region 16A1 of the bandpass filter unit 16 and is disposed so as to overlap with the first aperture region 16A1 at the same position. In addition, the second aperture region 18A2 has the same aperture shape as the second aperture region 16A2 of the bandpass filter unit 16 and is disposed so as to overlap with the second aperture region 16A2 at the same position. Therefore, the light beam, which passes through the first aperture region 16A1 of the bandpass filter unit 16, passes through the first aperture region 18A1 of the polarization filter unit 18, and the light beam, which passes through the second aperture region 16A2 of the bandpass filter unit 16, passes through the second aperture region 18A2 of the polarization filter unit 18.

The polarization filter 18B2 provided in the second aperture region 18A2 transmits the light beam of a polarization direction θ (for example, an azimuthal angle of 60°). The polarization direction (polarization azimuth) is represented by an angle (azimuthal angle) formed by a polarization transmission axis with an x-axis (horizontal axis) in an xy plane orthogonal to the optical axis L.

The polarization filter is provided only in the second aperture region 18A2. Therefore, the first aperture region 18A1 transmits an unpolarized light beam.

In the imaging optical system 10 having the configuration described above, a pupil region is split into two regions by the bandpass filter unit 16 and the polarization filter unit 18. That is, the pupil region is split into a first pupil region defined by the first aperture region 16A1 of the bandpass filter unit 16 and the first aperture region 18A1 of the polarization filter unit 18, and a second pupil region defined by the second aperture region 16A2 of the bandpass filter unit 16 and the second aperture region 18A2 of the polarization filter unit 18. The light beams having different characteristics are emitted from the pupil regions. That is, the light beam, which is the unpolarized light beam, having the wavelength range $\lambda 11$ (first light beam), light beam, which is the unpolarized light beam, having the wavelength range $\lambda 12$ (second light beam), the light beam, which is the light beam of the polarization direction θ, having the wavelength range $\lambda 21$ (third light beam), and the light beam, which is the light beam of the polarization direction θ, having the wavelength range $\lambda 22$ (fourth light beam) are emitted. The first light beam and the second light beam are the light beams which pass through the first aperture region 16A1 of the bandpass filter unit 16 and the first aperture region 18A1 of the polarization filter unit 18. The third light beam and the fourth light beam are the light beams which pass through the second aperture region 16A2 of the bandpass filter unit 16 and the second aperture region 18A2 of the polarization filter unit 18.

[Image Sensor]

Figure 6:
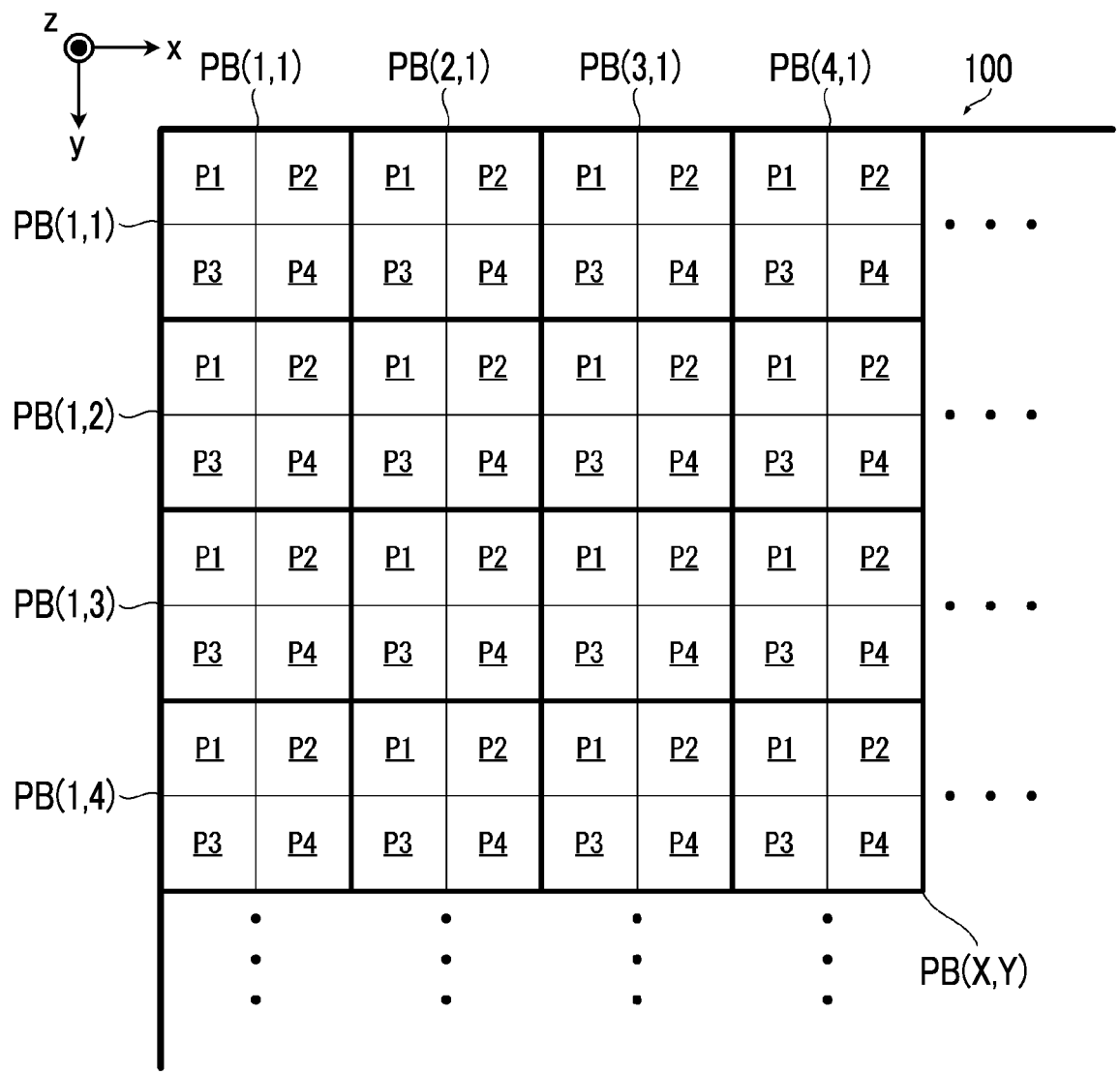
FIG. 6 is a diagram showing a schematic configuration of an arrangement of pixels of an image sensor.

FIG. 6 is a diagram showing a schematic configuration of an arrangement of pixels of the image sensor.

As shown in FIG. 6, the image sensor 100 has a plurality of types of the pixels P1, P2, P3, and P4 on a light-receiving surface thereof. The pixels P1 to P4 are regularly arranged at a certain pitch along a horizontal direction (x-axis direction) and a vertical direction (y-axis direction).

In the image sensor 100 according to the present embodiment, one pixel block PB (X, Y) is configured by four (2×2) adjacent pixels P1 to P4, and the pixel blocks PB (X, Y) are regularly arranged along the horizontal direction (x-axis direction) and the vertical direction (y-axis direction). Hereinafter, if necessary, the pixels P1 to P4 are distinguished from each other by referring the pixel P1 to as a first pixel P1, referring the pixel P2 to as a second pixel P2, referring the pixel P3 to as a third pixel P3, and referring the pixel P4 to as a fourth pixel P4. The pixels P1 to P4 have different optical characteristics.

Figure 7:
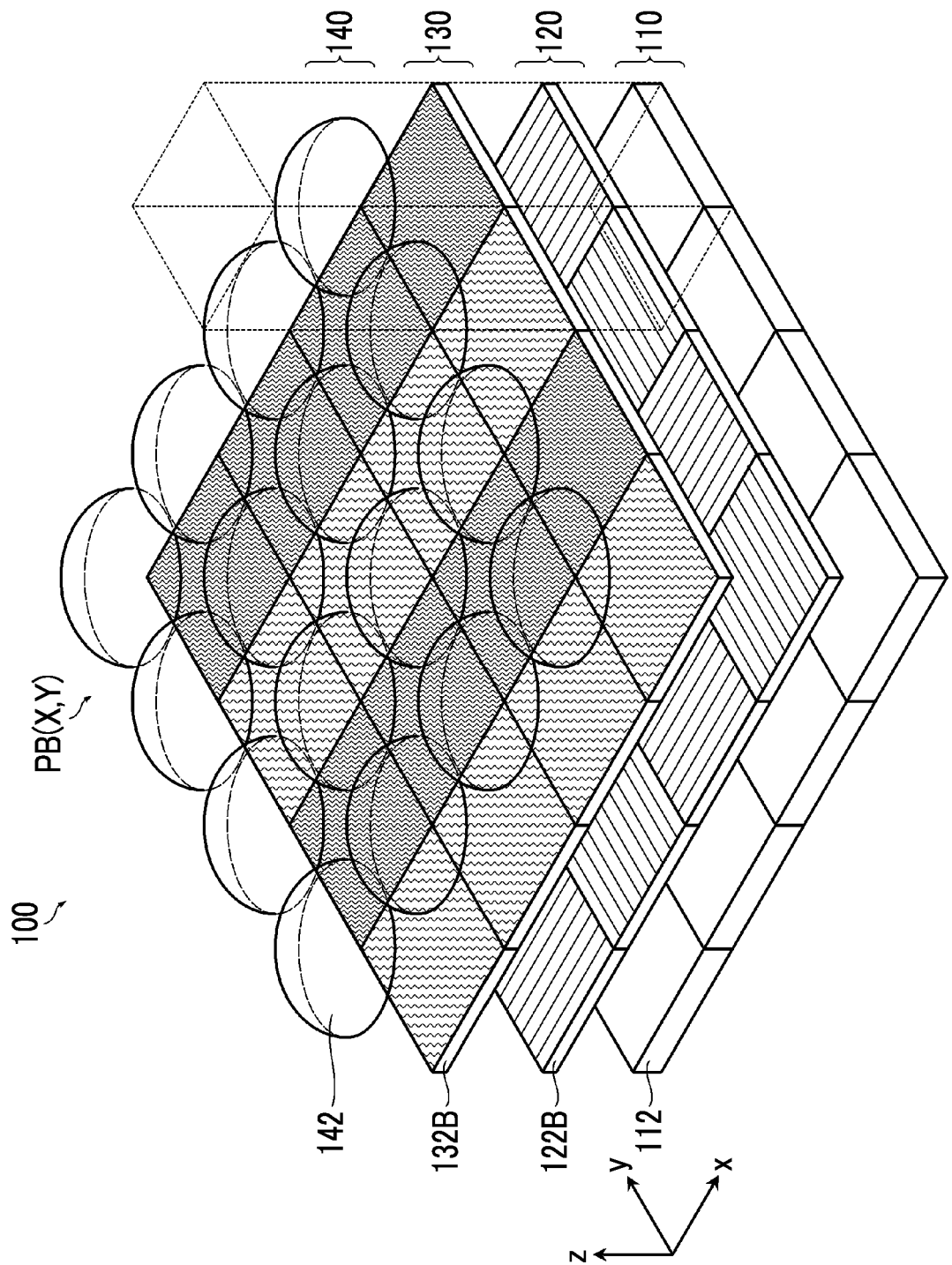
FIG. 7 is a diagram showing a schematic configuration of the image sensor.
Figure 8:
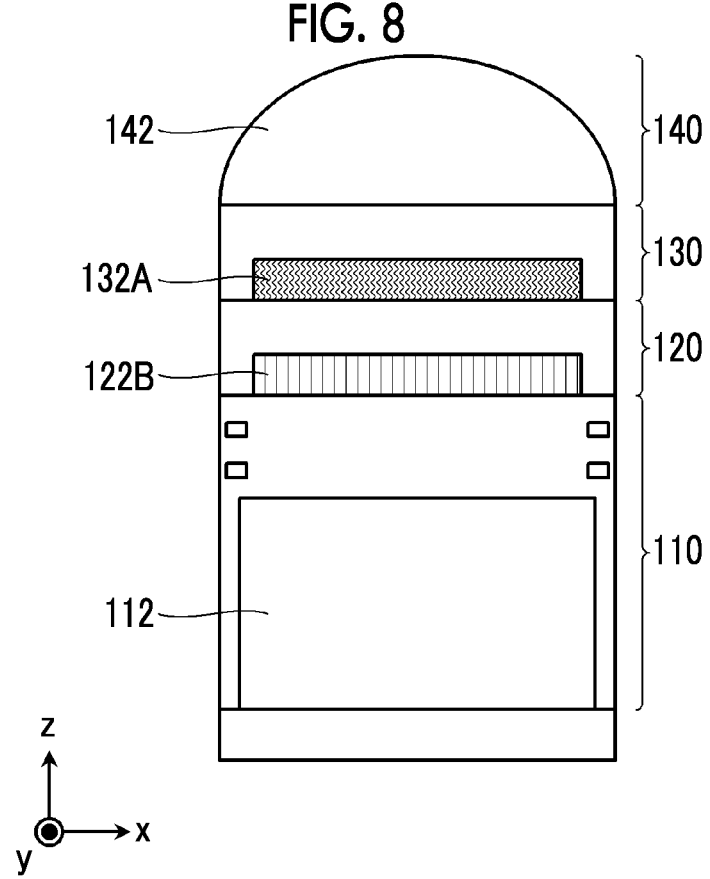
FIG. 8 is a cross-sectional view showing a schematic configuration of one pixel (broken line portion in FIG. 7).

FIG. 7 is a diagram showing a schematic configuration of the image sensor. FIG. 8 is a cross-sectional view showing a schematic configuration of one pixel (broken line portion in FIG. 7).

The image sensor 100 includes a pixel array layer 110, a polarization filter element array layer 120, a spectral filter element array layer 130, and a micro lens array layer 140. The layers are disposed in the order of the pixel array layer 110, the polarization filter element array layer 120, the spectral filter element array layer 130, and the micro lens array layer 140 from an image plane side to an object side.

The pixel array layer 110 is configured by two-dimensionally arranging a large number of photodiodes 112. One photodiode 112 configures one pixel. The photodiodes 112 are regularly arranged along the horizontal direction (x-axis direction) and the vertical direction (y-axis direction).

The polarization filter element array layer 120 is configured by two-dimensionally arranging two types of the polarization filter elements 122A and 122B having different transmission polarization directions (polarization directions of the transmitted light beams). Hereinafter, if necessary, the polarization filter elements 122A and 122B are distinguished from each other by referring the polarization filter element 122A to as a first polarization filter element 122A and referring the polarization filter element 122B to as a second polarization filter element 122B. The polarization filter elements 122A and 122B are arranged at the same intervals as the photodiodes 112, and each of which is provided for each pixel. The first polarization filter element 122A transmits the light beam of a first polarization direction θ1 (for example, the azimuthal angle of 90°). The second polarization filter element 122B transmits the light beam of a second polarization direction θ2 (for example, the azimuthal angle of 0°), which is different from the first polarization direction θ1. The polarization filter elements 122A and 122B are examples of a fourth optical element.

The polarization filter elements 122A and 122B are regularly arranged in each pixel block PB (X, Y).

Figure 9:
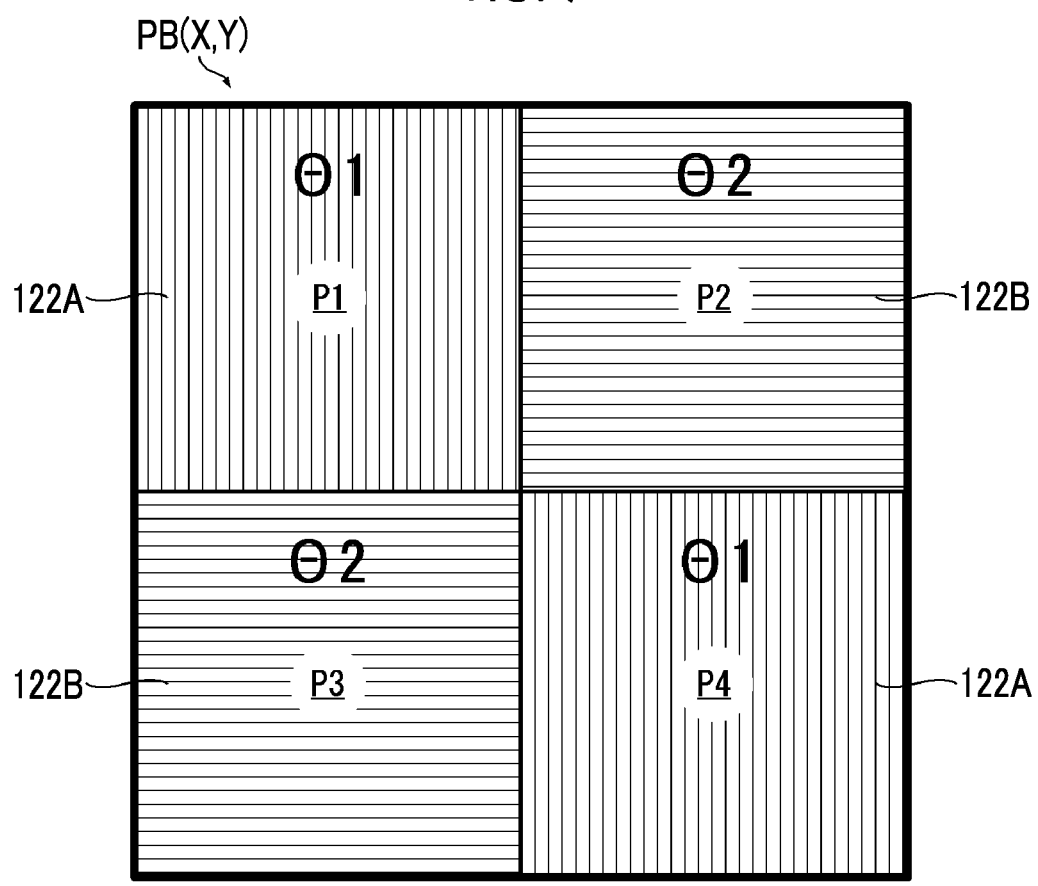
FIG. 9 is a diagram showing an example of an arrangement pattern of polarization filter elements provided in each pixel block.

FIG. 9 is a diagram showing an example of an arrangement pattern of the polarization filter elements provided in each pixel block.

As shown in FIG. 9, in the imaging apparatus according to the present embodiment, the first pixel P1 and the fourth pixel P4 in the pixel block comprise the first polarization filter element 122A, and the second pixel P2 and the third pixel P3 comprise the second polarization filter element 122B.

The spectral filter element array layer 130 is configured by two-dimensionally arranging two types of the spectral filter elements 132A and 132B having different transmission wavelength characteristics from each other. Hereinafter, if necessary, the spectral filter elements 132A and 132B are distinguished from each other by referring the spectral filter element 132A to as a first spectral filter element 132A and referring the spectral filter element 132B to as a second spectral filter element 132B. The spectral filter elements 132A and 132B are arranged at the same intervals as the photodiodes 112, and each of which is provided for each pixel. The spectral filter elements 132A and 132B are examples of a third optical element.

Figure 10:
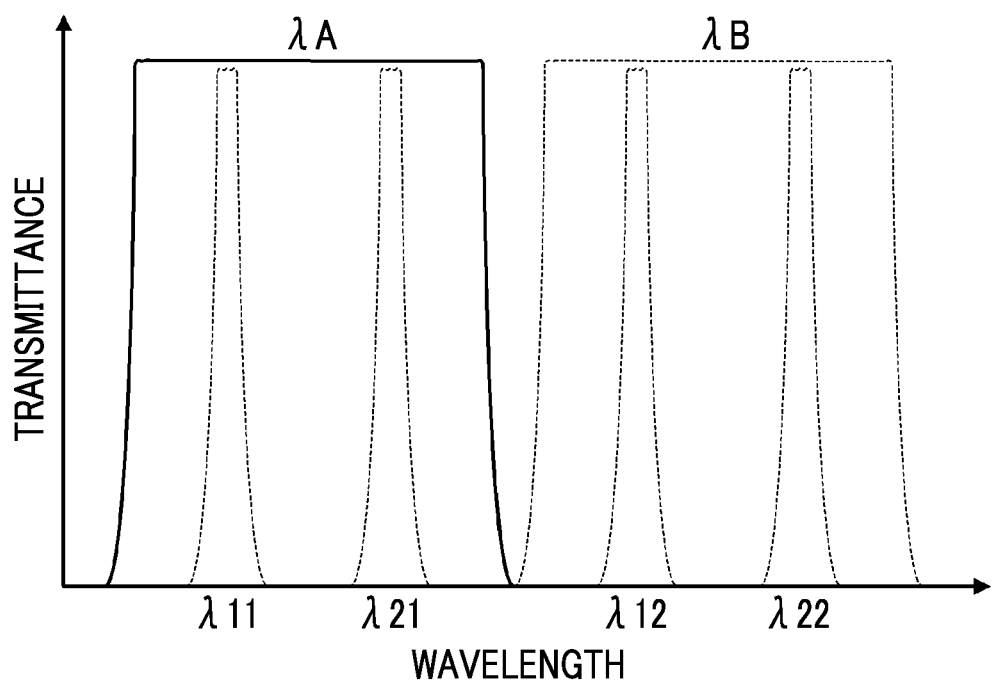
FIG. 10 is a graph showing an example of a transmission wavelength characteristic of a first spectral filter element.

FIG. 10 is a graph showing an example of the transmission wavelength characteristic of the first spectral filter element. In addition, FIG. 11 is a graph showing an example of the transmission wavelength characteristic of the second spectral filter element.

As shown in FIG. 10, the first spectral filter element 132A transmits the light beam of a wavelength range λA. On the other hand, as shown in FIG. 11, the second spectral filter element 132B transmits the light beam of a wavelength range λB different from that of the first spectral filter element 132A.

Figure 11:
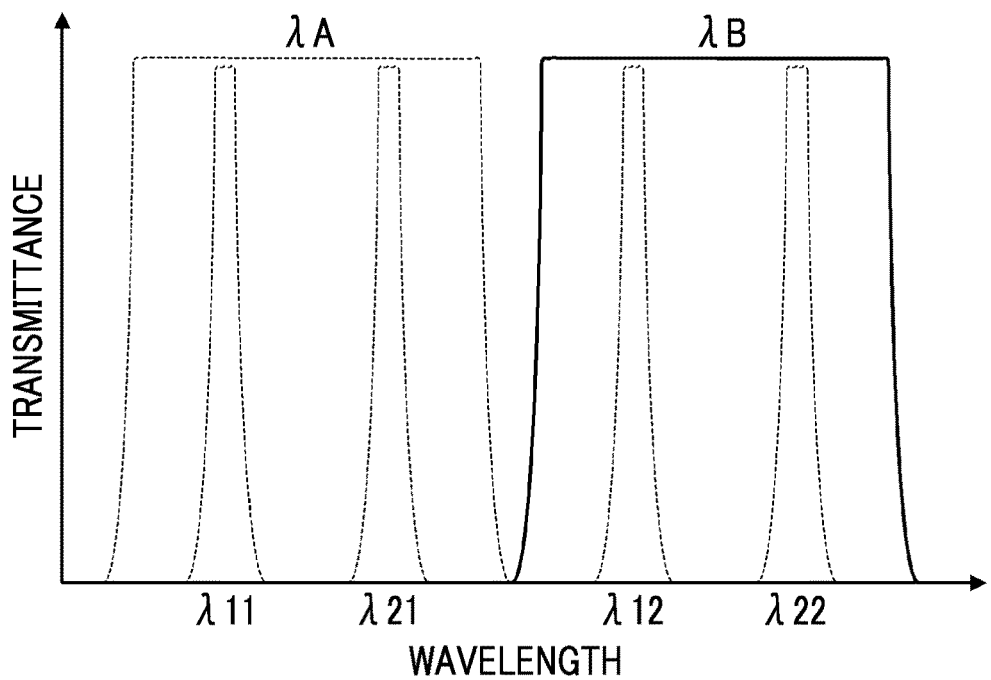
FIG. 11 is a graph showing an example of a transmission wavelength characteristic of a second spectral filter element.

In addition, as shown in FIGS. 10 and 11, in the bandpass filter unit 16 provided in the imaging optical system 10, the wavelength ranges λ11 and λ12 transmitted through the first bandpass filter 16B1 and the wavelength regions λ21 and λ22 transmitted through the second bandpass filter 16B2 are set within a range of the transmission wavelength range λA of the first spectral filter element 132A and the transmission wavelength range λB of the second spectral filter element 132B. Specifically, the wavelength range λ11 transmitted through the first bandpass filter 16B1 and the wavelength range λ21 transmitted through the second bandpass filter 16B2 are set within a range of the transmission wavelength range λA of the first spectral filter element 132A. In addition, the wavelength range λ12 transmitted through the first bandpass filter 16B1 and the wavelength range λ22 transmitted through the second bandpass filter 16B2 are set within a range of the transmission wavelength range λB of the second spectral filter element 132B.

Figure 12:
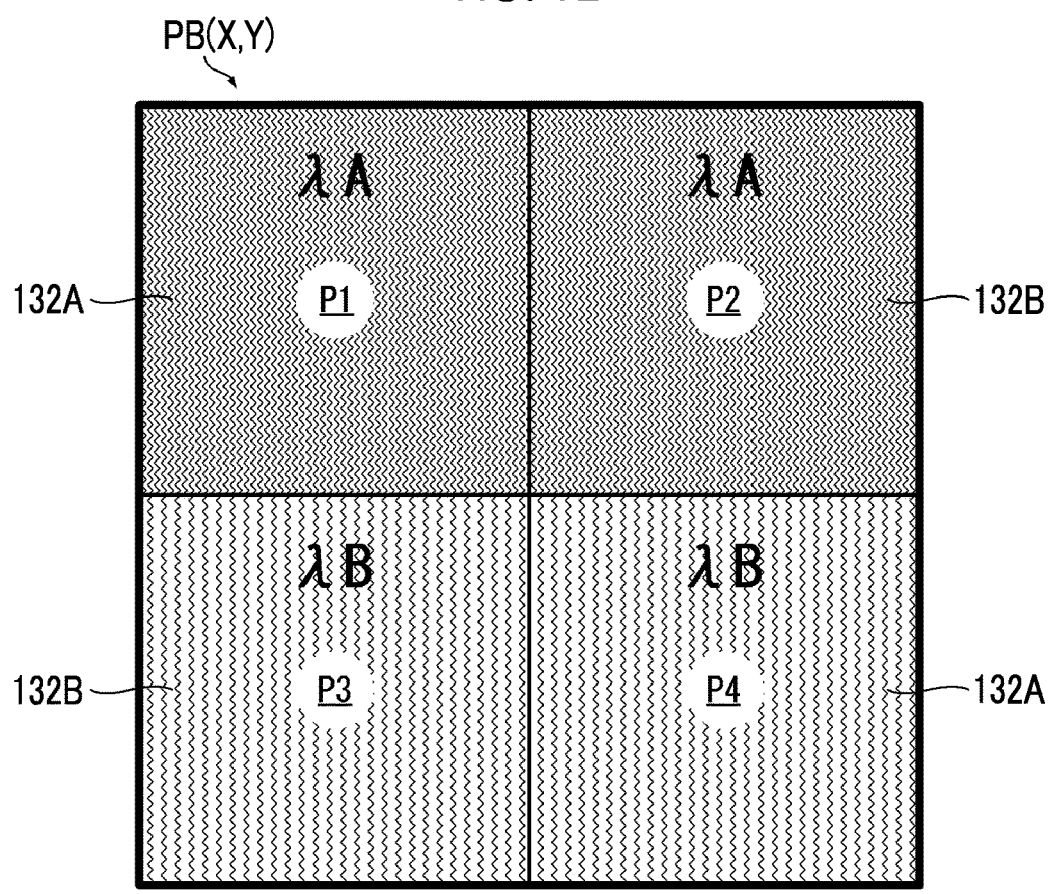
FIG. 12 is a diagram showing an example of an arrangement pattern of the spectral filter elements provided in each pixel block.

FIG. 12 is a diagram showing an example of an arrangement pattern of the spectral filter elements provided in each pixel block.

As shown in FIG. 12, the spectral filter elements 132A and 132B are regularly arranged in each pixel block PB (X, Y). In the imaging apparatus according to the present embodiment, the first pixel P1 and the second pixel P2 comprise the first spectral filter element 132A, and the third pixel P3 and the fourth pixel P4 comprise the second spectral filter element 132B.

The micro lens array layer 140 is configured by two-dimensionally arranging a large number of micro lenses 142. The micro lenses 142 are arranged at the same intervals as the photodiodes 112, and each of which is provided for each pixel. The micro lenses 142 are provided for a purpose of efficiently condensing the light beams from the imaging optical system 10 on the photodiodes 112.

In the image sensor 100 configured as described above, in each pixel block PB (X, Y), each of the pixels P1 to P4 receives the light beams from the imaging optical system 10 as follows. That is, the first pixel P1 receives the light beams from the imaging optical system 10 via the first spectral filter element 132A (wavelength range λA) and the first polarization filter element 122A (polarization direction θ1). In addition, the second pixel P2 receives the light beams from the imaging optical system 10 via the first spectral filter element 132A (wavelength range λA) and the second polarization filter element 122B (polarization direction θ2). In addition, the third pixel P3 receives the light beams from the imaging optical system 10 via the second spectral filter element 132B (wavelength range λB) and the second polarization filter element 122B (polarization direction θ2). In addition, the fourth pixel P4 receives the light beams from the imaging optical system 10 via the second spectral filter element 132B (wavelength range λB) and the first polarization filter element 122A (polarization direction θ1). In this way, each of the pixels P1 to P4 of the pixel block PB (X, Y) has different combinations of the spectral filter elements 132A and 132B and the polarization filter elements 122A and 122B, so that the light beams of different wavelength ranges and the polarization characteristics can be received.

[Signal Processing Unit]

The signal processing unit 200 processes signals output from the image sensor 100 to generate image signals (image data) of the multispectral image of four bands. That is, the image signals of four types of the wavelength ranges λ11, λ12, λ21, and λ22 transmitted through the bandpass filter unit 16 of the imaging optical system 10 are generated.

Figure 13:
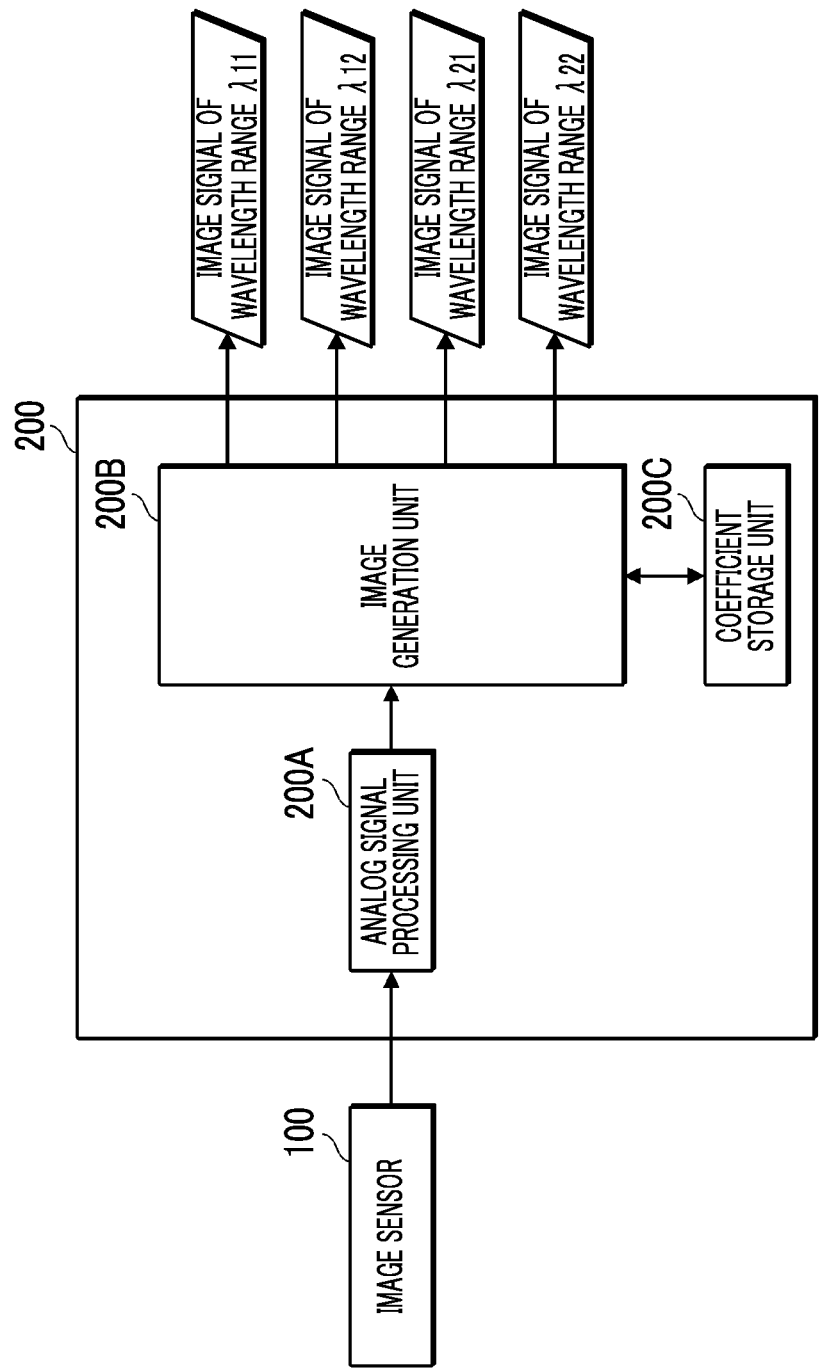
FIG. 13 is a block diagram showing a schematic configuration of a signal processing unit.

FIG. 13 is a block diagram showing a schematic configuration of the signal processing unit.

As shown in FIG. 13, the signal processing unit 200 includes an analog signal processing unit 200A, an image generation unit 200B, and a coefficient storage unit 200C.

The analog signal processing unit 200A takes in an analog pixel signal output from each pixel of the image sensor 100, performs predetermined signal processing (for example, sampling two correlation pile processing, amplification processing, and the like), converts the processed pixel signal into a digital signal, and outputs the converted digital signal.

The image generation unit 200B performs predetermined signal processing on the pixel signal after being converted into the digital signal to generate an image signal of each of the wavelength ranges λ11, λ12, λ21, and λ22.

Figure 14:
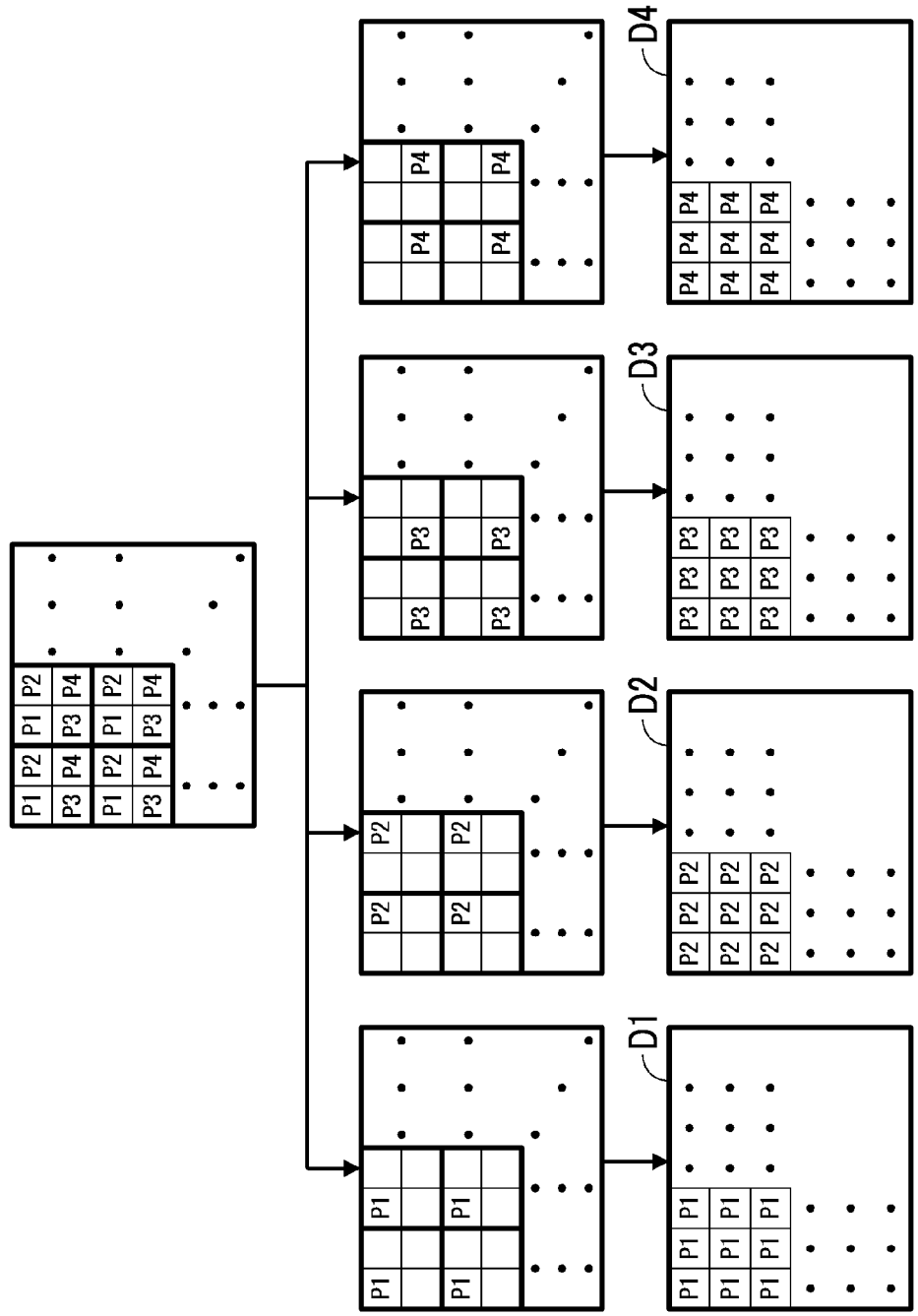
FIG. 14 is a conceptual diagram of image generation.

FIG. 14 is a conceptual diagram of image generation.

Each pixel block PB (X, Y) includes the first pixel P1, the second pixel P2, the third pixel P3, and the fourth pixel P4. Therefore, by separating and extracting the pixel signals of the first pixel P1, the second pixel P2, the third pixel P3, and the fourth pixel P4 from each pixel block PB (X, Y), four image signals D1 to D4 are generated. However, interference (crosstalk) has occurred in these four image signals. That is, since the light beam of each wavelength range is incident on each of the pixels P1 to P4, the generated image is an image in which images of the wavelength ranges are mixed at a predetermined ratio. Therefore, the image generation unit 200B performs interference removal processing to generate the image signal of each wavelength range.

Hereinafter, the interference removal processing performed by the signal processing unit 200 will be described.

In each pixel block PB (X, Y), the pixel signal (signal value) obtained from the first pixel P1 is referred to as α1, the pixel signal obtained from the second pixel P2 is referred to as α2, the pixel signal obtained from the third pixel P3 is referred to as α3, and the pixel signal obtained from the fourth pixel P4 is referred to as α4. From each pixel block PB (X, Y), the four pixel signals α1 to α4 can be obtained. The image generation unit 200B calculates four pixel signals β1 to β4 corresponding to the light beams of the wavelength ranges λ11, λ12, λ21, and λ22 from the four pixel signals α1 to α4, and removes the interference. Specifically, the image generation unit 200B calculates the four pixel signals β1 to β4 corresponding to the light beams of the wavelength ranges λ11, λ12, λ21, and λ22 are calculated by Equation 1 using the following matrix A, and removes the interference.

$$A = \begin{bmatrix} a11 & a12 & a13 & a14 \\ a21 & a22 & a23 & a24 \\ a31 & a32 & a33 & a34 \\ a41 & a42 & a43 & a44 \end{bmatrix} \quad \text{Equation 1}$$

$$\begin{bmatrix} \beta 1 \\ \beta 2 \\ \beta 3 \\ \beta 4 \end{bmatrix} = \begin{bmatrix} a11 & a12 & a13 & a14 \\ a21 & a22 & a23 & a24 \\ a31 & a32 & a33 & a34 \\ a41 & a42 & a43 & a44 \end{bmatrix} * \begin{bmatrix} \alpha 1 \\ \alpha 2 \\ \alpha 3 \\ \alpha 4 \end{bmatrix}$$

Note that the pixel signal β1 is the pixel signal corresponding to the light beam of the wavelength range λ11, the pixel signal β2 is the pixel signal corresponding to the light beam of the wavelength range λ12, the pixel signal β3 is the pixel signal corresponding to the light beam of the wavelength range λ21, and the pixel signal β4 is the pixel signal corresponding to the light beam of the wavelength range λ22. Therefore, the image signal of the wavelength range λ11 is generated from the pixel signal β1, the image signal of the wavelength range λ12 is generated from the pixel signal β2, the image signal of the wavelength range λ21 is generated from the pixel signal β3, and the image signal of the wavelength range λ22 is generated from the pixel signal β4. Hereinafter, the reason why the interference can be removed by Equation 1 will be described.

The interference occurs by the light beam of each of the wavelength ranges λ11, λ12, λ21, and λ22 mixed into each of the pixels P1 to P4. A ratio (interference ratio) at which the light beam of each of the wavelength ranges λ11, λ12, λ21, and λ22 emitted from the imaging optical system 10 is received by each of the pixels P1 to P4 is bij (i=1 to 4, j=1 to 4). Here, b11 is a ratio of the light beam of the wavelength range λ11 received by the first pixel P1, b12 is a ratio of the light beam of the wavelength range λ12 received by the first pixel P1, b13 is a ratio of the light beam of the wavelength range λ21 received by the first pixel P1, and b14 is a ratio of the light beam of the wavelength range λ22 received by the first pixel P1. In addition, b21 is a ratio of the light beam of the wavelength range λ11 received by the second pixel P2, b22 is a ratio of the light beam of the wavelength range λ12 received by the second pixel P2, b23 is a ratio of the light beam of the wavelength range λ21 received by the second pixel P2, and b24 is a ratio of the light beam of the wavelength range λ22 received by the second pixel P2. In addition, b31 is a ratio of the light beam of the wavelength range λ11 received by the third pixel P3, b32 is a ratio of the light beam of the wavelength range λ12 received by the third pixel P3, b33 is a ratio of the light beam of the wavelength range λ21 received by the third pixel P3, and b34 is a ratio of the light beam of the wavelength range λ22 received by the third pixel P3. In addition, b41 is a ratio of the light beam of the wavelength range λ11 received by the fourth pixel P4, b42 is a ratio of the light beam of the wavelength range λ12 received by the fourth pixel P4, b43 is a ratio of the light beam of the wavelength range λ21 received by the fourth pixel P4, and b44 is a ratio of the light beam of the wavelength range λ22 received by the fourth pixel P4. The ratio bij is uniquely determined by the transmission wavelength range and the transmission polarization direction (including the unpolarized light beam) set in the imaging optical system 10, and the transmission wavelength range and the transmission polarization direction set in each pixel of the image sensor 100. That is, the ratio bij is uniquely determined by a combination of the transmission wavelength range set in each of the aperture regions 16A1 and 16A2 of the bandpass filter unit 16 and the transmission wavelength range set in each of the spectral filter elements 132A and 132B of the image sensor 100 and a combination of the transmission polarization direction (including the unpolarized light beam) set in each of the aperture regions 18A1 and 18A2 of the polarization filter unit 18 and the polarization direction set in each of the polarization filter elements 122A and 122B of the image sensor 100. Therefore, the ratio bij in which the light beam of each of the wavelength ranges λ11, λ12, λ21, and λ22 emitted from the imaging optical system 10 is received by each of the pixels P1 to P4 can be obtained in advance.

The following relationship is satisfied between the pixel signals α1 to α4 obtained by the pixels P1 to P4 of each pixel block PB (X, Y) and the pixel signals β1 to β4 corresponding to the light beams of the wavelength ranges λ11, λ12, λ21, and λ22.

Regarding the pixel signal α1 obtained by the first pixel P1, "b11*β1+b12*β2+b13*β3+b14*β4=α1 ... Equation 2" is satisfied ("*" is a symbol of integration).

Regarding the pixel signal α2 obtained by the second pixel P2, "b21*β1+b22*β2+b23*β3+b24*β4=α2 ... Equation 3" is satisfied.

Regarding the pixel signal α3 obtained by the third pixel P3, "b31*β1+b32*β2+b33*β3+b34*β4=α3 ... Equation 4" is satisfied.

Regarding the pixel signal α4 obtained by the fourth pixel P4, "b41*β1+b42*β2+b43*β3+b44*β4=α4 ... Equation 5" is satisfied.

Here, the simultaneous equations of Equations 2 to 5 can be expressed by Equation 6 using a matrix B.

$$B = \begin{bmatrix} b11 & b12 & b13 & b14 \\ b21 & b22 & b23 & b24 \\ b31 & b32 & b33 & b34 \\ b41 & b42 & b43 & b44 \end{bmatrix} \quad \text{Equation 6}$$

$$\begin{bmatrix} b11 & b12 & b13 & b14 \\ b21 & b22 & b23 & b24 \\ b31 & b32 & b33 & b34 \\ b41 & b42 & b43 & b44 \end{bmatrix} * \begin{bmatrix} \beta1 \\ \beta2 \\ \beta3 \\ \beta4 \end{bmatrix} = \begin{bmatrix} \alpha1 \\ \alpha2 \\ \alpha3 \\ \alpha4 \end{bmatrix}$$

β1 to β4, which are the solutions of the simultaneous equations of Equations 2 to 5, are calculated by multiplying both sides of Equation 6 by an inverse matrix $B^{-1}$ of the matrix B.

$$\begin{bmatrix} \beta1 \\ \beta2 \\ \beta3 \\ \beta4 \end{bmatrix} = \begin{bmatrix} b11 & b12 & b13 & b14 \\ b21 & b22 & b23 & b24 \\ b31 & b32 & b33 & b34 \\ b41 & b42 & b43 & b44 \end{bmatrix}^{-1} * \begin{bmatrix} \alpha1 \\ \alpha2 \\ \alpha3 \\ \alpha4 \end{bmatrix} \quad \text{Equation 7}$$

In this way, the pixel signals β1 to β4 corresponding to the wavelength ranges λ11, λ12, λ21, and λ22 can be calculated from the signal values (pixel signals) α1 to α4 of the pixels P1 to P4 based on the ratio in which the light beam of the wavelength ranges λ11, λ12, λ21, and λ22 emitted from the imaging optical system 10 received by the pixels P1 to P4 of the pixel block PB (X, Y).

In Equation 1, the inverse matrix $B^{-1}$ of Equation 7 is set to A ($B^{-1}$=A). Therefore, elements aij of the matrix A in Equation 1 can be acquired by obtaining the inverse matrix $B^{-1}$ of the matrix B.

The coefficient storage unit 200C stores the elements aij of the matrix A for performing the interference removal processing, as a coefficient group.

The image generation unit 200B acquires the coefficient group from the coefficient storage unit 200C, calculates the pixel signals β1 to β4 corresponding to the wavelength ranges λ11, λ12, λ21, and λ22 by Equation 1 from the pixel signals α1 to α4 obtained from the pixels P1 to P4 of each pixel block PB (X, Y), and generates the image signals of the wavelength ranges λ11, λ12, λ21, and λ22.

The image signals of the wavelength ranges λ11, λ12, λ21, and λ22 generated by the image generation unit 200B are output to the outside and stored in a storage device (not shown), if necessary. In addition, the image signals thereof are displayed on a display (not shown), if necessary.

[Action of Imaging Apparatus]

Figure 15:
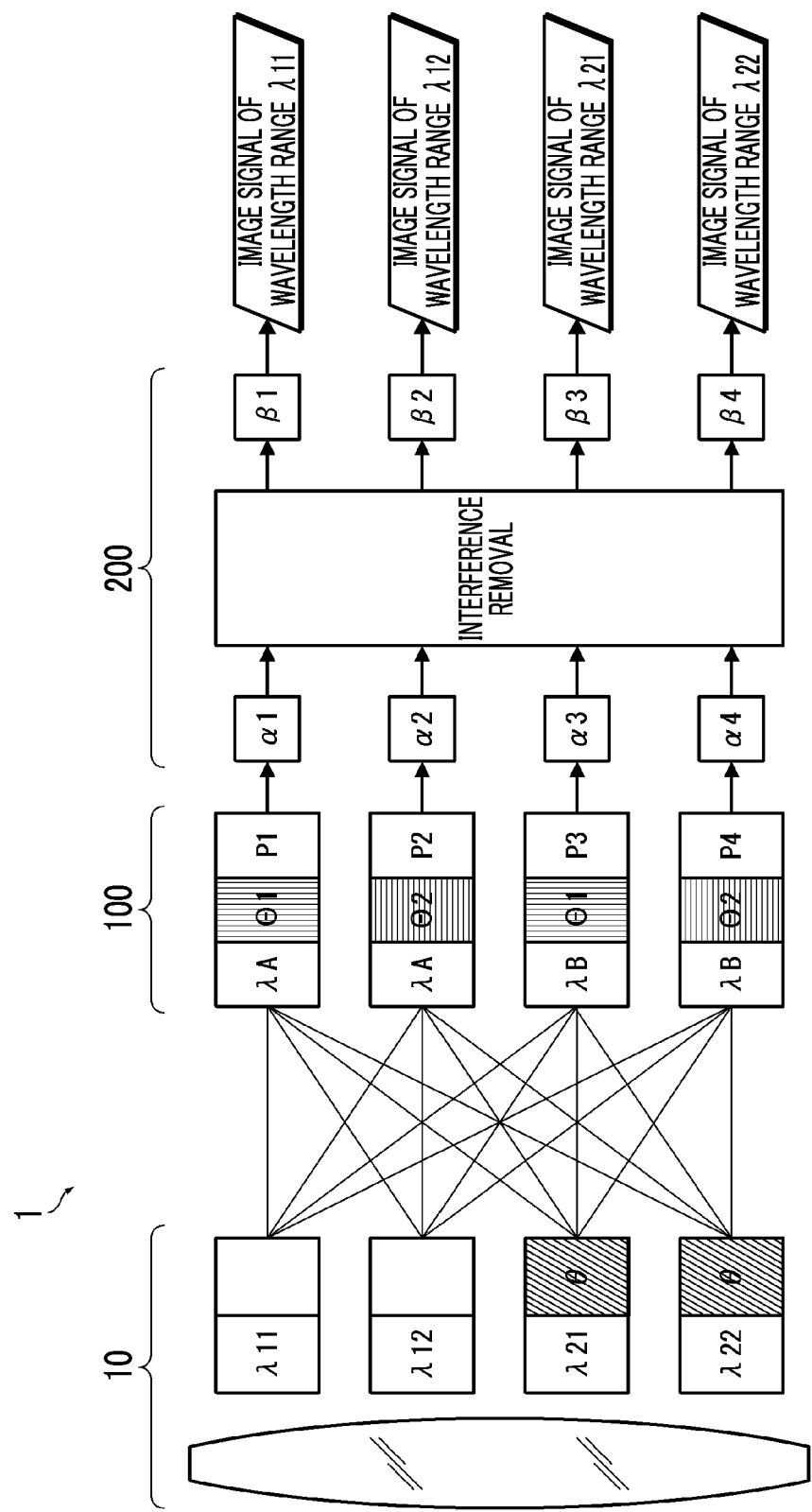
FIG. 15 is a conceptual diagram of an operation of the imaging apparatus.

FIG. 15 is a conceptual diagram of an operation of the imaging apparatus according to the present embodiment.

The light beams incident on the imaging optical system 10 become four types of the light beams of different characteristics, which are incident on the image sensor 100. Specifically, the light beams become the light beam, which is the unpolarized light beam, having the wavelength range λ11 (first light beam), the light beam, which is the unpolarized light beam, having the wavelength range λ12 (second light beam), the light beam, which is the light beam of the polarization direction θ, having the wavelength range λ21 (third light beam), and the light beam, which is the light beam of the polarization direction θ, having the wavelength range λ22 (fourth light beam), which are incident on the image sensor 100.

In each pixel block PB (X, Y) of the image sensor 100, the light beam of each of the wavelength ranges emitted from the imaging optical system 10 is received in each of the pixels P1 to P4 at a predetermined ratio. That is, the light beam of each of the wavelength ranges is received at the predetermined ratio bij by the actions of the polarization filter elements 122A and 122B and the spectral filter elements 132A and 132B provided in each of the pixels P1 to P4.

The signal processing unit 200 calculates the pixel signals β1 to β4 corresponding to the light beams of the wavelength ranges λ11, λ12, λ21, and λ22 from the pixel signals α1 to α4 obtained from the pixels P1 to P4 of each pixel block PB (X, Y) of the image sensor 100, and generates the image signals of the wavelength ranges λ11, λ12, λ21, and λ22. That is, the signal processing unit 200 performs arithmetic processing (interference removal processing) by Equation 1 using the matrix A, calculates the pixel signals β1 to β4 corresponding to the light beam of the wavelength ranges λ11, λ12, λ21, and λ22 from the pixel signals α1 to α4 of the pixels P1 to P4 obtained from the image sensor 100, and generates the image signals of the wavelength ranges λ11, λ12, λ21, and λ22.

In this way, with the imaging apparatus according to the present embodiment, the image of four types of wavelength ranges (multispectral image of four bands) can be captured by using one imaging optical system 10 and one (single plate) image sensor 100.

In addition, in the imaging apparatus according to the present embodiment, the bandpass filter unit 16 of the imaging optical system 10 transmits the light beams of a plurality of types of the wavelength ranges from one aperture region. As a result, it is possible to increase an aperture size as compared with a configuration in which the light beam of each wavelength range is individually extracted. As a result, the sensitivity can be improved. In particular, the number of transmission wavelength ranges set in each aperture region (the number of transmission wavelength ranges of the bandpass filter provided in each aperture region) is set to the same number as the number of transmission wavelength ranges of the image sensor (the number of types of the spectral filter elements provided in the image sensor), so that it is possible to increase the aperture size as much as possible and the sensitivity can be improved.

In addition, in the imaging apparatus according to the present embodiment, one of the aperture regions of the polarization filter unit 18 of the imaging optical system 10 is transparent. As a result, it is possible to prevent a decrease in an amount of the light beams due to the polarized light beam. Therefore, it is possible to improve the sensitivity by this configuration as well. In addition, with this configuration, it is possible to capture a polarized image at the same time.

Second Embodiment

The imaging apparatus according to the present embodiment is different from the imaging apparatus according to the first embodiment in that polarization filters 18B1 and 18B2 are provided in both the first aperture region 18A1 and the second aperture region 16A2 of the polarization filter unit 18. Other configurations are the same as those of the imaging apparatus according to the first embodiment. Therefore, here, only the configuration of the polarization filter unit 18 will be described.

Figure 16:
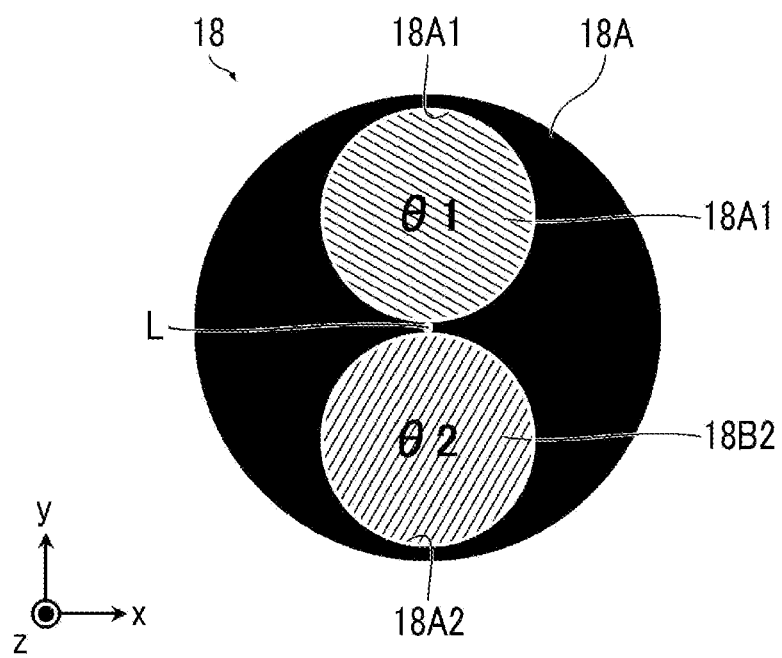
FIG. 16 is a front view of a polarization filter unit provided in the imaging apparatus according to a second embodiment.

FIG. 16 is a front view of the polarization filter unit provided in the imaging apparatus according to the present embodiment.

As shown in FIG. 16, the polarization filters 18B1 and 18B2 are provided in both the first aperture region 18A1 and the second aperture region 18A2. Hereinafter, the two polarization filters 18B1 and 18B2 are distinguished from each other by referring the polarization filter 18B1 provided in the first aperture region 18A1 to as a first polarization filter 18B1 and referring the polarization filter 18B1 provided in the second aperture region 18A2 to as a second polarization filter 18B2. The first polarization filter 18B1 transmits the light beam of the first polarization direction θ1 (for example, the azimuthal angle of 150°). The second polarization filter 18B2 transmits the light beam of the second polarization direction θ2 (for example, the azimuthal angle of 60°), which is different from the first polarization direction θ1. In this way, the polarization filter unit 18 may comprise the polarization filters 18B1 and 18B2 in all of the aperture regions 18A1 and 18A2 of the frame 18A.

Note that in a case in which the polarization filter is provided in each of all of the aperture regions as in the present embodiment, a configuration can also be adopted in which one of a plurality of types of the polarization filter elements provided in the image sensor is transparent.

In addition, in a case of capturing the multispectral image of four bands, the interference can be prevented by adopting the following configuration. That is, the transmission polarization directions of the first polarization filter 18B1 and the second polarization filter 18B2 provided in the polarization filter unit 18 are set to be directions orthogonal to each other, and the transmission polarization directions of the first polarization filter element 122A and the second polarization filter element 122B provided in the image sensor 100 are set to be directions orthogonal to each other. For example, the first polarization filter 18B1 of the polarization filter unit 18 uses the polarization filter which transmits the light beam of the azimuthal angle of 90°, and the second polarization filter 18B2 thereof uses the polarization filter which transmits the light beam of the azimuthal angle of 0°. On the other hand, the first polarization filter element 122A of the image sensor 100 uses the polarization filter element which transmits the light beam of the azimuthal angle of 90°, and the second polarization filter element 122B uses the polarization filter element which transmits the light beam of the azimuthal angle of 0°. As a result, in the image sensor 100, it is possible to separate the light beam of each wavelength range and to receive the light beam. Therefore, in the signal processing unit 200, it is possible to generate the image signal of each wavelength range without performing the interference removal processing.

Third Embodiment

The imaging apparatus according to the present embodiment has different configurations of the bandpass filter unit 16 and the polarization filter unit 18 from the imaging apparatus according to the first embodiment. Other configurations are the same as those of the imaging apparatus according to the first embodiment. Therefore, here, only the configurations of the polarization filter unit 18 and the bandpass filter unit 16 will be described.

Figure 17:
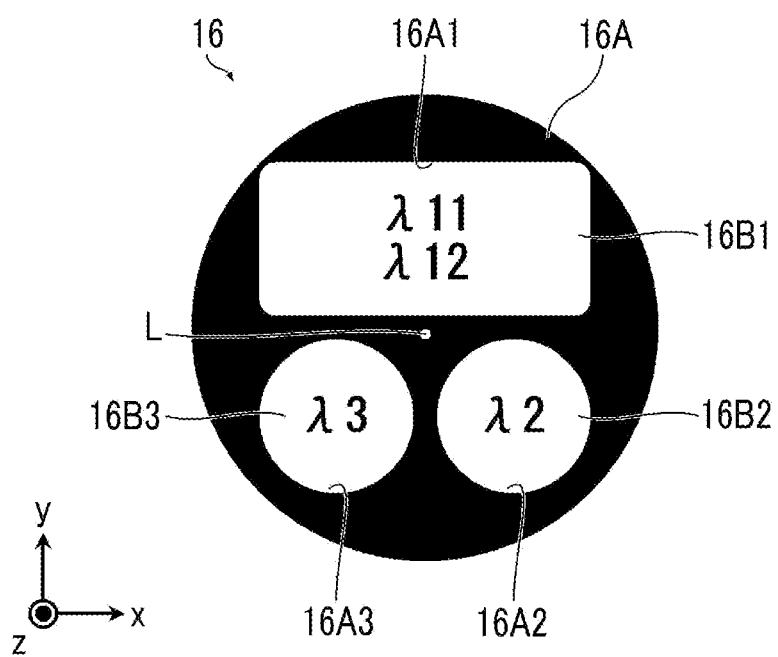
FIG. 17 is a front view of the bandpass filter unit.

FIG. 17 is a front view of the bandpass filter unit.

As shown in FIG. 17, the bandpass filter unit 16 according to the present embodiment has three aperture regions 16A1, 16A2, and 16A3. Hereinafter, if necessary, the three aperture regions 16A1, 16A2, and 16A3 are distinguished from each other by referring the aperture region 16A1 to as the first aperture region 16A1, referring the aperture region 16A2 to as the second aperture region 16A2, and referring the aperture region 16A3 to as a third aperture region 16A3.

The first aperture region 16A1 has a rectangular aperture shape, and is disposed in a region on one side of the frame 16A that is split into two equal parts. The second aperture region 16A2 and the third aperture region 16A3 both have a circular aperture shape, and are disposed in the other region of the frame 16A that is split into two equal parts.

The bandpass filters 16B1, 16B2, and 16B3 having different transmission wavelength ranges are provided in the aperture regions 16A1 to 16A3, respectively. Hereinafter, the three bandpass filters 16B1, 16B2, and 16B3 are distinguished from each other by referring the bandpass filter 16B1 provided in the first aperture region 16A1 to as a first bandpass filter 16B1, referring the bandpass filter 16B2 provided in the second aperture region 16A2 to as the second bandpass filter 16B2, and referring the bandpass filter 16B3 provided in the third aperture region 16A3 to as a third bandpass filter 16B3.

Figure 18:
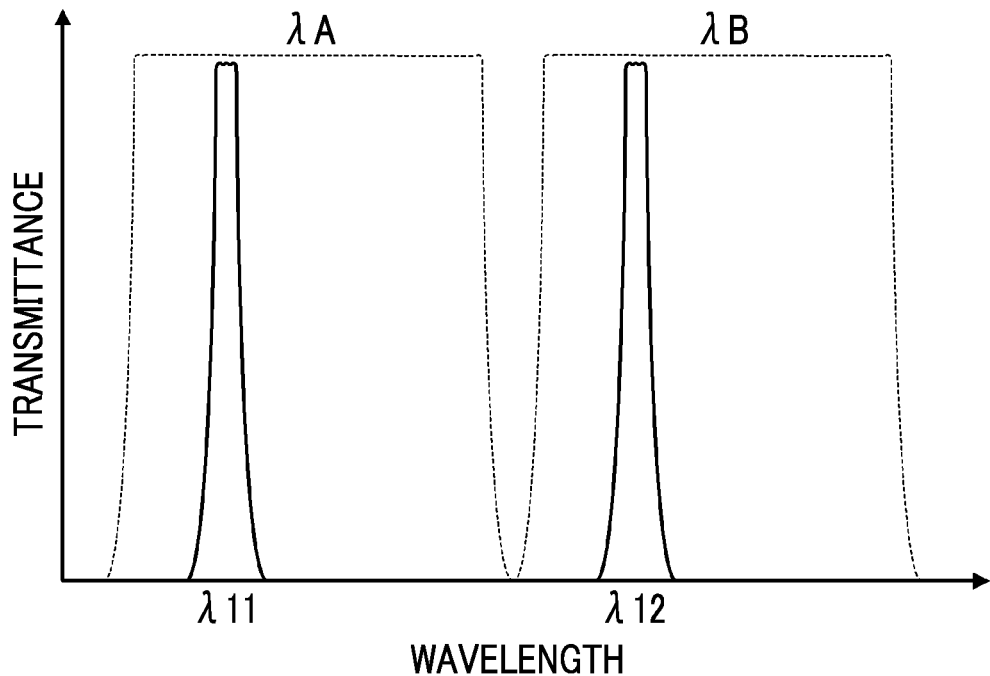
FIG. 18 is a graph showing the transmission wavelength characteristic of the first bandpass filter.

FIG. 18 is a graph showing the transmission wavelength characteristic of the first bandpass filter.

As shown in FIG. 18, the first bandpass filter 16B1 is configured by so-called multi-bandpass filters, which transmit the light beams of two types of the wavelength ranges. Specifically, the light beam of the wavelength range 11 and the light beam of the wavelength range $\lambda 12$ are transmitted. Note that the graphs of the two wavelength ranges $\lambda A$ and $\lambda B$ shown by the broken lines in FIG. 18 are graphs of the transmission wavelength characteristics of the first spectral filter element 132A and the second spectral filter element 132B provided in the image sensor 100, respectively (the graph of the wavelength range $\lambda A$ is a graph of the transmission wavelength characteristic of the first spectral filter element 132A, and the graph of the wavelength range $\lambda B$ is a graph of the transmission wavelength characteristic of the second spectral filter element 132B). The wavelength ranges $\lambda 11$ and $\lambda 12$ transmitted through the first bandpass filter 16B1 are set within the ranges of the wavelength ranges kA and $\lambda B$ transmitted through the first spectral filter element 132A and the second spectral filter element 132B. Specifically, one wavelength range $\lambda 11$ is set within the range of the wavelength range $\lambda A$ transmitted through the first spectral filter element 132A, and the other wavelength range $\lambda 12$ is set within the range of the wavelength range $\lambda B$ transmitted through the second spectral filter element 132B.

Figure 19:
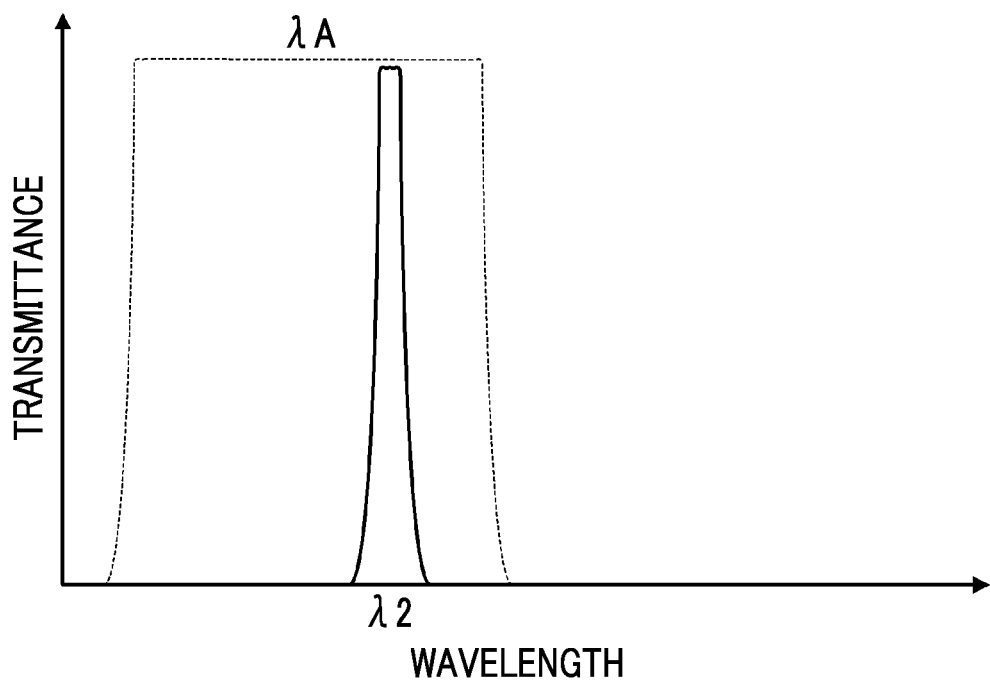
FIG. 19 is a graph showing the transmission wavelength characteristic of the second bandpass filter.

FIG. 19 is a graph showing the transmission wavelength characteristic of the second bandpass filter.

As shown in FIG. 19, the second bandpass filter 16B2 transmits the light beam of one type of the wavelength range. Specifically, the light beam of the wavelength range $\lambda 2$ is transmitted. Note that the graph of the wavelength range $\lambda A$ shown by the broken line in FIG. 19 is a graph of the transmission wavelength characteristic of the first spectral filter element 132A provided in the image sensor 100. The wavelength range $\lambda 2$ transmitted through the second bandpass filter 16B2 is set within the range of the wavelength range $\lambda A$ transmitted through the first spectral filter element 132A.

Figure 20:
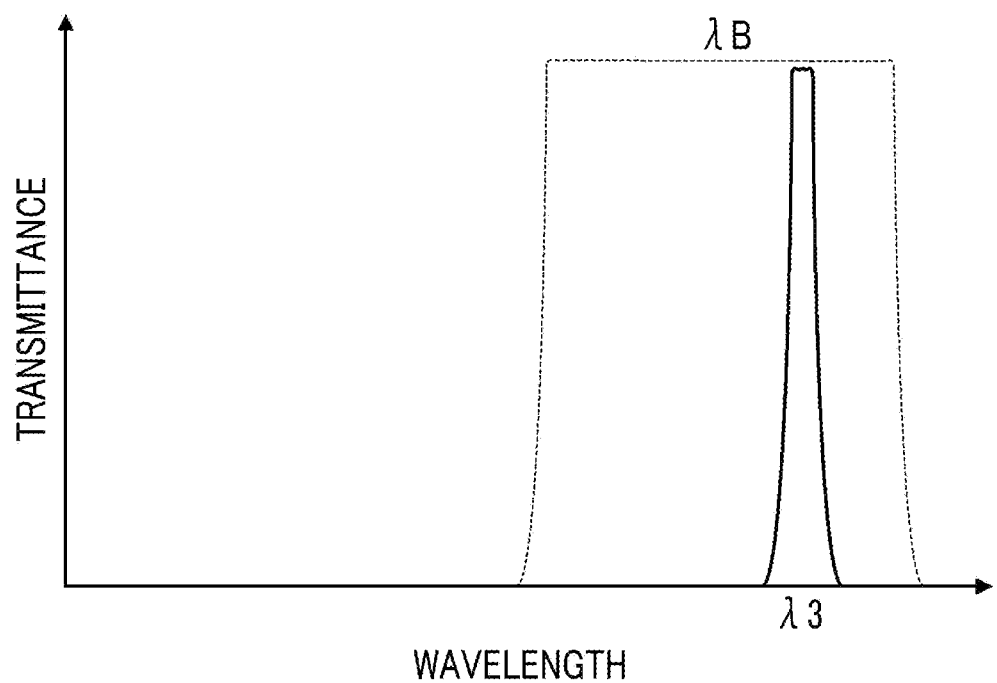
FIG. 20 is a graph showing the transmission wavelength characteristic of a third bandpass filter.

FIG. 20 is a graph showing the transmission wavelength characteristic of the third bandpass filter.

As shown in FIG. 20, the third bandpass filter 16B3 transmits the light beam of one type of the wavelength range. Specifically, as shown in FIG. 20, the light beam of a wavelength range λ3 is transmitted. Note that the graph of the wavelength range λB shown by the broken line in FIG. 20 is a graph of the transmission wavelength characteristic of the second spectral filter element 132B provided in the image sensor 100. The wavelength range λ3 transmitted through the third bandpass filter 16B3 is set within the range of the wavelength range λB transmitted through the second spectral filter element 132B.

Figure 21:
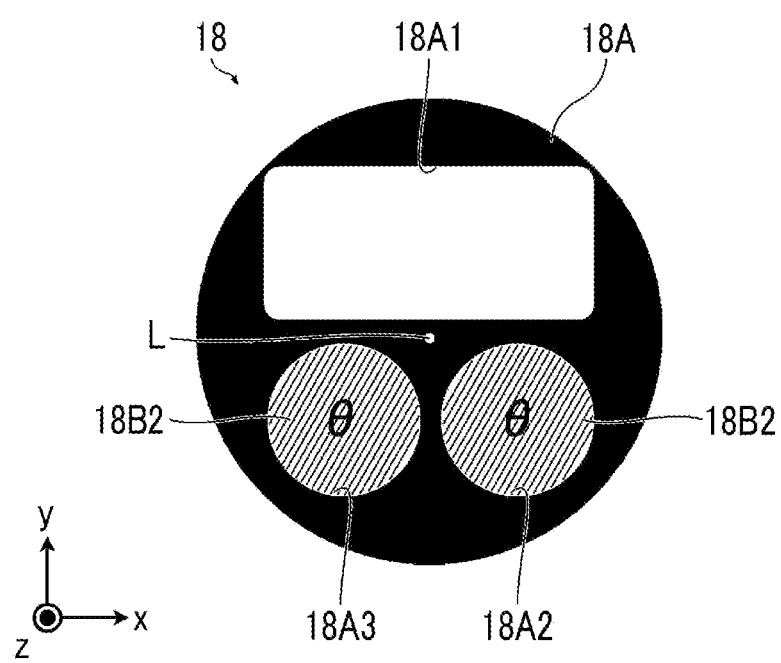
FIG. 21 is a front view of the polarization filter unit.

FIG. 21 is a front view of the polarization filter unit.

As shown in FIG. 21, the polarization filter unit 18 has the three aperture regions 18A1, 18A2, and 18A3 in the frame 18A in the same manner as the bandpass filter unit 16. Hereinafter, the three aperture regions 18A1, 18A2, and 18A3 are distinguished from each other by referring the aperture region 18A1 to as the first aperture region 18A1, referring the aperture region 18A2 to as the second aperture region 18A2, and referring the aperture region 18A3 to as a third aperture region 18A3.

The aperture regions 18A1 to 18A3 have the same aperture shape as the corresponding aperture regions 16A1 to 16A3 of the bandpass filter unit 16 and are disposed so as to overlap with the aperture regions 16A1 to 16A3 at the same position. Therefore, the light beam, which passes through each of the aperture regions 16A1 to 16A3 of the bandpass filter unit 16, is incident on each of the corresponding aperture regions 18A1 to 18A3.

The first aperture region 18A1 is transparent. Therefore, the unpolarized light beam passes through the first aperture region 18A1.

The polarization filter 18B2 is provided in the second aperture region 18A2 and the third aperture region 18A3. The polarization filter 18B2 transmits the light beam of the polarization direction θ (for example, the azimuthal angle of 60°).

With the imaging apparatus having the configuration described above, the light beam, which passes through the first aperture region 16A1 of the bandpass filter unit 16, passes through the first aperture region 18A1 of the polarization filter unit 18 and is incident on the image sensor 100. In addition, the light beam, which passes through the second aperture region 16A2 of the bandpass filter unit 16, passes through the second aperture region 18A2 of the polarization filter unit 18 and is incident on the image sensor 100. In addition, the light beam, which passes through the third aperture region 16A3 of the bandpass filter unit 16, passes through the third aperture region 18A3 of the polarization filter unit 18 and is incident on the image sensor 100.

The bandpass filter (first bandpass filter 16B1) which transmits the light beams of two types of the wavelength ranges λ11 and λ12 is provided in the first aperture region 16A1 of the bandpass filter unit 16. In addition, the bandpass filters (second bandpass filter 16B2 and third bandpass filter 16B3) which transmit the light beams of one type of the wavelength ranges λ2 and λ3 are provided in the second aperture region 16A2 and the third aperture region 16A3. Therefore, four types of the light beams having different characteristics are emitted from the imaging optical system 10. That is, the light beam, which is the unpolarized light beam, having the wavelength range λ11 (first light beam), the light beam, which is the unpolarized light beam, having the wavelength range λ12 (second light beam), the light beam, which is the light beam of the polarization direction θ, having the wavelength range λ21 (third light beam), and the light beam, which is the light beam of the polarization direction θ, having the wavelength range λ22 (fourth light beam) are emitted. Therefore, in the imaging apparatus according to the present embodiment, it is also possible to capture the image of four wavelength ranges (multispectral image of four bands) as in the imaging apparatus according to the first embodiment.

Note that in the present embodiment, the first aperture region 18A1 of the polarization filter unit 18 transparent, but as in the second embodiment, the polarization filter that polarizes the passing light beam in a predetermined polarization direction may be provided.

Fourth Embodiment

The imaging apparatus according to the present embodiment has a different configuration of the bandpass filter unit 16 from the imaging apparatus according to the first embodiment. Specifically, the transmission wavelength characteristic of the second bandpass filter 16B2 provided in the second aperture region 16A2 of the bandpass filter unit 16 is different from that of the imaging apparatus according to the first embodiment. Other configurations are the same as those of the imaging apparatus according to the first embodiment. Therefore, here, only the transmission wavelength characteristic of the second bandpass filter 16B2 will be described.

Figure 22:
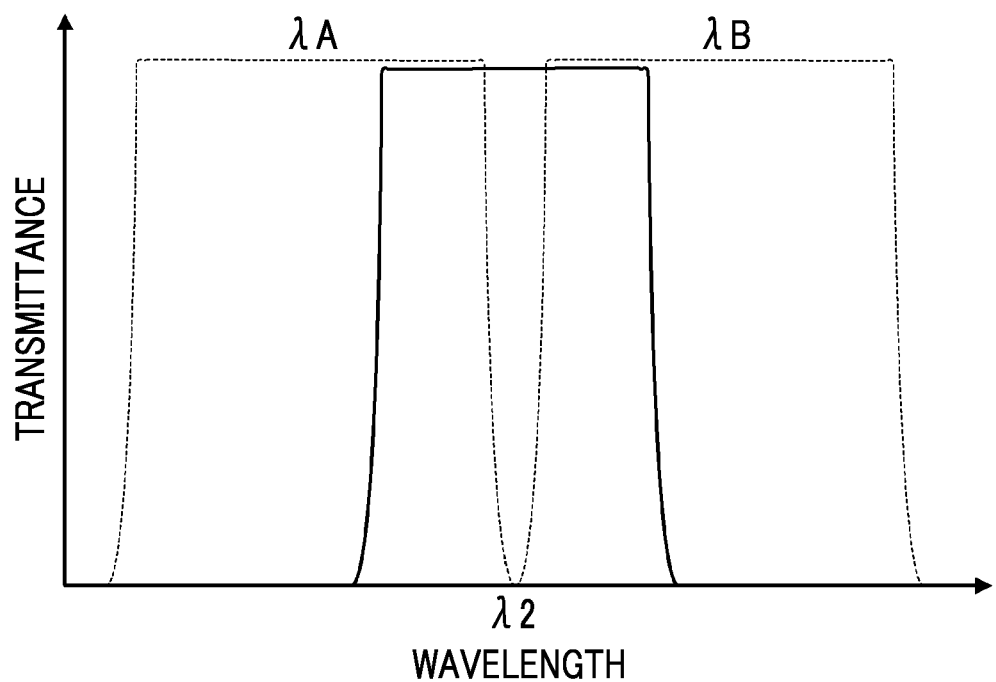
FIG. 22 is a graph showing a transmission wavelength characteristic of the second bandpass filter of the imaging apparatus according to a fourth embodiment.

FIG. 22 is a graph showing the transmission wavelength characteristic of the second bandpass filter of the imaging apparatus according to the present embodiment.

Note that in FIG. 22, the graph of the wavelength range λA shown by the broken line is a graph of the transmission wavelength characteristic of the first spectral filter element 132A provided in the image sensor 100, and the graph of the wavelength range λB shown by the broken line is a graph of the transmission wavelength characteristic of the second spectral filter element 132B.

As shown in FIG. 22, the second bandpass filter 16B2 provided in the imaging apparatus according to the present embodiment transmits the light beam of one type of the wavelength range λ2. The transmission wavelength range is set across between the transmission wavelength range of the first spectral filter element 132A provided in the image sensor 100 and the transmission wavelength range of the second spectral filter element 132B. Stated another way, a part of the transmission wavelength range is set to overlap with the transmission wavelength range of the first spectral filter element 132A and the transmission wavelength range of the second spectral filter element 132B.

By using the second bandpass filter 16B2 having the configuration described above, the image sensor 100 receives the light beams of substantially four wavelength ranges. That is, the light beam transmitted through the second bandpass filter 16B2 is the light beam of one type of the wavelength range λ2, but it is substantially separated into two types of the wavelength ranges by the first spectral filter element 132A and the second spectral filter element 132B. Therefore, the light beams of four types of the wavelength ranges are received together with the light beams of two wavelength ranges separated by the first bandpass filter 16B1.

Figure 23:
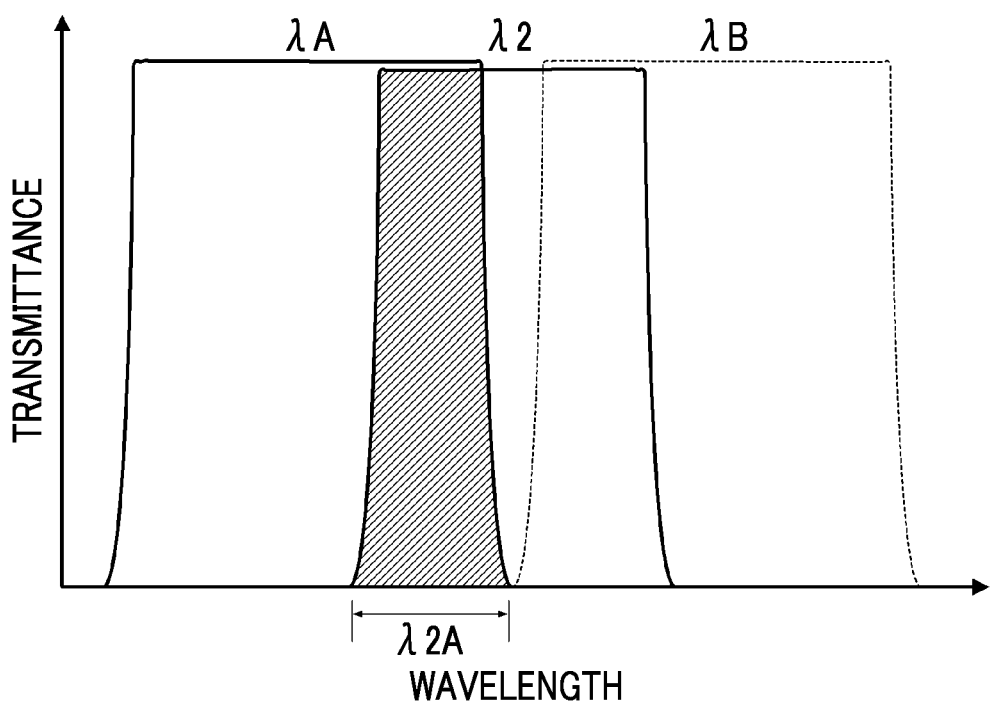
FIG. 23 is an explanatory diagram of a transmission wavelength characteristic realized by a combination of the second bandpass filter and the first spectral filter element.

FIG. 23 is an explanatory diagram of the transmission wavelength characteristic realized by a combination of the second bandpass filter and the first spectral filter element. As shown in FIG. 23, on the pixel comprising the first spectral filter element 132A, in a case in which the light beam, which passes through the second bandpass filter 16B2, is incident, the light beam of the wavelength range indicated by the diagonal line is received. That is, the light beam of the wavelength range λ2A in which the wavelength range λ2 transmitted through the second bandpass filter 16B2 and the wavelength range λA transmitted through the first spectral filter element 132A overlap with each other is received.

Figure 24:
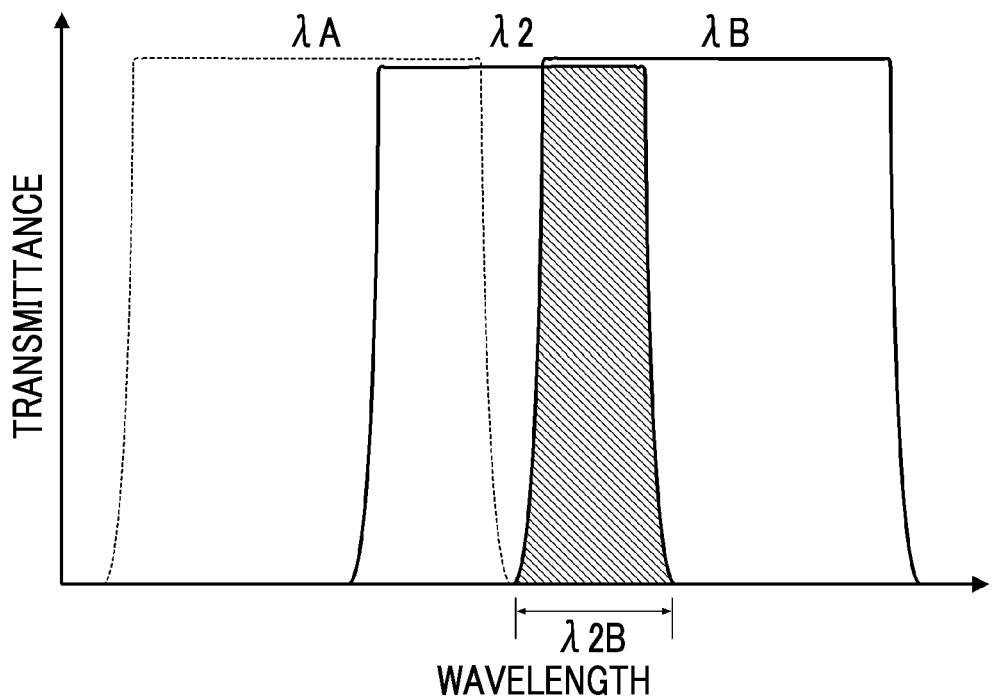
FIG. 24 is an explanatory diagram of a transmission wavelength characteristic realized by a combination of the second bandpass filter and the second spectral filter element.

FIG. 24 is an explanatory diagram of the transmission wavelength characteristic realized by a combination of the second bandpass filter and the second spectral filter element. As shown in FIG. 24, on the pixel comprising the second spectral filter element 132B, in a case in which the light beam, which passes through the second bandpass filter 16B2, is incident, the light beam of the wavelength range indicated by the diagonal line is received. That is, the light beam of the wavelength range λ2B in which the wavelength range λ2 transmitted through the second bandpass filter 16B2 and the wavelength range λB transmitted through the second spectral filter element 132B overlap with each other is received.

In this way, even in a case in which the second bandpass filter 16B2 is configured to transmit the light beam of one type of the wavelength range λ2, the first spectral filter element 132A and the second spectral filter element 132B provided in the image sensor 100 can be used to substantially separate the light beam into the light beams of two types of the wavelength ranges. In addition, with this configuration, it is possible to simplify the creation of the bandpass filter. Further, it is possible to reduce a wavelength shift that occurs in a case in which the light beam is incident on the filter obliquely.

Fifth Embodiment

In the imaging apparatus according to the first embodiment, in a case of capturing the multispectral image of four bands, one pixel block is configured by four pixels, and two types of the polarization filter elements and two types of the spectral filter elements are used in combination to change the optical characteristic of each pixel. For the polarization filter element provided in each pixel of one pixel block, the polarization filter elements having polarization characteristics different from each other can also be used. Hereinafter, in a case of capturing the multispectral image of four bands, a case will be described in which one pixel block is configured by four pixels and each pixel comprises the polarization filter element having a different transmission polarization direction. Note that the configuration is the same as that of the imaging apparatus according to the first embodiment except that the arrangement of the polarization filter elements is different. Therefore, here, only the arrangement of the polarization filter elements will be described.

Figure 25:
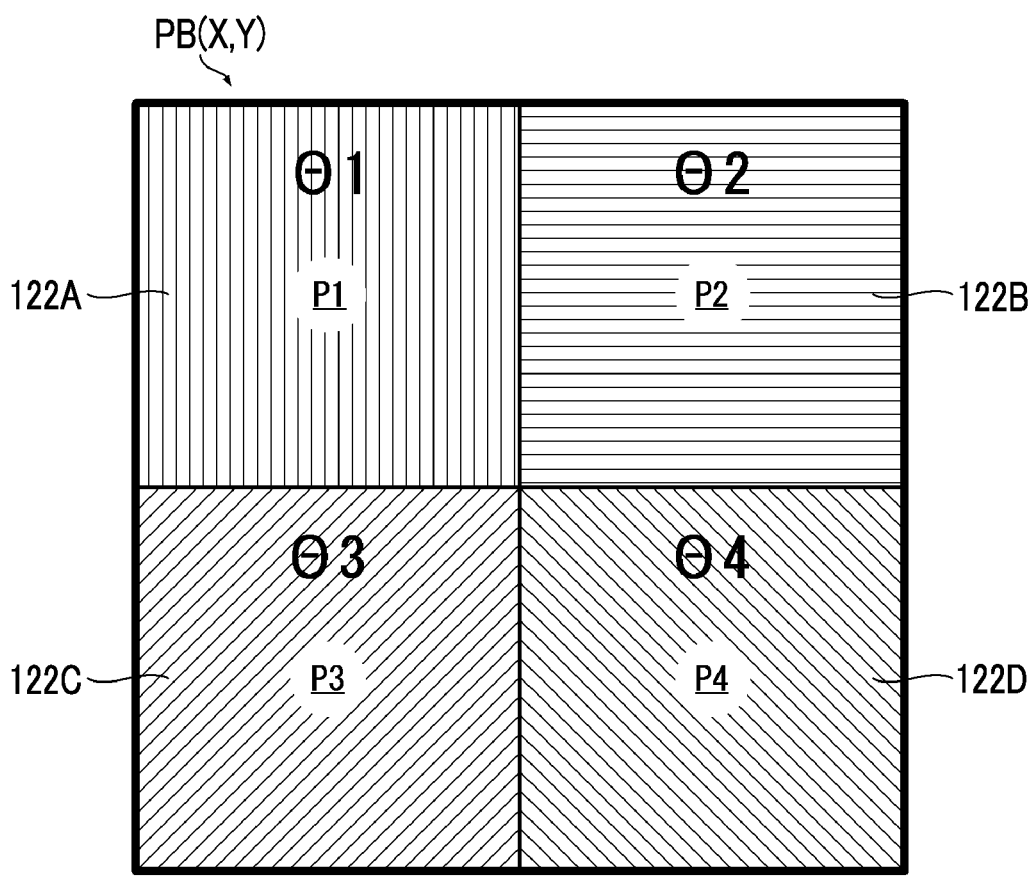
FIG. 25 is a diagram showing an example of an arrangement pattern of the polarization filter elements provided in each pixel block of the imaging apparatus according to a fifth embodiment.

FIG. 25 is a diagram showing an example of the arrangement pattern of the polarization filter elements provided in each pixel block of the imaging apparatus according to the present embodiment.

As shown in FIG. 25, in the imaging apparatus according to the present embodiment, the four pixels P1 to P4 which configure one pixel block PB (X, Y) comprise the polarization filter elements 122A to 122D having different transmission polarization directions. Specifically, the first pixel P1 comprises the first polarization filter element 122A which transmits the light beam of the first polarization direction θ1 (for example, 90°). The second pixel P2 comprises the second polarization filter element 122B which transmits the light beam of the second polarization direction θ2 (for example, 0°). The third pixel P3 comprises a third polarization filter element 122C which transmits the light beam of a third polarization direction θ3 (for example, 45°). The fourth pixel P4 comprises the fourth polarization filter element 122D which transmits the light beam of a fourth polarization direction θ4 (for example, 135°).

Note that the number of aperture regions provided in the bandpass filter unit can be set to be equal to or less than the number of the transmission polarization directions of the image sensor (equal to or less than the number of types of the polarization filter elements provided in the image sensor). In this case, it is possible to increase the aperture size as much as possible by setting the number of transmission wavelength ranges set in each aperture region to be the same as the number of transmission wavelength ranges of the image sensor. In addition, as a result, the sensitivity can be improved.

Sixth Embodiment

The imaging apparatus according to the present embodiment captures a multispectral image of nine bands. The configuration is the same as that of the imaging apparatus according to the first embodiment (see FIG. 1) in that imaging apparatus comprises the imaging optical system 10, the image sensor 100, and the signal processing unit 200.

[Imaging Optical System]

The imaging optical system 10 of imaging apparatus according to the present embodiment has different configurations of the bandpass filter unit 16 and the polarization filter unit 18 from that of the imaging optical system according to the first embodiment.

Figure 26:
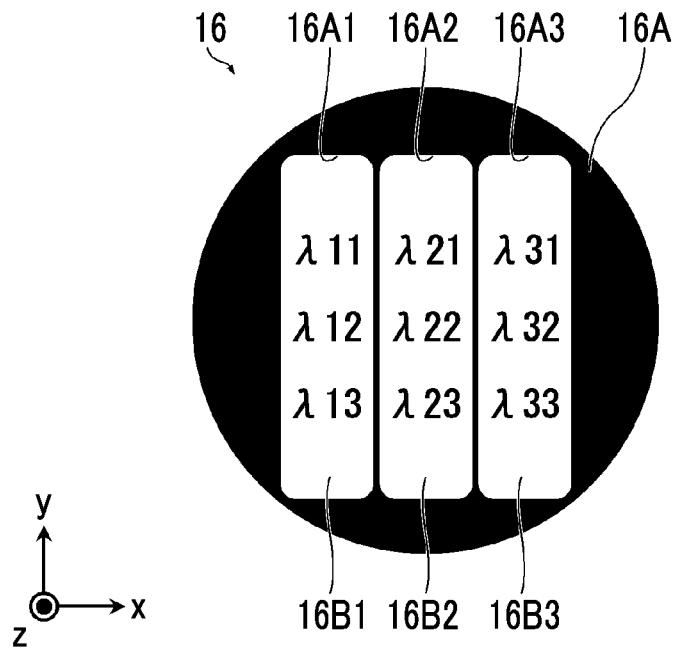
FIG. 26 is a front view of the bandpass filter unit provided in the imaging optical system according to a sixth embodiment.

FIG. 26 is a front view of the bandpass filter unit provided in the imaging optical system according to the present embodiment.

The bandpass filter unit 16 has the three aperture regions 16A1, 16A2, and 16A3 in the frame 16A. Hereinafter, if necessary, the aperture regions 16A1 to 16A3 are distinguished from each other by referring the aperture region 16A1 to as the first aperture region 16A1, referring the aperture region 16A2 to as the second aperture region 16A2, and referring the aperture region 16A3 to as the third aperture region 16A3.

The aperture regions 16A1 to 16A3 have the same aperture shape (rectangular shape) and are disposed symmetrically with respect to the optical axis L. Specifically, the second aperture region 16A2 is disposed on the optical axis, and the first aperture region 16A1 and the third aperture region 16A3 are disposed symmetrically with the second aperture region 16A2 interposed therebetween.

The bandpass filters 16B1 to 16B3 having different transmission wavelength characteristics are provided in the aperture regions 16A1 to 16A3, respectively. Hereinafter, if necessary, the bandpass filters 16B1 to 16B3 are distinguished from each other by referring the bandpass filter 16B1 provided in the first aperture region 16A1 to as a first bandpass filter 16B1, referring the bandpass filter 16B2 provided in the second aperture region 16A2 to as the second bandpass filter 16B2, and referring the bandpass filter 16B3 provided in the third aperture region 16A3 to as the third bandpass filter 16B3.

Figure 27:
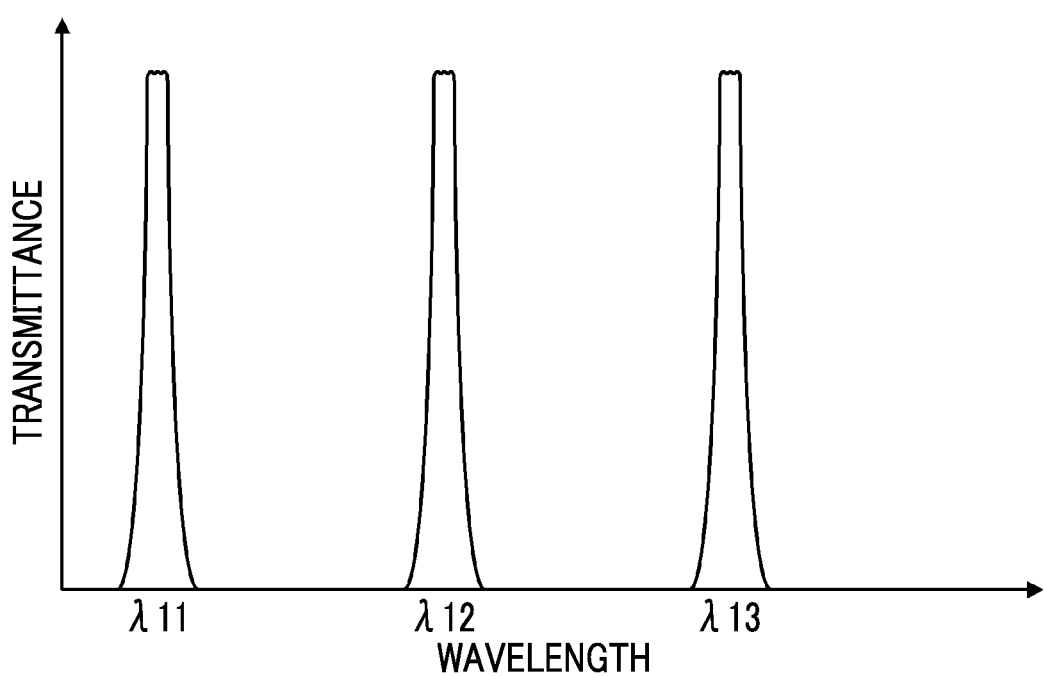
FIG. 27 is a graph showing the transmission wavelength characteristic of the first bandpass filter.

FIG. 27 is a graph showing the transmission wavelength characteristic of the first bandpass filter.

As shown in FIG. 27, the first bandpass filter 16B1 is configured by the multi-bandpass filters, which transmit the light beams of three types of the wavelength ranges. Specifically, the light beam of the wavelength range 11, the light beam of the wavelength range λ12, and the light beam of a wavelength range λ13 are transmitted.

Figure 28:
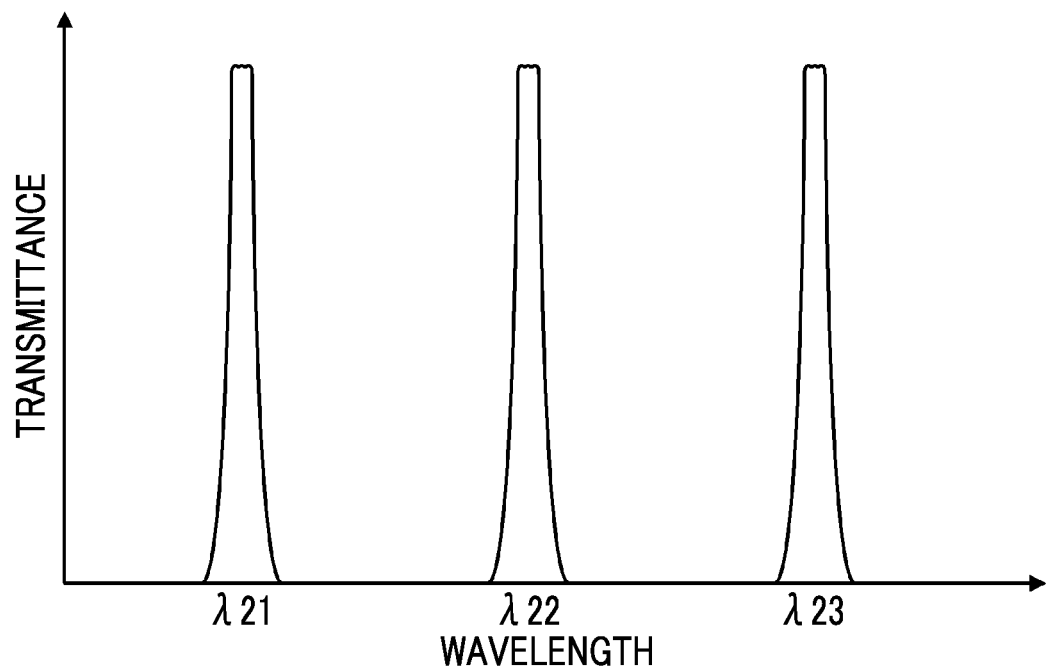
FIG. 28 is a graph showing the transmission wavelength characteristic of the second bandpass filter.

FIG. 28 is a graph showing the transmission wavelength characteristic of the second bandpass filter.

As shown in FIG. 28, the second bandpass filter 16B2 is also configured by the multi-bandpass filters, which transmit the light beams of three types of the wavelength ranges. Specifically, the light beam of the wavelength range λ21, the light beam of the wavelength range λ22, and the light beam of a wavelength range λ23 are transmitted.

Figure 29:
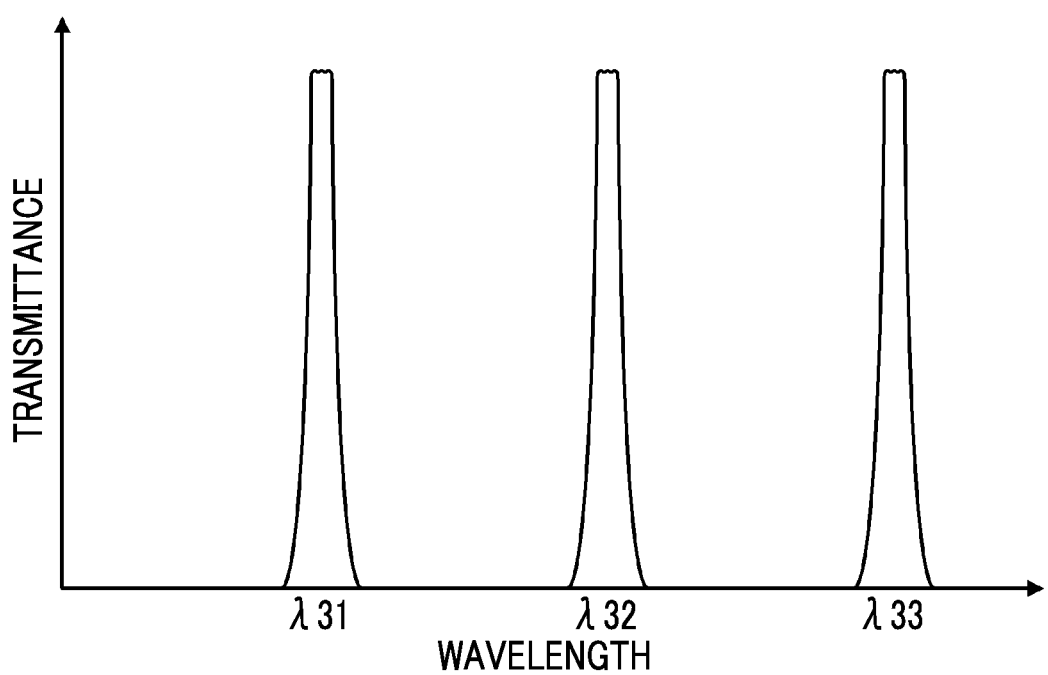
FIG. 29 is a graph showing the transmission wavelength characteristic of the third bandpass filter.

FIG. 29 is a graph showing the transmission wavelength characteristic of the third bandpass filter.

As shown in FIG. 29, the third bandpass filter 16B3 is also configured by the multi-bandpass filters, which transmit the light beams of three types of the wavelength ranges. Specifically, the light beam of a wavelength range λ31, the light beam of a wavelength range λ32, and the light beam of a wavelength range λ33 are transmitted.

Figure 30:
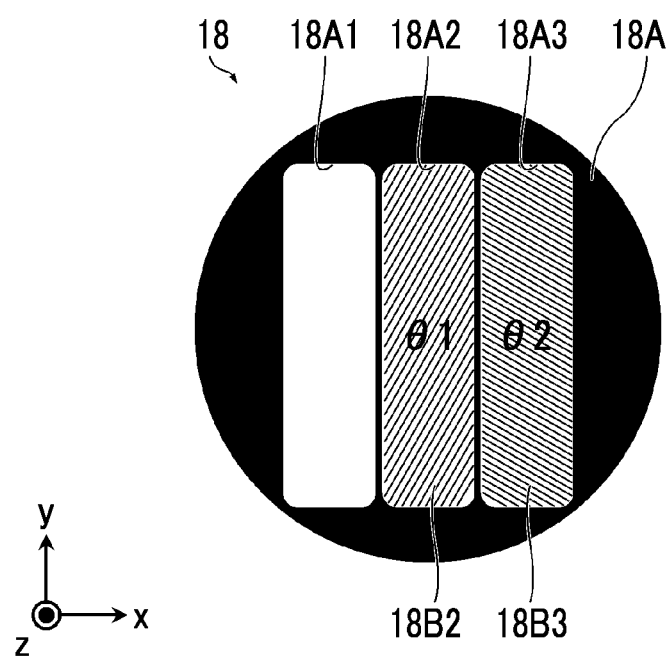
FIG. 30 is a front view of the polarization filter unit provided in the imaging optical system according to the sixth embodiment.

FIG. 30 is a front view of the polarization filter unit provided in the imaging optical system according to the present embodiment.

As shown in FIG. 30, the polarization filter unit 18 has the three aperture regions 18A1, 18A2, and 18A3 in the frame 18A. Hereinafter, if necessary, the aperture regions 18A1 to 18A3 are distinguished from each other by referring the aperture region 18A1 to as the first aperture region 18A1, referring the aperture region 18A2 to as the second aperture region 18A2, and referring the aperture region 18A3 to as the third aperture region 18A3.

The three aperture regions 18A1, 18A2, and 18A3 correspond to the three aperture regions 16A1, 16A2, and 16A3 of the bandpass filter unit 16 and are disposed so as to overlap with the aperture regions 16A1, 16A2, and 16A3 at the same position. That is, the first aperture region 18A1 has the same aperture shape as the first aperture region 16A1 of the bandpass filter unit 16 and is disposed so as to overlap with the first aperture region 16A1 at the same position. In addition, the second aperture region 18A2 has the same aperture shape as the second aperture region 16A2 of the bandpass filter unit 16 and is disposed so as to overlap with the second aperture region 16A2 at the same position. In addition, the third aperture region 18A3 has the same aperture shape as the third aperture region 16A3 of the bandpass filter unit 16 and is disposed so as to overlap with the third aperture region 16A3 at the same position. Therefore, the light beam, which passes through the first aperture region 16A1 of the bandpass filter unit 16, passes through the first aperture region 18A1, the light beam, which passes through the second aperture region 16A2 of the bandpass filter unit 16, passes through the second aperture region 18A2, and the light beam, which passes through the third aperture region 16A3 of the bandpass filter unit 16, passes through the third aperture region 18A3.

The polarization filters 18B2 and 18B3 having different transmission polarization directions are provided in the second aperture region 18A2 and the third aperture region 18A3, respectively. Specifically, the second aperture region 18A2 comprises the polarization filter 18B2 which allows the light beam of the polarization direction θ2 (for example, the azimuthal angle of 150°) to pass. The polarization filter 18B3 which allows the light beam of the polarization direction θ3 (for example, the azimuthal angle of 150°) to pass is provided in the third aperture region 18A3.

The polarization filter is provided only in the second aperture region 18A2 and the third aperture region 18A3. Therefore, the first aperture region 18A1 transmits the unpolarized light beam.

In the imaging optical system 10 having the configuration described above, the pupil region is split into three regions by the combination of the bandpass filter unit 16 and the polarization filter unit 18. That is, the pupil region is split into the first pupil region defined by the first aperture region 16A1 of the bandpass filter unit 16 and the first aperture region 18A1 of the polarization filter unit 18, the second pupil region defined by the second aperture region 16A2 of the bandpass filter unit 16 and the second aperture region 18A2 of the polarization filter unit 18, and a third pupil region defined by the third aperture region 16A3 of the bandpass filter unit 16 and the third aperture region 18A3 of the polarization filter unit 18. The light beams having different characteristics are emitted from the pupil regions. That is, the light beam, which is the unpolarized light beam, having the wavelength range 11 (first light beam), the light beam, which is the unpolarized light beam, having the wavelength range λ12 (second light beam), the light beam, which is the unpolarized light beam, having the wavelength range λ13 (third light beam), the light beam, which is the light beam of the polarization direction θ2, having the wavelength range λ21 (fourth light beam), the light beam, which is the light beam of the polarization direction θ2, having the wavelength range λ22 (fifth light beam), the light beam, which is the light beam of the polarization direction θ2, having the wavelength range λ23 (sixth light beam), the light beam, which is the light beam of the polarization direction θ3, having the wavelength range λ31 (seventh light beam), the light beam, which is the light beam of the polarization direction θ3, having the wavelength range λ32 (eighth light beam), and the light beam, which is the light beam of the polarization direction θ3, having the wavelength range λ33 (ninth light beam) are emitted.

[Image Sensor]

Figure 31:
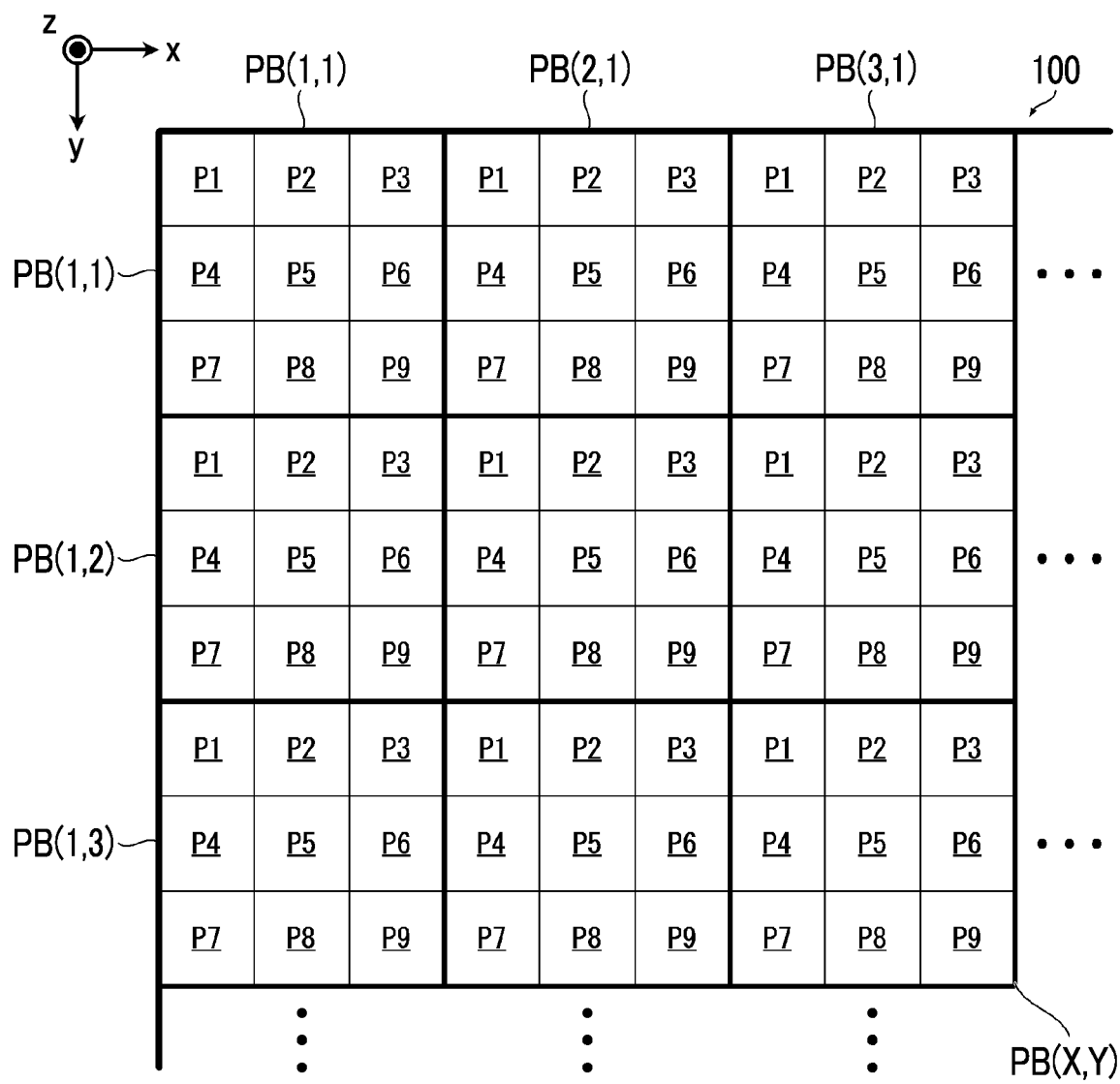
FIG. 31 is a diagram showing a schematic configuration of an arrangement of the pixels of the image sensor.

FIG. 31 is a diagram showing a schematic configuration of the arrangement of the pixels of the image sensor.

As shown in FIG. 31, in the image sensor 100 of the imaging apparatus according to the present embodiment, one pixel block PB (X, Y) is configured by nine (3×3) adjacent pixels P1 to P9. Hereinafter, if necessary, the pixels P1 to P9 are distinguished from each other by referring the pixel P1 to as the first pixel P1, referring the pixel P2 to as the second pixel P2, referring the pixel P3 to as the third pixel P3, referring the pixel P4 to as the fourth pixel P4, referring the pixel P5 to as a fifth pixel P5, referring the pixel P6 to as a sixth pixel P6, referring the pixel P7 to as a seventh pixel P7, referring the pixel P8 to as an eighth pixel P8, and referring the pixel P9 to as a ninth pixel P9.

The configuration is the same as that of the imaging apparatus according to the first embodiment (FIG. 7) in that image sensor 100 includes the pixel array layer 110, the polarization filter element array layer 120, the spectral filter element array layer 130, and the micro lens array layer 140. The image sensor 100 according to the present embodiment has different configurations of the polarization filter element array layer 120 and the spectral filter element array layer 130.

The polarization filter element array layer 120 comprises three types of the polarization filter elements 122A, 122B, and 122C having different transmission polarization directions. Hereinafter, if necessary, the polarization filter elements 122A to 122C are distinguished from each other by referring the polarization filter element 122A to as the first polarization filter element 122A, referring the polarization filter element 122B to as the second polarization filter element 122B, and referring the polarization filter element 122C to as the third polarization filter element 122C. The first polarization filter element 122A transmits the light beam of the polarization direction θ1 (for example, the azimuthal angle of 90°). The second polarization filter element 122B transmits the light beam of the polarization direction θ2 (for example, the azimuthal angle of 45°). The third polarization filter element 122C transmits the light beam of the polarization direction θ3 (for example, the azimuthal angle of 0°).

Figure 32:
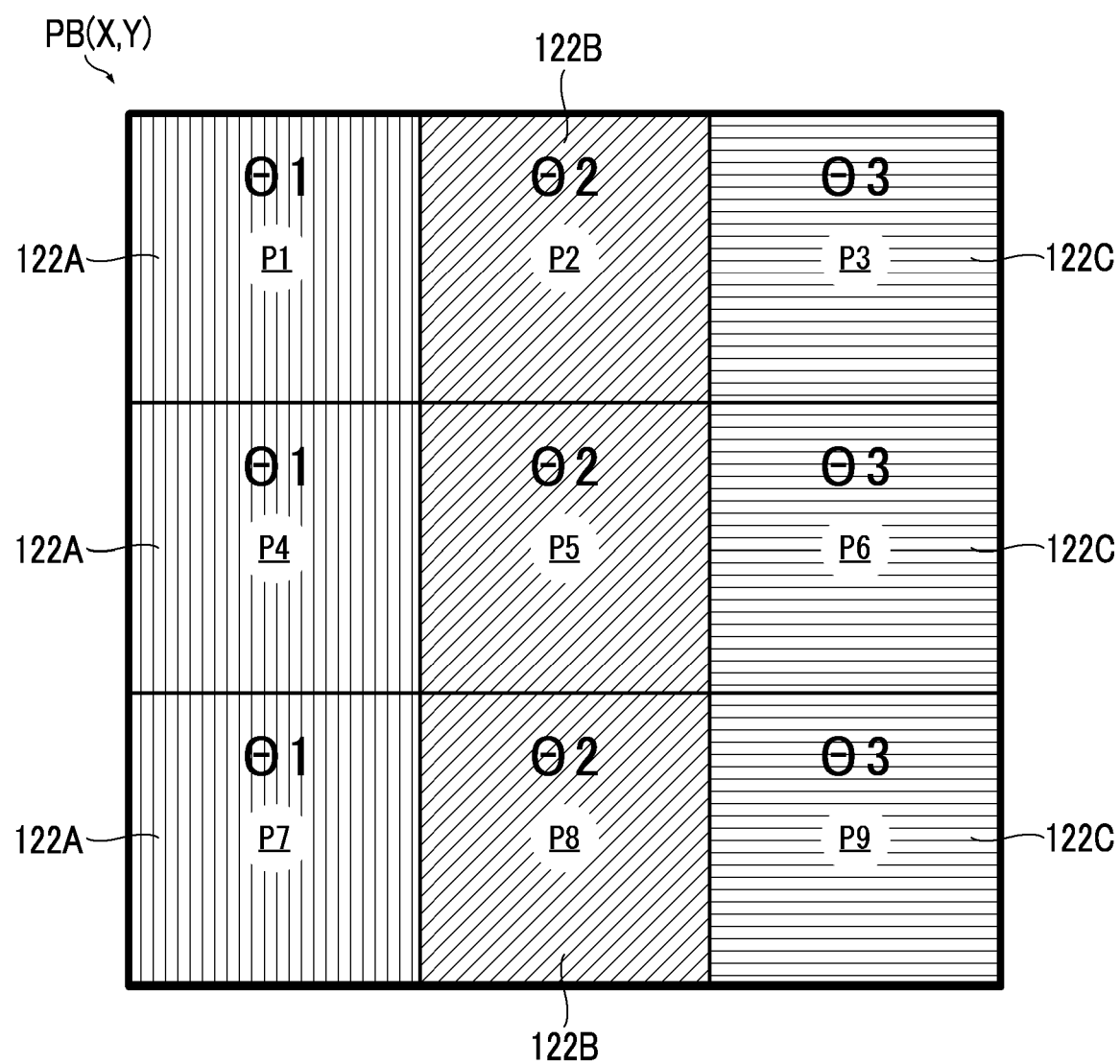
FIG. 32 is a diagram showing an example of an arrangement pattern of the polarization filter elements provided in each pixel block.

FIG. 32 is a diagram showing an example of the arrangement pattern of the polarization filter elements provided in each pixel block.

As shown in FIG. 32, the first pixel P1, the fourth pixel P4, and the seventh pixel P7 comprise the first polarization filter element 122A. In addition, the second pixel P2, the fifth pixel P5, and the eighth pixel P8 comprise the second polarization filter element 122B. In addition, the third pixel P3, the sixth pixel P6, and the ninth pixel P9 comprise the third polarization filter element 122C.

The spectral filter element array layer 130 comprises three types of the spectral filter elements 132A, 132B, and 132C having different transmission wavelength characteristics. Hereinafter, if necessary, the spectral filter elements 132A to 132C are distinguished from each other by referring the spectral filter element 132A to as the first spectral filter element 132A, referring the spectral filter element 132B to as the second spectral filter element 132B, and referring the spectral filter element 132C to as a third spectral filter element 132C.

Figure 33:
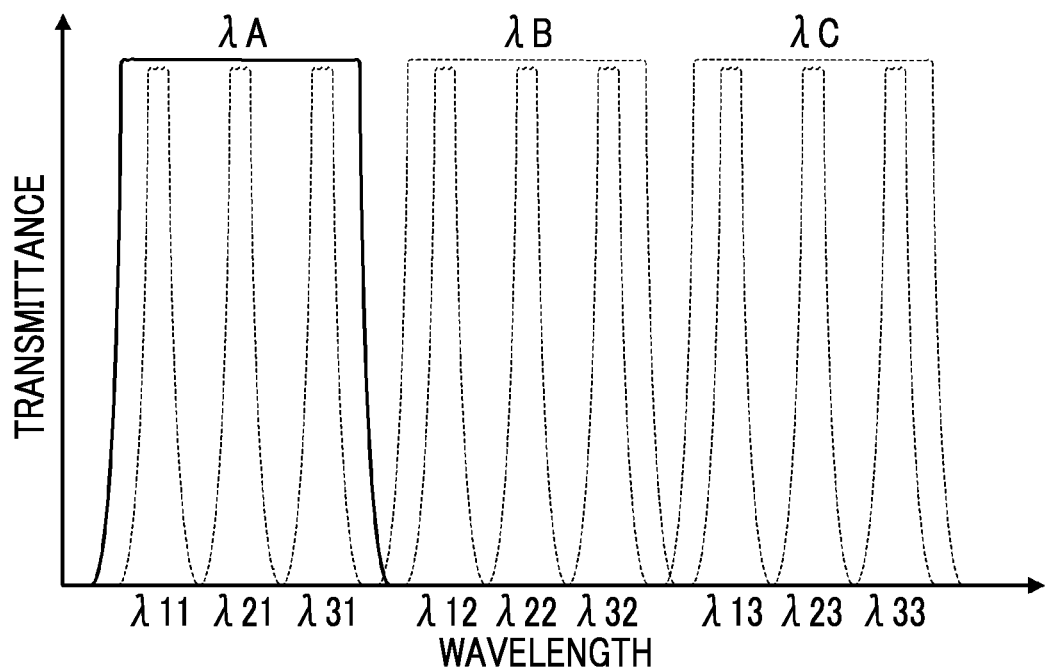
FIG. 33 is a graph showing an example of the transmission wavelength characteristic of the first spectral filter element.

FIG. 33 is a graph showing an example of the transmission wavelength characteristic of the first spectral filter element.

As shown in FIG. 33, the first spectral filter element 132A transmits the light beam of the wavelength range λA (for example, the wavelength range of red (R)). The bandpass filter unit 16 provided in the imaging optical system 10 has the wavelength range λ11 transmitted through the first bandpass filter 16B1, the wavelength range λ21 transmitted through the second bandpass filter 16B2, and the wavelength range λ31 transmitted through the third bandpass filter 16B3 are set within the range of the transmission wavelength range λA of the first spectral filter element 132A.

Figure 34:
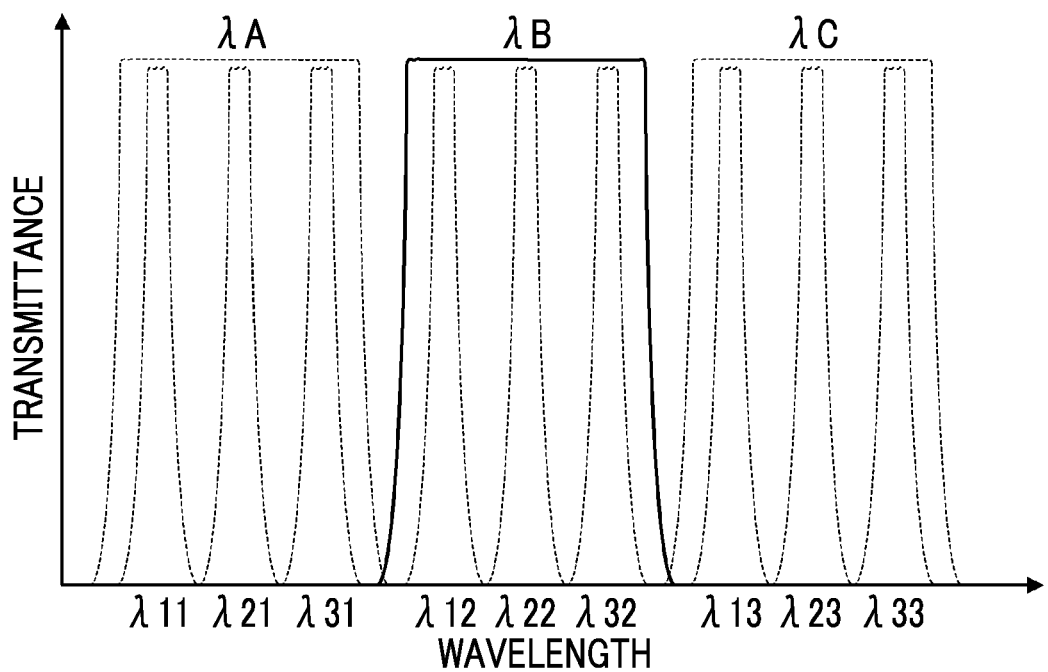
FIG. 34 is a graph showing an example of the transmission wavelength characteristic of the second spectral filter element.

FIG. 34 is a graph showing an example of the transmission wavelength characteristic of the second spectral filter element.

As shown in FIG. 34, the second spectral filter element 132B transmits the light beam of the wavelength range λB (for example, the wavelength range of green (G)). The bandpass filter unit 16 provided in the imaging optical system 10 has the wavelength range λ12 transmitted through the first bandpass filter 16B1, the wavelength range λ22 transmitted through the second bandpass filter 16B2, and the wavelength range λ32 transmitted through the third bandpass filter 16B3 are set within the range of the transmission wavelength range λB of the second spectral filter element 132B.

Figure 35:
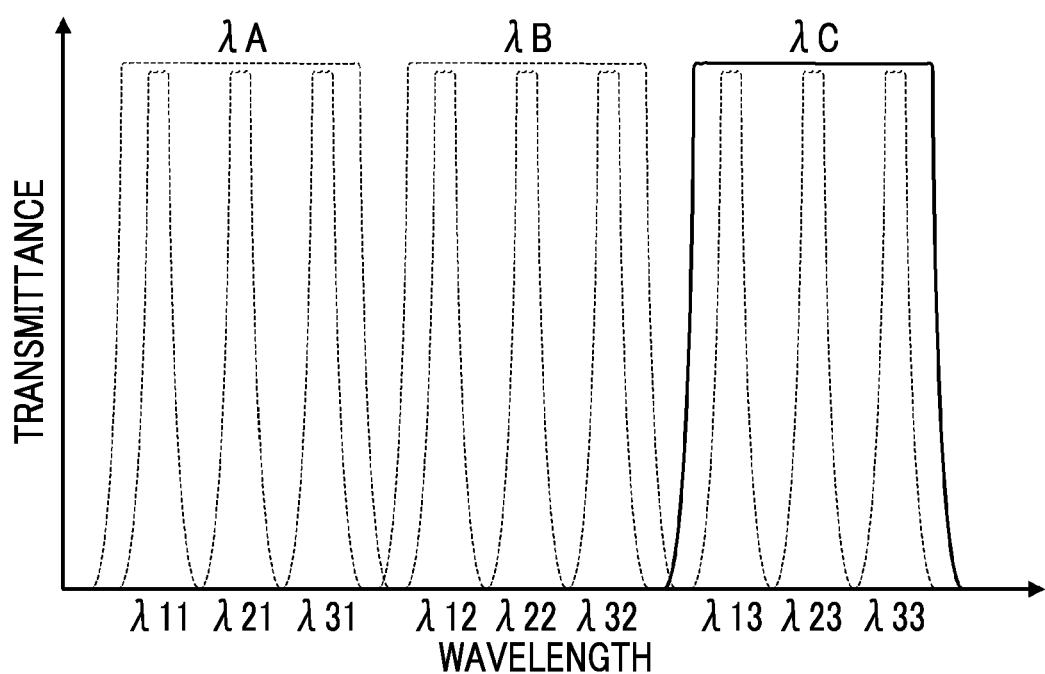
FIG. 35 is a graph showing an example of the transmission wavelength characteristic of a third spectral filter element.

FIG. 35 is a graph showing an example of the transmission wavelength characteristic of the third spectral filter element.

As shown in FIG. 35, the third spectral filter element 132C transmits the light beam of a wavelength range λC (for example, the wavelength range of blue (B)). The bandpass filter unit 16 provided in the imaging optical system 10 has the wavelength range λ13 transmitted through the first bandpass filter 16B1, the wavelength range λ23 transmitted through the second bandpass filter 16B2, and the wavelength range λ33 transmitted through the third bandpass filter 16B3 are set within a range of the transmission wavelength range λC of the third spectral filter element 132C.

Figure 36:
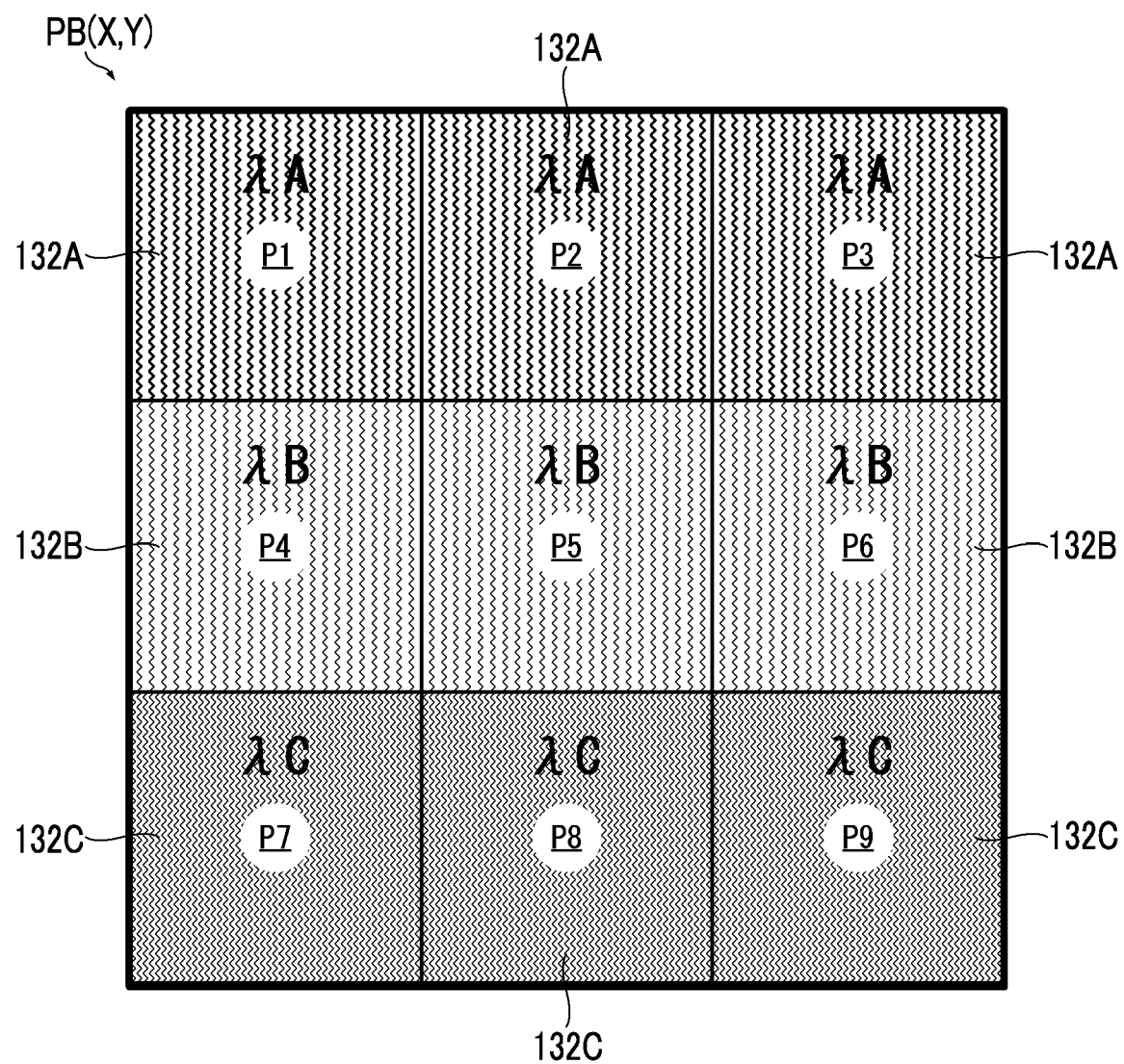
FIG. 36 is a diagram showing an example of an arrangement pattern of the spectral filter elements provided in each pixel block.

FIG. 36 is a diagram showing an example of the arrangement pattern of the spectral filter elements provided in each pixel block.

As shown in FIG. 36, the first pixel P1, the second pixel P2, and the third pixel P3 comprise the first spectral filter element 132A. In addition, the fourth pixel P4, the fifth pixel P5, and the sixth pixel P6 comprise the second spectral filter element 132B. In addition, the seventh pixel P7, the eighth pixel P8, and the ninth pixel P9 comprise the third spectral filter element 132C.

In the image sensor 100 configured as described above, in each pixel block PB (X, Y), each of the pixels P1 to P9 receives the light beam from the imaging optical system 10 as follows. That is, the first pixel P1 receives the light beams from the imaging optical system 10 via the first spectral filter element 132A and the first polarization filter element 122A. The second pixel P2 receives the light beams from the imaging optical system 10 via the first spectral filter element 132A and the second polarization filter element 122B. The third pixel P3 receives the light beams from the imaging optical system 10 via the first spectral filter element 132A and the third polarization filter element 122C. The fourth pixel P4 receives the light beams from the imaging optical system 10 via the second spectral filter element 132B and the first polarization filter element 122A. The fifth pixel P5 receives the light beams from the imaging optical system 10 via the second spectral filter element 132B and the second polarization filter element 122B. The sixth pixel P6 receives the light beams from the imaging optical system 10 via the second spectral filter element 132B and the third polarization filter element 122C. The seventh pixel P7 receives the light beams from the imaging optical system 10 via the third spectral filter element 132C and the first polarization filter element 122A. The eighth pixel P8 receives the light beams from the imaging optical system 10 via the third spectral filter element 132C and the second polarization filter element 122B. The ninth pixel P9 receives the light beams from the imaging optical system 10 via the third spectral filter element 132C and the third polarization filter element 122C. In this way, the pixels P1 to P9 of the pixel block PB (X, Y) receive the light beams having different characteristics, respectively, by having different combinations of the spectral filter elements 132A to 132C and the polarization filter elements 122A to 122C.

[Signal Processing Unit]

The signal processing unit 200 processes the signals output from the image sensor 100 to generate the image signals of the multispectral image of nine bands. That is, the image signals of nine wavelength ranges λ11, λ12, λ13, λ21, λ22, λ23, λ31, λ32, and λ33 which are transmitted through the bandpass filter unit 16 of the imaging optical system 10 are generated. The signal processing unit 200 is the same as the signal processing unit 200 according to the first embodiment in that it performs the predetermined interference removal processing to generate the image signal of each wavelength range.

[Action of Imaging Apparatus]

Figure 37:
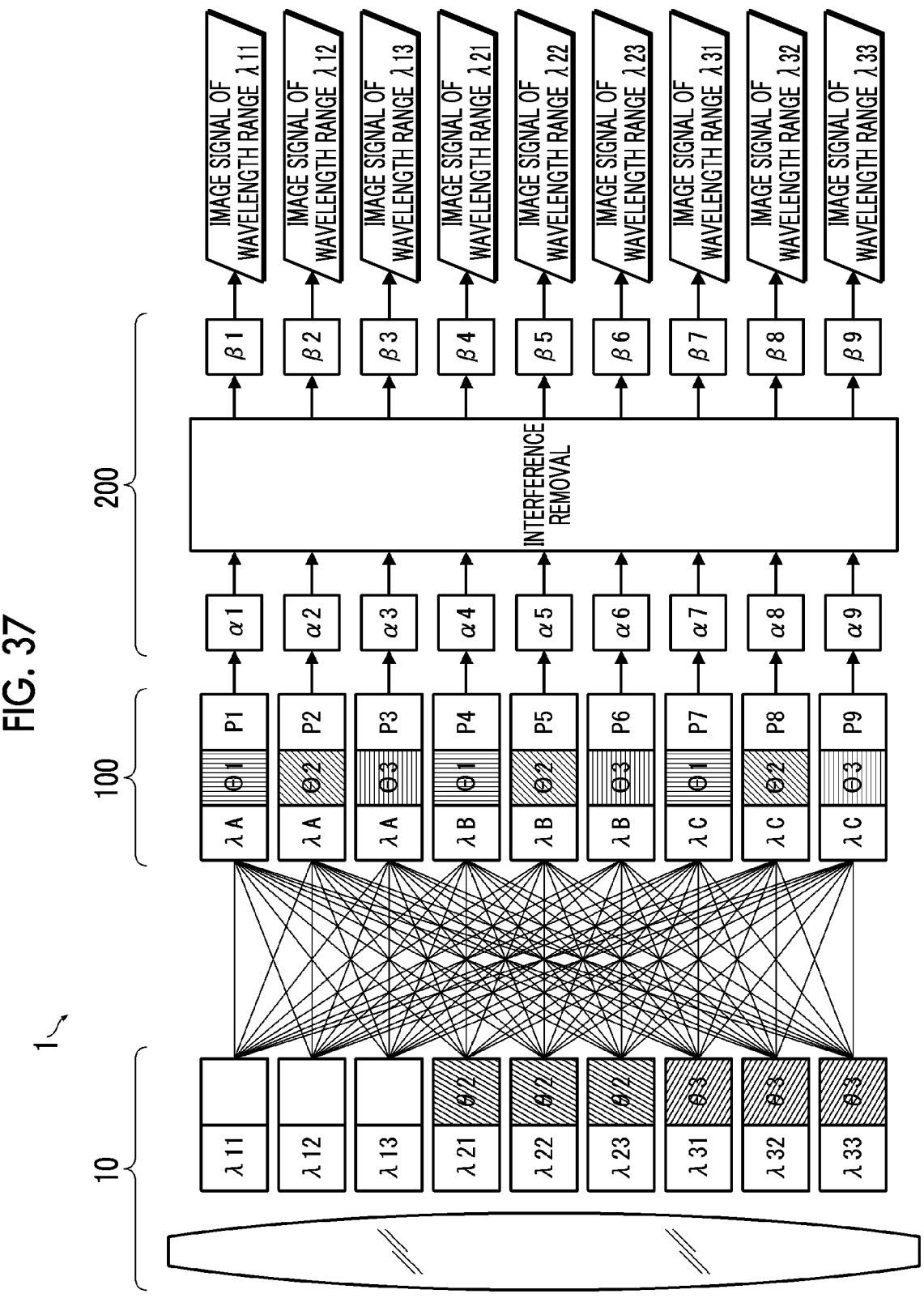
FIG. 37 is a conceptual diagram of an operation of the imaging apparatus according to the sixth embodiment.

FIG. 37 is a conceptual diagram of an operation of the imaging apparatus according to the present embodiment.

The light beams incident on the imaging optical system 10 become nine types of the light beams having different characteristics, which are incident on the image sensor 100. Specifically, the light beams become the light beam, which is the unpolarized light beam, having the wavelength range λ11 (first light beam), the light beam, which is the unpolarized light beam, having the wavelength range λ12 (second light beam), the light beam, which is the unpolarized light beam, having the wavelength range λ13 (third light beam), the light beam, which is the light beam of the polarization direction θ2, having the wavelength range λ21 (fourth light beam), the light beam, which is the light beam of the polarization direction θ2, having the wavelength range λ22 (fifth light beam), the light beam, which is the light beam of the polarization direction θ2, having the wavelength range λ23 (sixth light beam), the light beam, which is the light beam of the polarization direction θ3, having the wavelength range λ31 (seventh light beam), the light beam, which is the light beam of the polarization direction θ3, having the wavelength range λ32 (eighth light beam), and the light beam, which is the light beam of the polarization direction θ3, having the wavelength range λ33 (ninth light beam), which are incident on the image sensor 100.

In each pixel block PB (X, Y) of the image sensor 100, the light beam emitted from the imaging optical system 10 is received in each of the pixels P1 to P9 at a predetermined ratio. That is, the light beam of the wavelength range λ11, the light beam of the wavelength range λ12, the light beam of the wavelength range λ13, the light beam of the wavelength range λ21, the light beam of the wavelength range λ22, the light beam of the wavelength range λ23, the light beam of the wavelength range λ31, the light beam of the wavelength range λ32, the light beam of the wavelength range λ33 are received at a predetermined ratio.

The signal processing unit 200 calculates the pixel signals β1 to β9 corresponding to the light beams of the wavelength ranges λ11, λ12, λ13, λ21, λ22, λ23, λ31, λ32, and λ33 from the pixel signals α1 to α9 obtained from the pixels P1 to P9 of each pixel block PB (X, Y) of the image sensor 100, and generates the image signals of the wavelength ranges λ11, λ12, λ13, λ21, λ22, λ23, λ31, λ32, and λ33.

In this way, with the imaging apparatus according to the present embodiment, the multispectral image of nine bands can be captured by using one imaging optical system 10 and one image sensor 100.

[Modification Example of Bandpass Filter Unit and Polarization Filter Unit]

Figure 38:
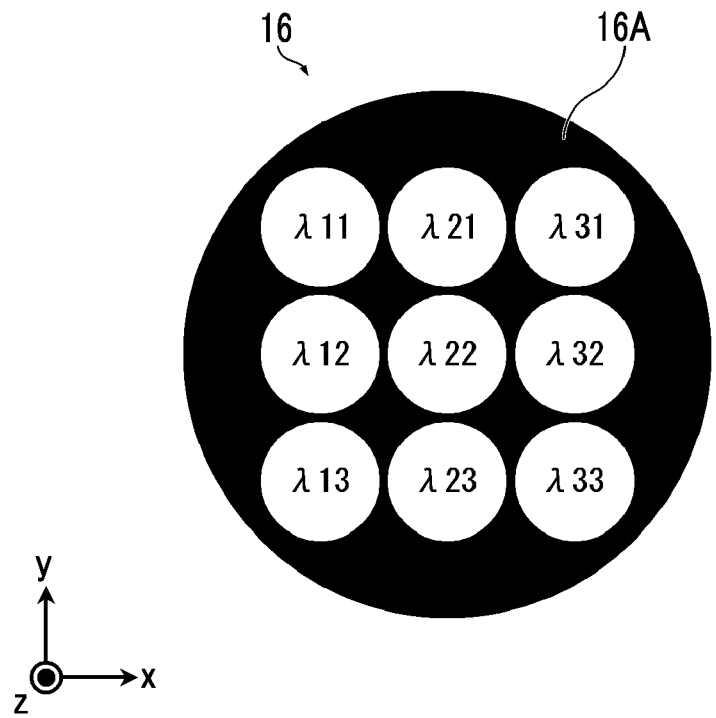
FIG. 38 is a diagram showing another example of the bandpass filter unit.
Figure 39:
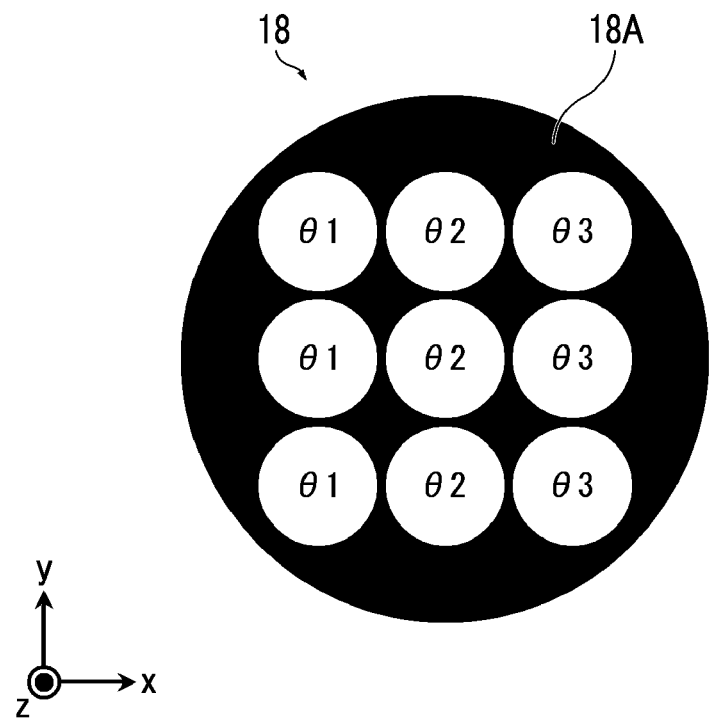
FIG. 39 is a diagram showing another example of the polarization filter unit.

FIG. 38 is a diagram showing another example of the bandpass filter unit. FIG. 39 is a diagram showing another example of the polarization filter unit.

As shown in FIG. 38, in the bandpass filter unit 16 according to the present embodiment, the frame 16A has nine aperture regions, and the bandpass filters which transmit the light beams of the wavelength ranges λ11, λ12, λ13, λ21, λ22, λ23, λ31, λ32, and λ33, are individually provided in the aperture regions. Therefore, the light beams of the wavelength ranges λ11, λ12, λ13, λ21, λ22, λ23, λ31, λ32, and λ33 are separated by passing through the aperture regions.

As shown in FIG. 39, the polarization filter unit 18 also includes the frame 18A having nine aperture regions corresponding to the bandpass filter units, and the polarization filter is provided in each aperture region. Note that in the present embodiment, three types of the polarization filters (polarization directions θ1, θ2, and θ3) having different transmission polarization directions are used in combination thereof, but one type of the polarization filter may be unpolarized (transparent).

Figure 40:
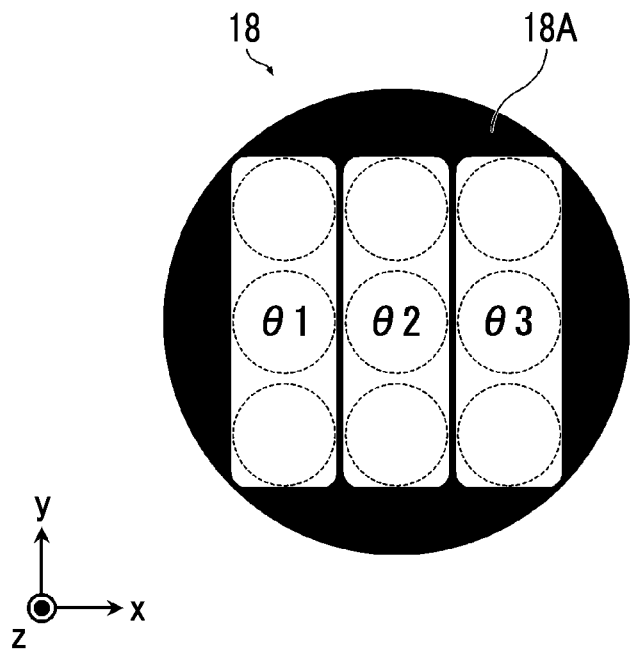
FIG. 40 is a diagram showing still another example of the polarization filter unit.

FIG. 40 is a diagram showing still another example of the polarization filter unit.

The polarization filter unit 18 according to the present embodiment is a combination of the polarization filter unit shown in FIG. 39 in which the aperture regions having the same polarization characteristic are combined into one. In this way, it is possible to easily create the filter by combining the aperture regions having the same polarization characteristics into one. Note that in this case, the aperture shape (shape seen through as the aperture region (shape shown by the broken line)) in a case of overlapping with the bandpass filter unit 16 is substantially the shape of the aperture region (pupil region).

Figure 41:
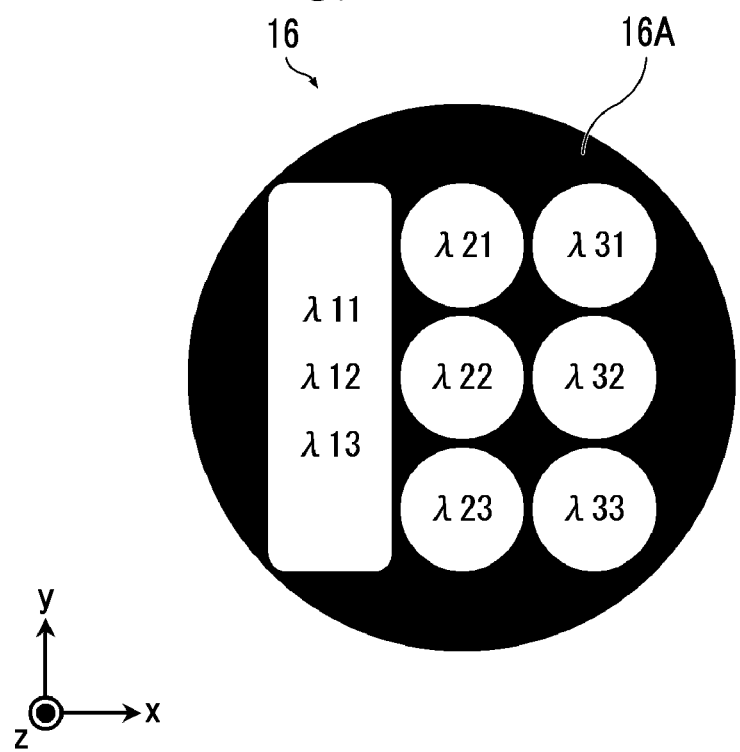
FIG. 41 is a diagram showing still another example of the bandpass filter unit.
Figure 42:
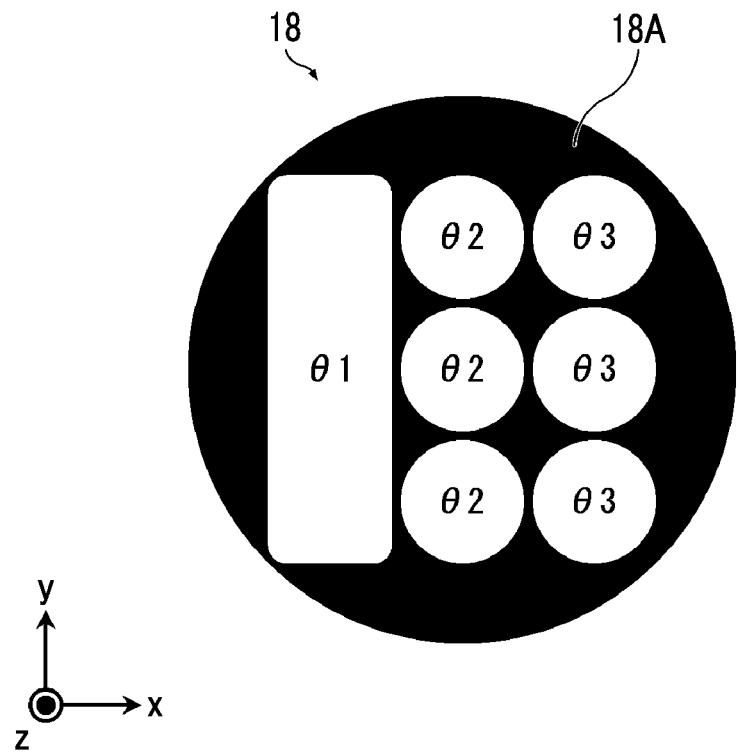
FIG. 42 is a diagram showing still another example of the polarization filter unit.

FIG. 41 is a diagram showing still another example of the bandpass filter unit. FIG. 42 is a diagram showing still another example of the polarization filter unit.

As shown in FIG. 41, in the bandpass filter unit 16 according to the present embodiment, the frame 16A has seven aperture regions. One of the seven aperture regions comprises a multi-bandpass filter to transmit the light beams of three types of wavelength ranges λ11, λ12, and λ13. The bandpass filters which transmit the light beams of one type of the wavelength ranges λ21, λ22, λ23, λ31, λ32, and λ33 are provided in the remaining aperture regions, respectively.

As shown in FIG. 42, the polarization filter unit 18 also has the frame 18A having seven aperture regions corresponding to the bandpass filter units. The polarization filters (polarization directions θ1, θ2, and θ3) are provided in the aperture regions.

As in the present embodiment, it is possible to increase the aperture size by appropriately using the multi-bandpass filter. As a result, the sensitivity can be improved.

Figure 43:
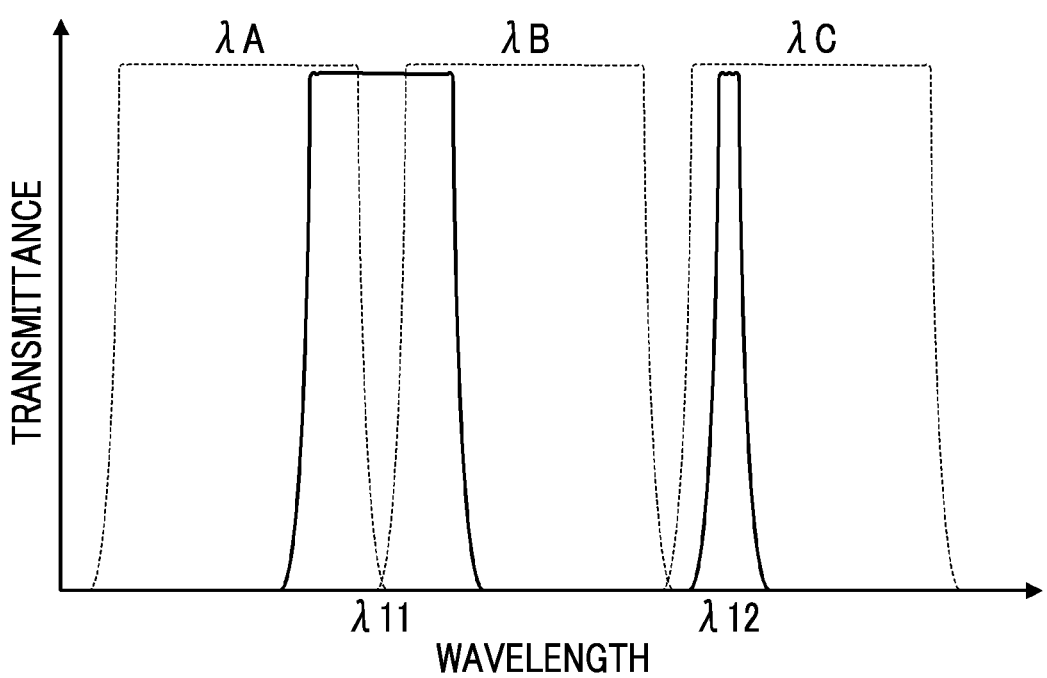
FIG. 43 is a graph showing another example of the transmission wavelength characteristic set in the first bandpass filter.
Figure 44:
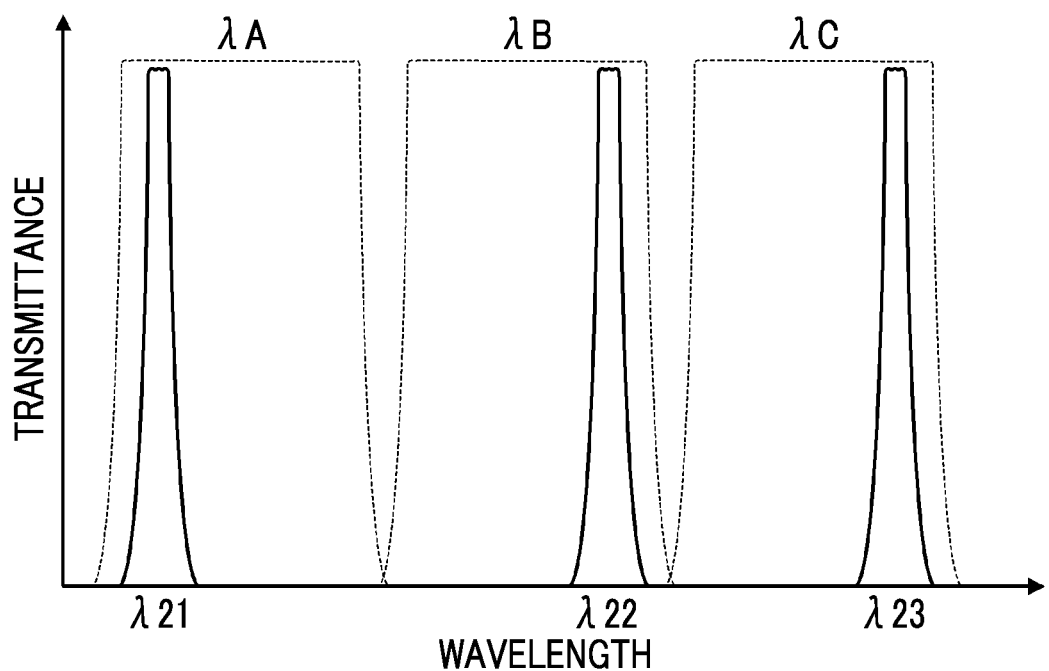
FIG. 44 is a graph showing another example of the transmission wavelength characteristic set in the second bandpass filter.
Figure 45:
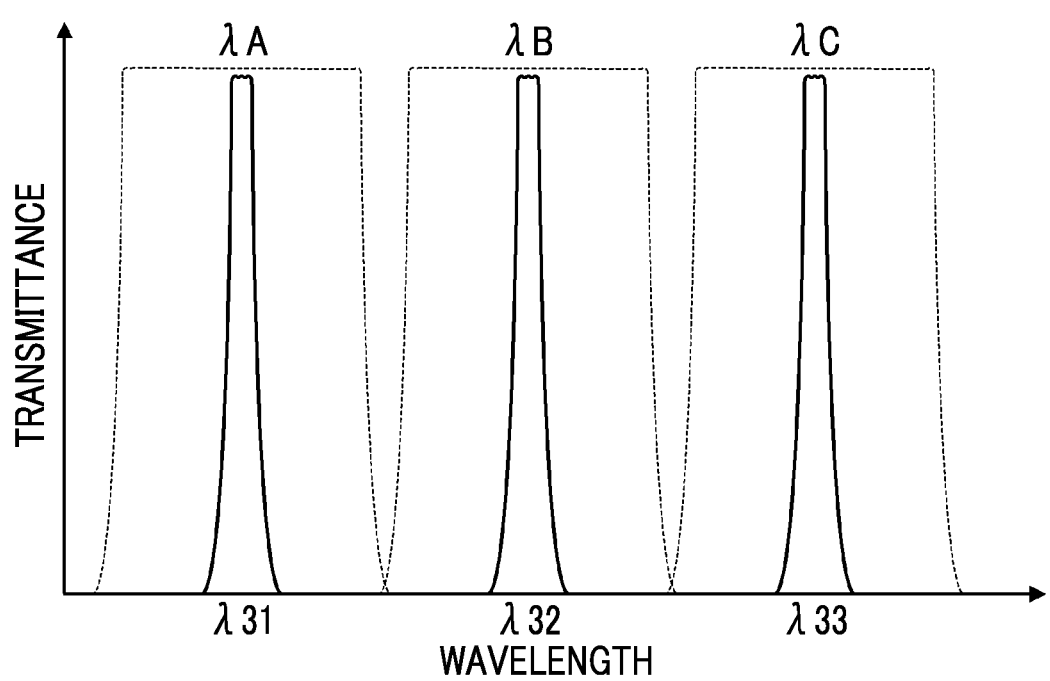
FIG. 45 is a graph showing still another example of the transmission wavelength characteristic set in the third bandpass filter.

FIGS. 43 to 45 are graphs showing another examples (modification examples) of the transmission wavelength characteristics set in the bandpass filters of the bandpass filter unit. Note that FIG. 43 is the graph showing another example of the transmission wavelength characteristic set in the first bandpass filter. In addition, FIG. 44 is the graph showing another example of the transmission wavelength characteristic set in the second bandpass filter. In addition, FIG. 45 is the graph showing still another example of the transmission wavelength characteristic set in the third bandpass filter.

As shown in FIG. 43, the first bandpass filter transmits the light beams of two types of the wavelength ranges λ11 and λ12. Here, one wavelength range λ11 is set across between the transmission wavelength ranges λA and λB of the first spectral filter element 132A and the second spectral filter element 132B provided in the image sensor 100. Stated another way, a part of the wavelength range is set to overlap with the transmission wavelength range λA of the first spectral filter element 132A and the transmission wavelength range λB of the second spectral filter element 132B. The other wavelength range λ12 is set within the range of the transmission wavelength range λC of the third spectral filter element 132C provided in the image sensor 100.

As shown in FIG. 44, the second bandpass filter transmits the light beams of three types of the wavelength ranges λ21, λ22, and λ23. Here, the wavelength range λ21 is set within the range of the transmission wavelength range λA of the first spectral filter element 132A provided in the image sensor 100. In addition, the wavelength range λ22 is set within the range of the transmission wavelength range λB of the second spectral filter element 132B provided in the image sensor 100. In addition, the wavelength range λ23 is set within the range of the transmission wavelength range λC of the third spectral filter element 132C provided in the image sensor 100.

As shown in FIG. 45, the third bandpass filter transmits the light beams of three types of the wavelength ranges λ31, λ32, and λ33. Here, the wavelength range λ31 is set within the range of the transmission wavelength range λA of the first spectral filter element 132A provided in the image sensor 100. In addition, the wavelength range λ32 is set within the range of the transmission wavelength range λB of the second spectral filter element 132B provided in the image sensor 100. In addition, the wavelength range λ33 is set within the range of the transmission wavelength range λC of the third spectral filter element 132C provided in the image sensor 100.

According to the bandpass filter unit having the configuration described above, in the imaging optical system, the light beams of eight types of the wavelength ranges λ11, λ12, λ21, λ22, λ23, λ31, λ32, and λ33 are separated. However, the image sensor can receive the light beams of substantially nine types of the wavelength ranges. That is, the light beams of the wavelength range λ11 separated by the first bandpass filter are substantially separated into two wavelength ranges by the first spectral filter element 132A and the second spectral filter element 132B. Therefore, the image sensor can receive the light beams of substantially nine types of the wavelength ranges.

Seventh Embodiment

The imaging apparatus according to the present embodiment captures a multispectral image of twelve bands. Note that the configuration is the same as that of the imaging apparatus according to the first embodiment (see FIG. 1) in that imaging apparatus comprises the imaging optical system 10, the image sensor 100, and the signal processing unit 200.

[Imaging Optical System]

The imaging optical system of imaging apparatus according to the present embodiment has different configurations of the bandpass filter unit 16 and the polarization filter unit 18 from that of the imaging optical system 10 of an imaging apparatus 1 according to the first embodiment.

Figure 46:
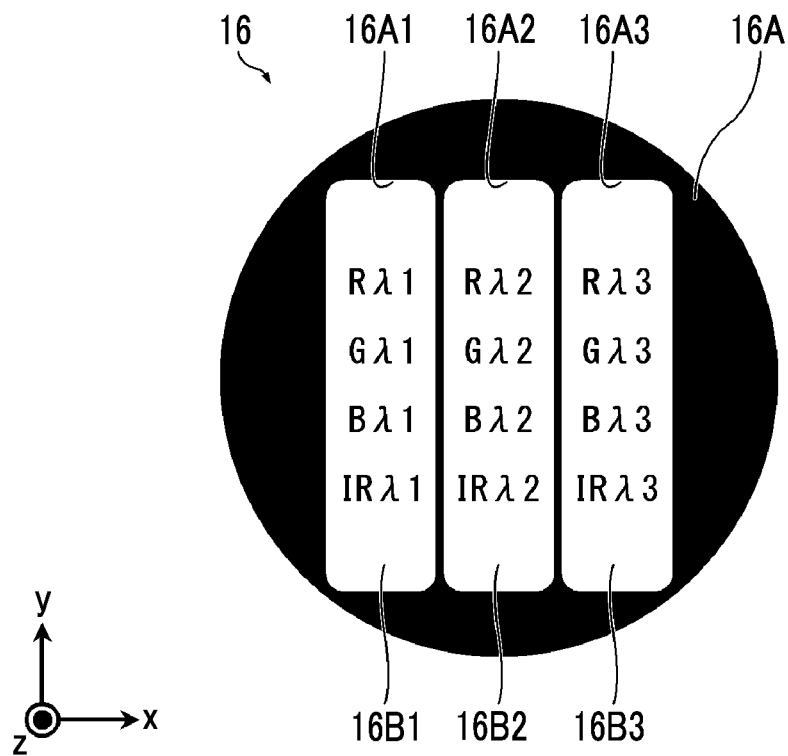
FIG. 46 is a front view of the bandpass filter unit provided in the imaging optical system according to a seventh embodiment.

FIG. 46 is a front view of the bandpass filter unit provided in the imaging optical system according to the present embodiment.

The bandpass filter unit 16 has the three aperture regions (first aperture region 16A1, second aperture region 16A2, and third aperture region 16A3) in the frame 16A. The bandpass filters (first bandpass filter 16B1, second bandpass filter 16B2, third bandpass filter 16B3) having different transmission wavelength characteristics are provided in the aperture regions 16A1 to 16A3, respectively. Each of the bandpass filters 16B1 to 16B3 is configured by the multi-bandpass filter, and transmits the light beams of four types of the wavelength ranges different from each other. Specifically, the first bandpass filter 16B1 transmits the light beams of wavelength ranges Rλ1, Gλ1, Bλ1, and IRλ1. The second bandpass filter 16B2 transmits the light beams of wavelength ranges Rλ2, Gλ2, Bλ2, and IRλ2. The third bandpass filter 16B3 transmits the light beams of wavelength ranges Rλ3, Gλ3, Bλ3, and IRλ3.

Figure 47:
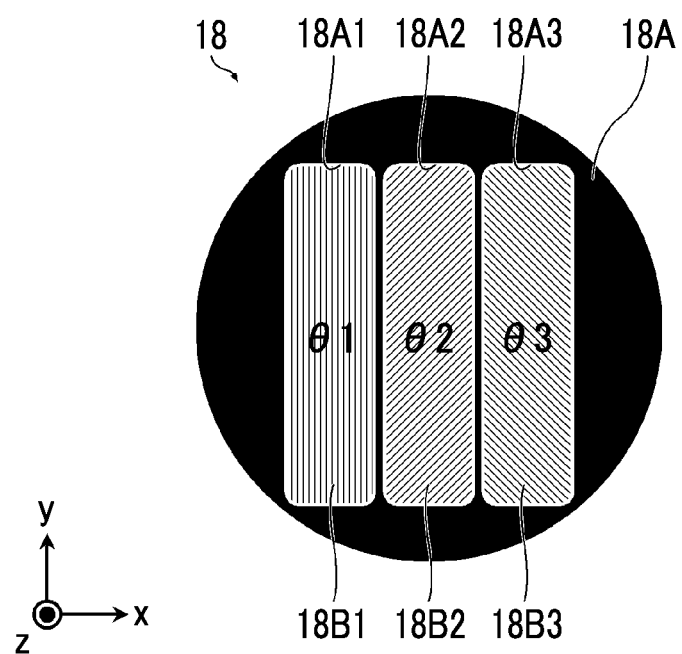
FIG. 47 is a front view of the polarization filter unit provided in the imaging optical system according to the seventh embodiment.

FIG. 47 is a front view of the polarization filter unit provided in the imaging optical system according to the present embodiment.

As shown in FIG. 47, the polarization filter unit 18 has three aperture regions (first aperture region 18A1, second aperture region 18A2, and third aperture region 18A3) in the frame 18A. The polarization filters (first polarization filter 18B1, second polarization filter 18B2, third polarization filter 18B3) having different transmission polarization directions are provided in the aperture regions 18A1 to 18A3, respectively. Specifically, the first polarization filter 18B1 transmits the light beam of the polarization direction θ1. The second polarization filter 18B2 transmits the light beam of the polarization direction θ2. The third polarization filter 18B3 transmits the light beam of the polarization direction θ3.

From the imaging optical system having the configuration described above, twelve types of the light beams having different characteristics are emitted. That is, the light beam, which is the light beam of the polarization direction θ1, having the wavelength range Rλ1 (first light beam), the light beam, which is the light beam of the polarization direction θ1, having the wavelength range Gλ1 (second light beam), the light beam, which is the light beam of the polarization direction θ1, having the wavelength range Bλ1 (third light beam), the light beam, which is the light beam of the polarization direction θ1, having the wavelength range IRλ1 (fourth light beam), the light beam, which is the light beam of the polarization direction θ2, having the wavelength range Rλ2 (fifth light beam), the light beam, which is the light beam of the polarization direction θ2, having the wavelength range Gλ2 (sixth light beam), the light beam, which is the light beam of the polarization direction θ2, having the wavelength range Bλ2 (seventh light beam), the light beam, which is the light beam of the polarization direction θ2, having the wavelength range IRλ2 (eighth light beam), the light beam, which is the light beam of the polarization direction θ3, having the wavelength range Rλ3 (ninth light beam), the light beam, which is the light beam of the polarization direction θ3, having the wavelength range Gλ3 (tenth light beam), the light beam, which is the light beam of the polarization direction θ3, having the wavelength range Bλ3 (eleventh light beam), and the light beam, which is the light beam of the polarization direction θ3, having the wavelength range IRλ3 (twelfth light beam) are emitted.

[Image Sensor]

Figure 48:
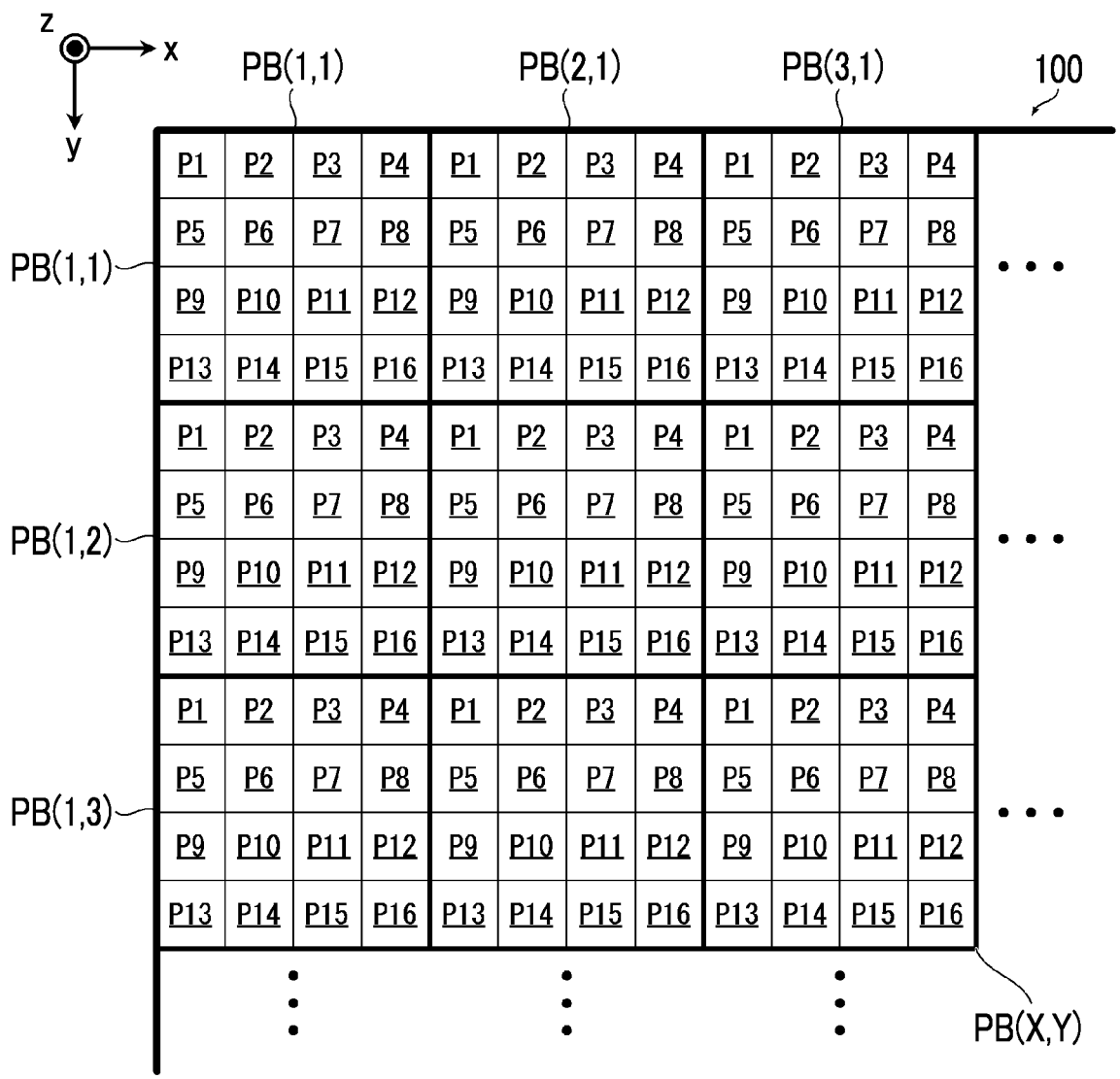
FIG. 48 is a diagram showing a schematic configuration of an arrangement of the pixels of the image sensor.

FIG. 48 is a diagram showing a schematic configuration of the arrangement of the pixels of the image sensor.

As shown in FIG. 48, in the image sensor 100 according to the present embodiment, one pixel block PB (X, Y) is configured by 16 (4×4) adjacent pixels P1 to P16. Hereinafter, if necessary, the pixels P1 to P16 are distinguished from each other by referring the pixel P1 to as the first pixel P1, referring the pixel P2 to as the second pixel P2, referring the pixel P3 to as the third pixel P3, referring the pixel P4 to as the fourth pixel P4, referring the pixel P5 to as the fifth pixel P5, referring the pixel P6 to as the sixth pixel P6, referring the pixel P7 to as the seventh pixel P7, referring the pixel P8 to as the eighth pixel P8, referring the pixel P9 to as the ninth pixel P9, referring the pixel P10 to as a tenth pixel P10, referring the pixel P11 to as an eleventh pixel P11, referring the pixel P12 to as a twelfth pixel P12, referring the pixel P13 to as a thirteenth pixel P13, referring the pixel P14 to as a fourteenth pixel P14, referring the pixel P15 to as a fifteenth pixel P15, and referring the pixel P16 to as a sixteenth pixel P16.

The configuration is the same as that of the imaging apparatus according to the first embodiment (FIG. 7) in that image sensor 100 includes the pixel array layer 110, the polarization filter element array layer 120, the spectral filter element array layer 130, and the micro lens array layer 140. The image sensor 100 according to the present embodiment has different configurations of the polarization filter element array layer 120 and the spectral filter element array layer 130.

The polarization filter element array layer 120 comprises four types of the polarization filter elements (first polarization filter element 122A, second polarization filter element 122B, third polarization filter element 122C, fourth polarization filter element 122D) having different transmission polarization directions. Specifically, the first polarization filter element 122A transmits the light beam of the polarization direction θ1 (for example, the azimuthal angle of) 45°. The second polarization filter element 122B transmits the light beam of the polarization direction θ2 (for example, the azimuthal angle of 90°). The third polarization filter element 122C transmits the light beam of the polarization direction θ3 (for example, the azimuthal angle of 135°). The fourth polarization filter element 122D transmits the light beam of the polarization direction θ4 (for example, the azimuthal angle of 0°).

Figure 49:
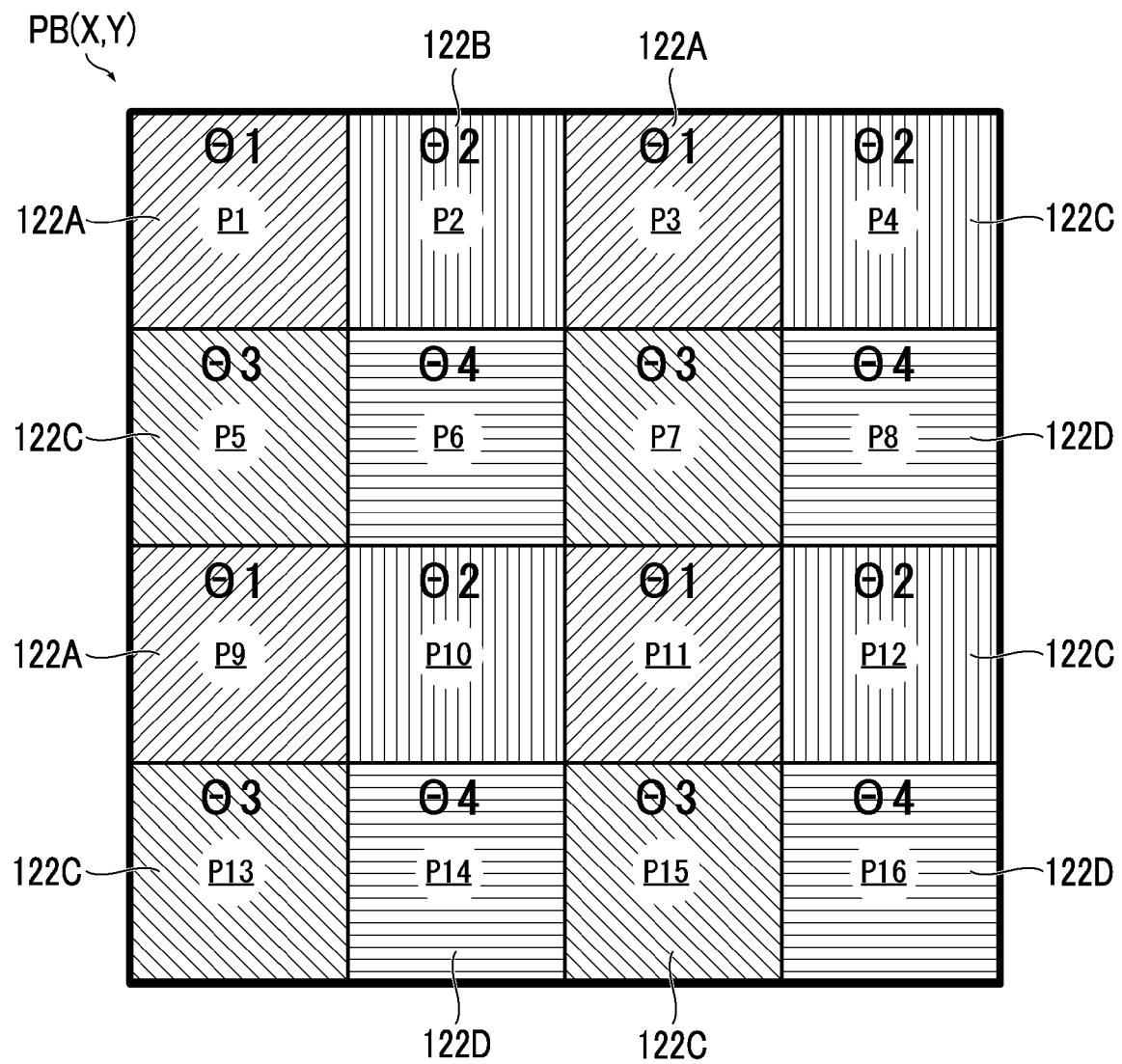
FIG. 49 is a diagram showing an example of an arrangement pattern of the polarization filter elements provided in each pixel block.

FIG. 49 is a diagram showing an example of the arrangement pattern of the polarization filter elements provided in each pixel block.

As shown in FIG. 49, the first pixel P1, the third pixel P3, the ninth pixel P9, and the eleventh pixel P11 comprise the first polarization filter element 122A. In addition, the second pixel P2, the fourth pixel P4, the tenth pixel P10, and the twelfth pixel P12 comprise the second polarization filter element 122B. In addition, the fifth pixel P5, the seventh pixel P7, the thirteenth pixel P13, and the fifteenth pixel P15 comprise the third polarization filter element 122C. In addition, the sixth pixel P6, the eighth pixel P8, the fourteenth pixel P14, and the sixteenth pixel P16 comprise the fourth polarization filter element 122D.

The spectral filter element array layer 130 comprises four types of the spectral filter elements (first spectral filter element 132A, second spectral filter element 132B, third spectral filter element 132C, fourth spectral filter element 132D) having different transmission wavelength characteristics.

Figure 50:
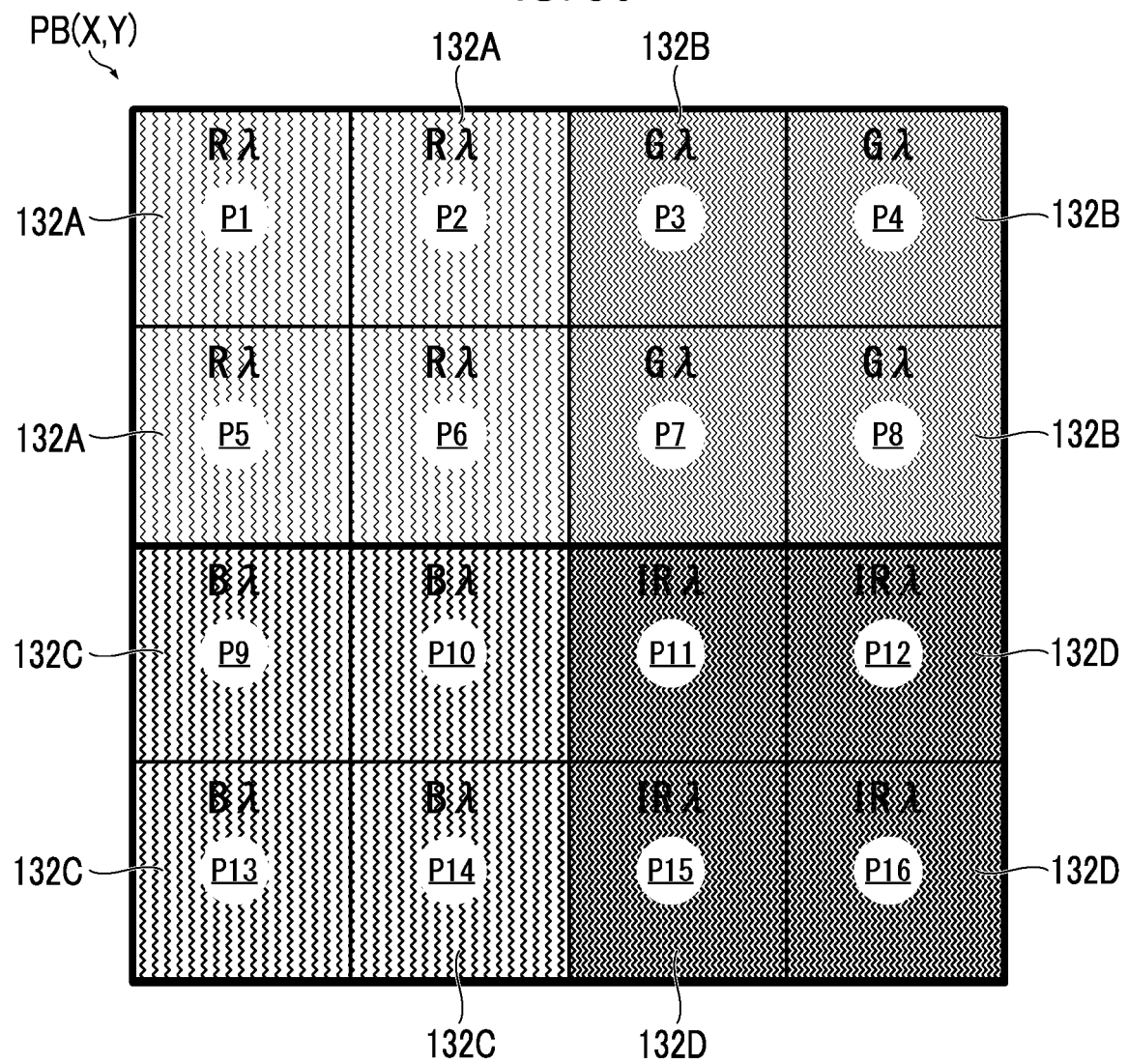
FIG. 50 is a diagram showing an example of an arrangement pattern of the spectral filter elements provided in each pixel block.

FIG. 50 is a diagram showing an example of the arrangement pattern of the spectral filter elements provided in each pixel block.

As shown in FIG. 50, the first pixel P1, the second pixel P2, the fifth pixel P5, and the sixth pixel P6 comprise the first spectral filter element 132A. In addition, the third pixel P3, the fourth pixel P4, the seventh pixel P7, and the eighth pixel P8 comprise the second spectral filter element 132B. In addition, the ninth pixel P9, the tenth pixel P10, the thirteenth pixel P13, and the fourteenth pixel P14 comprise the third spectral filter element 132C. In addition, the eleventh pixel P11, the twelfth pixel P12, the fifteenth pixel P15, and the sixteenth pixel P16 comprise the fourth spectral filter element 132D.

As an example, in the imaging apparatus according to the present embodiment, the first spectral filter element 132A is configured by the spectral filter element which transmits the light beam of the red (R) wavelength range Rλ. The second spectral filter element 132B is configured by the spectral filter element which transmits the light beam of the green (G) wavelength range Gk. The third spectral filter element 132C is configured by the spectral filter element which transmits the light beam of the blue (B) wavelength range Bk. The fourth spectral filter element 132D is configured by the spectral filter element which transmits the light beam of the infrared (IR) wavelength range IRK.

The four types of the wavelength ranges Rλ1, Gλ1, Bλ1, and IRλ1 transmitted through the first bandpass filter 16B1 are set within ranges of the transmission wavelength range Rλ of the first spectral filter element 132A, the transmission wavelength range Gλ of the second spectral filter element 132B, the transmission wavelength range Bλ of the third spectral filter element 132C, the transmission wavelength range IRλ of the fourth spectral filter element 132D, respectively. That is, the wavelength range Rλ1 is set within the range of the transmission wavelength range Rλ of the first spectral filter element 132A. In addition, the wavelength range Gλ1 is set within the range of the transmission wavelength range Gλ of the second spectral filter element 132B. In addition, the wavelength range Bλ1 is set within the range of the transmission wavelength range Bλ of the third spectral filter element 132C. In addition, the wavelength range IRλ1 is set within the range of the transmission wavelength range IRλ of the fourth spectral filter element 132D.

In addition, the four types of the wavelength ranges Rλ2, Gλ2, Bλ2, and IRλ2 transmitted through the second bandpass filter 16B2 are set within ranges of the transmission wavelength range Rλ of the first spectral filter element 132A, the transmission wavelength range Gλ of the second spectral filter element 132B, the transmission wavelength range Bλ of the third spectral filter element 132C, the transmission wavelength range IRλ of the fourth spectral filter element 132D, respectively. That is, the wavelength range Rλ2 is set within the range of the transmission wavelength range Rλ of the first spectral filter element 132A. In addition, the wavelength range Gλ2 is set within the range of the transmission wavelength range Gλ of the second spectral filter element 132B. In addition, the wavelength range Bλ2 is set within the range of the transmission wavelength range Bλ, of the third spectral filter element 132C. In addition, the wavelength range IRλ2 is set within the range of the transmission wavelength range IRλ of the fourth spectral filter element 132D.

In addition, the four types of the wavelength ranges Rλ3, Gλ3, Bλ3, and IRλ3 transmitted through the third bandpass filter 16B3 are set within ranges of the transmission wavelength range Rλ of the first spectral filter element 132A, the transmission wavelength range Gλ of the second spectral filter element 132B, the transmission wavelength range Bλ of the third spectral filter element 132C, the transmission wavelength range IRλ of the fourth spectral filter element 132D, respectively. That is, the wavelength range Rλ3 is set within the range of the transmission wavelength range Rλ of the first spectral filter element 132A. In addition, the wavelength range Gλ3 is set within the range of the transmission wavelength range Gλ of the second spectral filter element 132B. In addition, the wavelength range Bλ3 is set within the range of the transmission wavelength range Bλ, of the third spectral filter element 132C. In addition, the wavelength range IRλ3 is set within the range of the transmission wavelength range IRλ of the fourth spectral filter element 132D.

In the image sensor 100 configured as described above, in each pixel block PB (X, Y), each of the pixels P1 to P16 receives the light beam from the imaging optical system 10 as follows. That is, the first pixel P1 receives the light beams from the imaging optical system 10 via the first spectral filter element 132A and the first polarization filter element 122A. The second pixel P2 receives the light beams from the imaging optical system 10 via the first spectral filter element 132A and the second polarization filter element 122B. The third pixel P3 receives the light beams from the imaging optical system 10 via the second spectral filter element 132B and the first polarization filter element 122A. The fourth pixel P4 receives the light beams from the imaging optical system 10 via the second spectral filter element 132B and the second polarization filter element 122B. The fifth pixel P5 receives the light beams from the imaging optical system 10 via the first spectral filter element 132A and the third polarization filter element 122C. The sixth pixel P6 receives the light beams from the imaging optical system 10 via the first spectral filter element 132A and the fourth polarization filter element 122D. The seventh pixel P7 receives the light beams from the imaging optical system 10 via the second spectral filter element 132B and the third polarization filter element 122C. The eighth pixel P8 receives the light beams from the imaging optical system 10 via the second spectral filter element 132B and the fourth polarization filter element 122D. The ninth pixel P9 receives the light beams from the imaging optical system 10 via the third spectral filter element 132C and the first polarization filter element 122A. The tenth pixel P10 receives the light beams from the imaging optical system 10 via the third spectral filter element 132C and the second polarization filter element 122B. The eleventh pixel P11 receives the light beams from the imaging optical system 10 via the fourth spectral filter element 132D and the first polarization filter element 122A. The twelfth pixel P12 receives the light beams from the imaging optical system 10 via the fourth spectral filter element 132D and the second polarization filter element 122B. The thirteenth pixel P13 receives the light beams from the imaging optical system 10 via the third spectral filter element 132C and the third polarization filter element 122C. The fourteenth pixel P14 receives the light beams from the imaging optical system 10 via the third spectral filter element 132C and the fourth polarization filter element 122D. The fifteenth pixel P15 receives the light beams from the imaging optical system 10 via the fourth spectral filter element 132D and the third polarization filter element 122C. The sixteenth pixel P16 receives the light beams from the imaging optical system 10 via the fourth spectral filter element 132D and the fourth polarization filter element 122D.

[Signal Processing Unit]

The signal processing unit 200 processes the signals output from the image sensor 100 to generate the image signals of the multispectral image of twelve bands. That is, the image signals of twelve types of the wavelength ranges $R\lambda 1$, $G\lambda 1$, $B\lambda 1$, $IR\lambda 1$, $R\lambda 2$, $G\lambda 2$, $B\lambda 2$, $IR\lambda 2$, $R\lambda 3$, $G\lambda 3$, $B\lambda 3$, and $IR\lambda 3$ which are transmitted through the bandpass filter unit 16 of the imaging optical system are generated. The signal processing unit 200 is the same as the signal processing unit 200 according to the first embodiment in that it performs the predetermined interference removal processing to generate the image signal of each wavelength range.

[Action of Imaging Apparatus]

Figure 51:
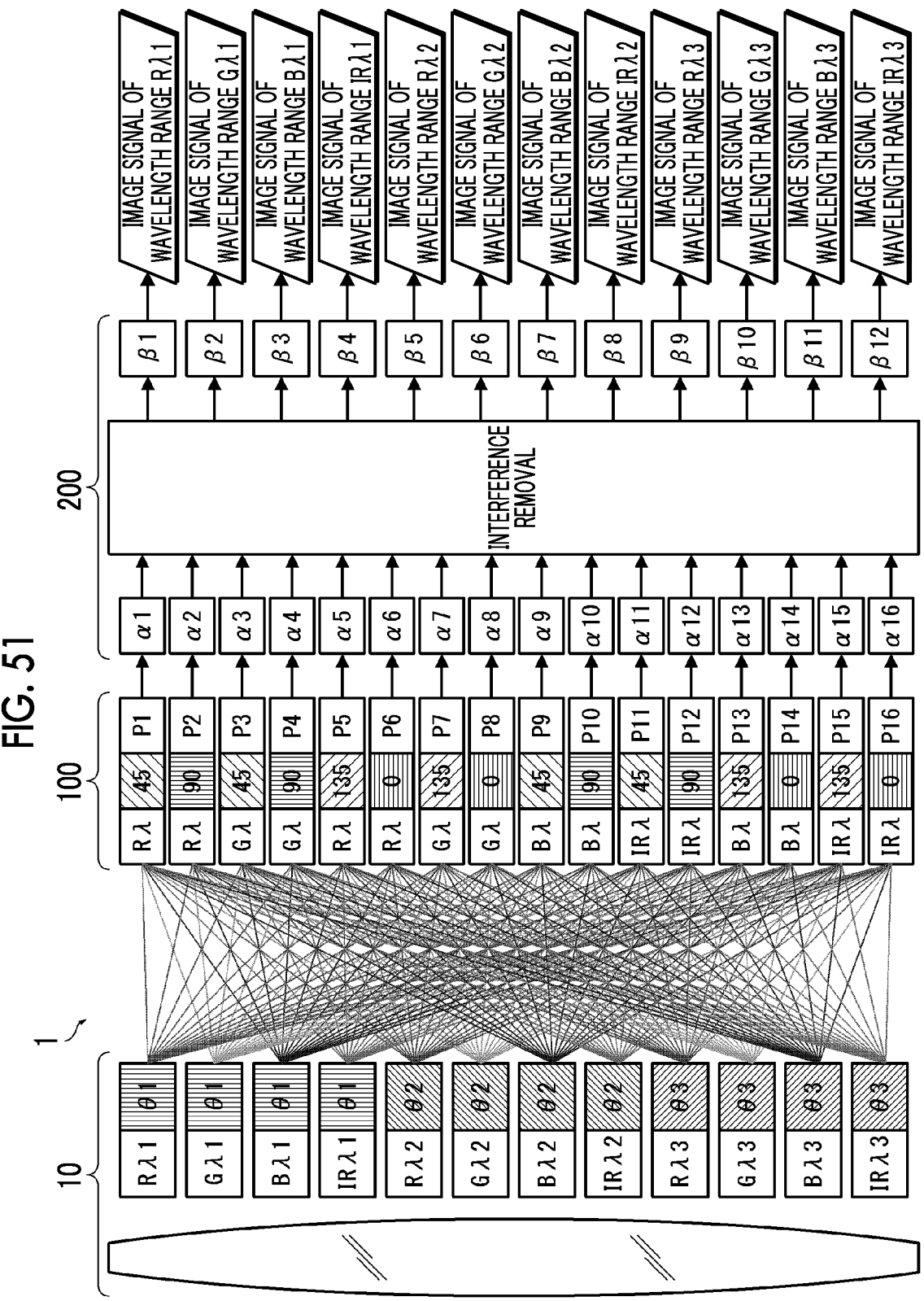
FIG. 51 is a conceptual diagram of an operation of the imaging apparatus according to the seventh embodiment.

FIG. 51 is a conceptual diagram of an operation of the imaging apparatus according to the present embodiment.

The light beams incident on the imaging optical system 10 become twelve types of the light beams having different characteristics, which are incident on the image sensor 100. Specifically, the light beams become the light beam, which is the light beam of the polarization direction $\theta 1$, having the wavelength range $R\lambda 1$ (first light beam), the light beam, which is the light beam of the polarization direction $\theta 1$, having the wavelength range $G\lambda 1$ (second light beam), the light beam, which is the light beam of the polarization direction $\theta 1$, having the wavelength range $B\lambda 1$ (third light beam), the light beam, which is the light beam of the polarization direction $\theta 1$, having the wavelength range $IR\lambda 1$ (fourth light beam), the light beam, which is the light beam of the polarization direction $\theta 2$, having the wavelength range $R\lambda 2$ (fifth light beam), the light beam, which is the light beam of the polarization direction $\theta 2$, having the wavelength range $G\lambda 2$ (sixth light beam), the light beam, which is the light beam of the polarization direction $\theta 2$, having the wavelength range $B\lambda 2$ (seventh light beam), the light beam, which is the light beam of the polarization direction $\theta 2$, having the wavelength range $IR\lambda 2$ (eighth light beam), the light beam, which is the light beam of the polarization direction $\theta 3$, having the wavelength range $R\lambda 3$ (ninth light beam), the light beam, which is the light beam of the polarization direction $\theta 3$, having the wavelength range $G\lambda 3$ (tenth light beam), the light beam, which is the light beam of the polarization direction $\theta 3$, having the wavelength range $B\lambda 3$ (eleventh light beam), and the light beam, which is the light beam of the polarization direction $\theta 3$, having the wavelength range $IR\lambda 3$ (twelfth light beam), which are incident on the image sensor 100.

In each pixel block PB (X, Y) of the image sensor 100, the light beams (first light beam to twelfth light beam) emitted from the imaging optical system 10 are received in each of the pixels P1 to P16 at a predetermined ratio.

The signal processing unit 200 calculates the pixel signals $\beta 1$ to $\beta 12$ corresponding to the light beams of the wavelength ranges $R\lambda 1$, $G\lambda 1$, $B\lambda 1$, $IR\lambda 1$, $R\lambda 2$, $G\lambda 2$, $B\lambda 2$, $IR\lambda 2$, $R\lambda 3$, $G\lambda 3$, $B\lambda 3$, and $IR\lambda 3$ from the pixel signals $\alpha 1$ to $\alpha 16$ obtained from the pixels P1 to P16 of each pixel block PB (X, Y) of the image sensor 100, and generates the image signals of the wavelength ranges $R\lambda 1$, $G\lambda 1$, $B\lambda 1$, $IR\lambda 1$, $R\lambda 2$, $G\lambda 2$, $B\lambda 2$, $IR\lambda 2$, $R\lambda 3$, $G\lambda 3$, $B\lambda 3$, and $IR\lambda 3$.

In this way, with the imaging apparatus according to the present embodiment, the multispectral image of twelve bands can be captured by using one imaging optical system 10 and one image sensor 100.

[Imaging Apparatus Capturing Multispectral Image of N Bands]

As described above, according to the present invention, it is possible to capture the multispectral image of four bands or more. Here, the type of the polarization filter element provided in the image sensor is assumed to n type ($n \geq 2$) and the type of the spectral filter element is assumed to m type ($m \geq 2$). n means the number of transmission polarization directions of the image sensor by the polarization filter element, and m means the number of transmission wavelength ranges of the image sensor by the spectral filter element.

The number of bands of the multispectral image captured by the imaging apparatus is assumed to N. The imaging apparatus according to the embodiment of the present invention can capture the multispectral image of $N=m \times n$ bands at maximum. In this case, in the image sensor, one pixel block is configured by $m \times n$ pixels having different combinations of the polarization filter element and the spectral filter element.

The type of the wavelength range emitted from the imaging optical system (including a case of separation in combination with the spectral filter element) is assumed to k type. That is, the number of transmission wavelength ranges of the imaging optical system is assumed to k. Since the imaging apparatus according to the embodiment of the present invention can capture the multispectral image of $n \times m$ bands at maximum, $k \leq m \times n$ is satisfied. The imaging optical system and the image sensor are set to satisfy $k \leq m \times n$. Specifically, in the imaging optical system, the aperture region is set and the wavelength range and the polarization direction of the light beam transmitted through each aperture region are set such that $k \leq m \times n$ is satisfied. In addition, in the image sensor, one pixel block is set and the combination of the polarization filter element and the spectral filter element of the pixels configuring each pixel block are set such that $k \leq m \times n$ is satisfied.

Note that the number of transmission wavelength ranges k of the imaging optical system is counted within the wavelength range having the sensitivity in both the spectral filter element and the image sensor. That is, for example, even in a case of a configuration in which the imaging optical system transmits the light beams of the four wavelength ranges λ1 to λ4, in a case in which the image sensor does not have the sensitivity for the light beam of the wavelength range λ4, the number of the transmission wavelength range is substantially k=3. Similarly, also in a case in which the spectral filter element does not have the sensitivity for the light beam of the wavelength range λ4 (a case in which the light beam of the wavelength range λ4 is not substantially transmitted), the number of transmission wavelength ranges is substantially k=3. Therefore, in a case of capturing the multispectral image of four bands or more, the band to be captured within the wavelength range having the sensitivity by both the spectral filter element (third optical element) and the image sensor, that is, the transmission wavelength range of the imaging optical system (transmission wavelength range of the first optical element) is set.

Here, a case will be considered in which the type of the polarization filter element provided in the image sensor is assumed to n type, the type of the spectral filter element is assumed to m type, n×m=q is satisfied, and one pixel block is configured by q pixels. In this case, q pixel signals α1, α2, aq are output from each pixel block of the image sensor. In a case in which the imaging optical system emits the light beams of k wavelength ranges, the arithmetic equation for calculating k pixel signals β1, β2, ..., βk corresponding to the light beams of the wavelength ranges from the q pixel signals α1, α2, ..., αq is defined as follows using the matrix A.

$$A = \begin{bmatrix} a11 & a12 & \ldots & a1q \\ a21 & a22 & \ldots & a2q \\ \vdots & \vdots & \vdots & \vdots \\ ak1 & ak2 & \ldots & akq \end{bmatrix}$$

$$\begin{bmatrix} \beta 1 \\ \beta 2 \\ \vdots \\ \beta k \end{bmatrix} = \begin{bmatrix} a11 & a12 & \ldots & a1q \\ a21 & a22 & \ldots & a2q \\ \vdots & \vdots & \vdots & \vdots \\ ak1 & ak2 & \ldots & akq \end{bmatrix} * \begin{bmatrix} \alpha 1 \\ \alpha 2 \\ \vdots \\ \alpha q \end{bmatrix}$$

As described above, the matrix A is the inverse matrix $B^{-1}$ of the matrix B having, as an element, a ratio of the light beam of the wavelength range received by each pixel of each pixel block.

Note that it is preferable that the imaging optical system have a configuration in which at least one of the aperture regions of the bandpass filter unit transmits the light beams of a plurality of types of the wavelength ranges. That is, a configuration is adopted in which the bandpass filter (multi-bandpass filter) which transmits the light beams of a plurality of types of wavelength ranges is provided in at least one of the aperture regions. As a result, an aperture area can be increased and the sensitivity can be improved. In this case, the number of wavelength ranges transmitted through one aperture region (the number of transmission wavelength ranges) is the number of types of the spectral filter elements provided in the image sensor, at maximum. Note that the type of the spectral filter element provided in the image sensor means the number of transmission wavelength ranges of the spectral filter element in the image sensor, the number of transmission wavelength ranges possessed by at least one of the aperture regions of the bandpass filter unit can be set to be equal to or less than the number of transmission wavelength ranges of the spectral filter element.

Eighth Embodiment

In a case in which the imaging optical system comprises a set of the bandpass filters having the same transmission wavelength characteristics, the image is shifted in a case in which the focus is shifted. The focus can be more easily detected by using this property. Hereinafter, the imaging apparatus that can more easily detect the focus will be described. Note that the configuration other than the bandpass filter unit is the same as that of the imaging apparatus according to the first embodiment. Therefore, here, only the configuration of the bandpass filter unit will be described.

Figure 52:
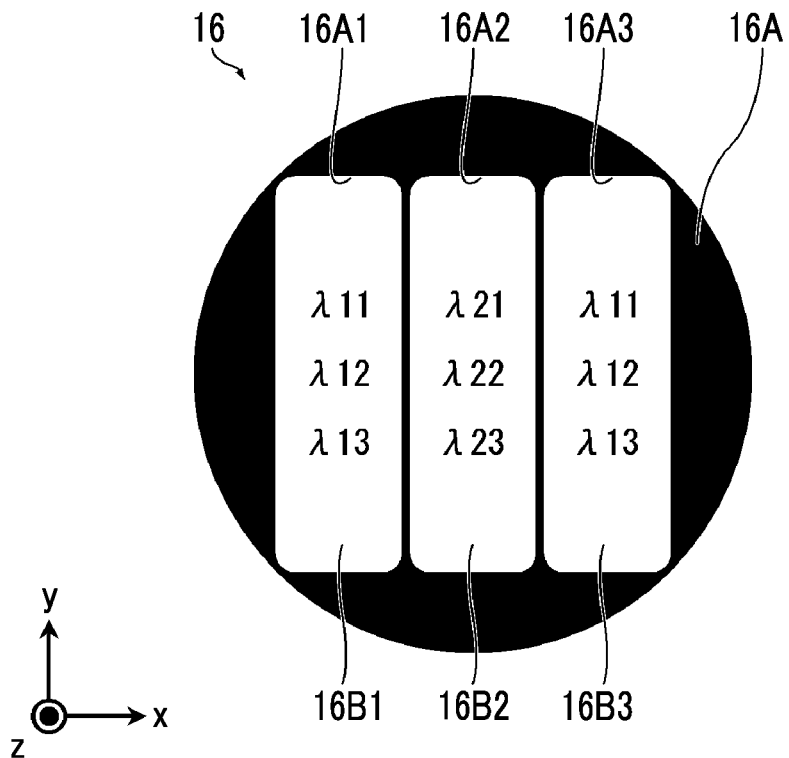
FIG. 52 is a front view showing an example of the bandpass filter unit according to an eighth embodiment.

FIG. 52 is a front view showing an example of the bandpass filter unit according to the present embodiment.

As shown in FIG. 52, the bandpass filter unit 16 according to the present embodiment has three aperture regions (first aperture region 16A1, second aperture region 16A2, and third aperture region 16A3) in the frame 16A. The three aperture regions 16A1 to 16A3 have the same aperture shape, and the first aperture region 16A1 and the third aperture region 16A3 are disposed symmetrically with the second aperture region 16A2 interposed therebetween.

The bandpass filters (first bandpass filter 16B1, second bandpass filter 16B2, third bandpass filter 16B3) are provided in the aperture regions 16A1 to 16A3. The first bandpass filter 16B1 and the third bandpass filter 16B3 have the same transmission wavelength characteristics and transmit the light beams of the wavelength ranges λ11, λ12, and λ13. On the other hand, the second bandpass filter 16B2 has different transmission wavelength characteristics from the first bandpass filter 16B1 and the third bandpass filter 16B3, and transmits the light beams of the wavelength ranges λ21, λ22, and λ23.

With the imaging apparatus comprising the bandpass filter unit 16 according to the present embodiment, since the image is shifted in a case in which the focus is shifted, the focus can be more easily detected for the image of the wavelength ranges λ11, λ12, and λ13 passing through the first aperture region 16A1 and the image of the wavelength ranges λ11, λ12, and λ13 passing through the third aperture region 16A3.

Figure 53:
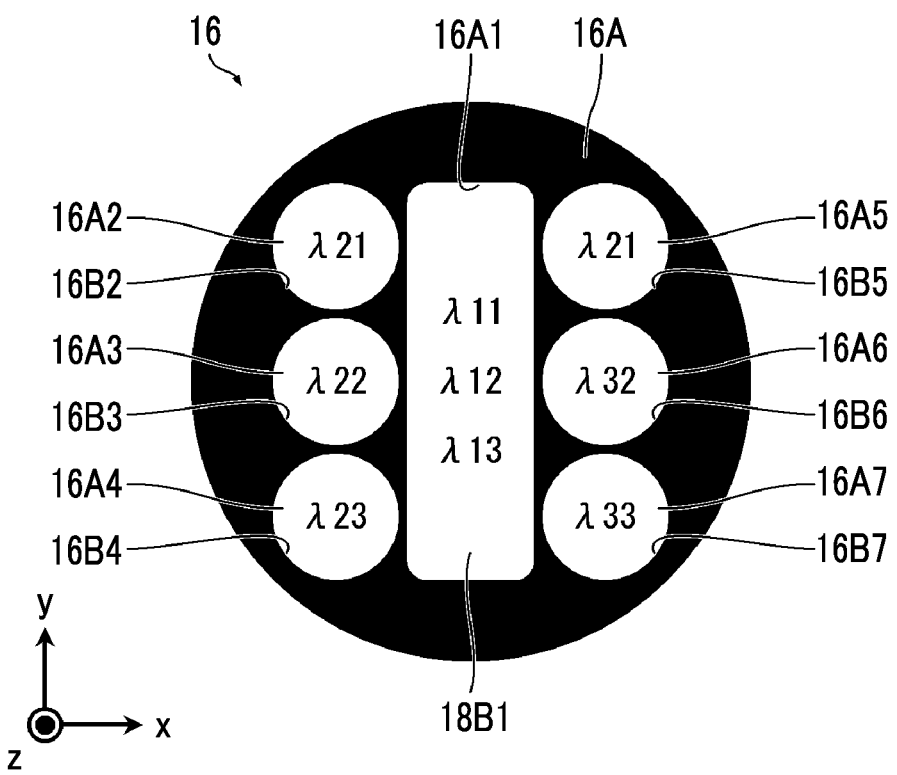
FIG. 53 is a front view showing another example of the bandpass filter unit according to the eighth embodiment.

FIG. 53 is a front view showing another example of the bandpass filter unit according to the present embodiment.

As shown in FIG. 53, the bandpass filter unit 16 according to the present embodiment has seven aperture regions (first aperture region 16A1, second aperture region 16A2, third aperture region 16A3, fourth aperture region 16A4, fifth aperture region 16A5, sixth aperture region 16A6, and seventh aperture region 16A7) in the frame 16A. The seven aperture regions 16A1 to 16A7 have the same aperture shape, excluding the first aperture region 16A1, and are disposed symmetrically with the first aperture region 16A1 interposed therebetween.

The bandpass filters (first bandpass filter 16B1, second bandpass filter 16B2, third bandpass filter 16B3, fourth bandpass filter 16B4, fifth bandpass filter 16B5, sixth bandpass filter 16B6, and seventh bandpass filter 16B7) are provided in the aperture regions 16A1 to 16A7. The first bandpass filter 16B1 is configured by the multi-bandpass filters, which transmit the light beams of three types of the wavelength ranges (λ11, λ12, and λ13). The other bandpass filters 16B2 to 16B7 are configured by the bandpass filters which transmit the light beam of one type of the wavelength range, and transmit the light beams of wavelength ranges different from each other, excluding the second bandpass filter 16B2 and the fifth bandpass filter 16B5. The second bandpass filter 16B2 and the fifth bandpass filter 16B5 have the same transmission wavelength characteristics and transmit the light beam of the wavelength range λ21.

With the imaging apparatus comprising the bandpass filter unit 16 according to the present embodiment, since the image is shifted in a case in which the focus is shifted, the focus can be more easily detected for the image of the wavelength range λ21 passing through the second aperture region 16A2 and the image of the wavelength range λ21 passing through the fifth aperture region 16A5.

Ninth Embodiment

In each of the embodiments described above, the aperture shape of the aperture region provided in the bandpass filter unit and the polarization filter unit is a circular shape or a rectangular shape, but the aperture shape of the aperture region is not limited to this.

FIG. 54 is a front view showing an example of the bandpass filter unit. FIG. 55 is a front view showing an example of the polarization filter unit.

As shown in FIGS. 54 and 55, the bandpass filter unit 16 and the polarization filter unit 18 according to the present embodiment have central aperture regions 16a1 and 18a1, and a plurality of outer peripheral aperture regions 16a2, 16a3, 16a4, 16a5, 16a6, 16a7, 18a2, 18a3, 18a4, 18a5, 18a6, and 18a7, which are disposed around the central aperture regions 16a1 and 18a1. The central aperture regions 18a1 and 16a1 are disposed on the optical axis of the imaging optical system as the regions having a circular aperture shape. The outer peripheral aperture regions 16a2, 16a3, 16a4, 16a5, 16a6, 16a7, 18a2, 18a3, 18a4, 18a5, 18a6, and 18a7 are disposed around the central aperture regions 16a1 and 18a1 at regular intervals along a circumferential direction, as the regions having a fan-shaped aperture shape.

The bandpass filters (16b1, 16b2, 16b3, 16b4, 16b5, 16b6, and 16b7) having predetermined wavelength transmission characteristics are provided in the aperture regions (central aperture region 16a1 and outer peripheral aperture region 16a2, 16a3, 16a4, 16a5, 16a6, and 16a7) of the bandpass filter unit 16. Specifically, the bandpass filter (multi-bandpass filter) 16b1 which transmits the light beams of three types of the wavelength ranges λ11, λ12, and λ13 is provided in the central aperture region 16a1. The bandpass filter 16b2 which transmits the light beam of one type of the wavelength range λ31 is provided in the outer peripheral aperture region 16a2. The bandpass filter 16b3 which transmits the light beam of one type of the wavelength range λ22 is provided in the outer peripheral aperture region 16a3. The bandpass filter 16b4 which transmits the light beam of one type of the wavelength range λ32 is provided in the outer peripheral aperture region 16a4. The bandpass filter 16b5 which transmits the light beam of one type of the wavelength range λ23 is provided in the outer peripheral aperture region 16a5. The bandpass filter 16b6 which transmits the light beam of one type of the wavelength range λ33 is provided in the outer peripheral aperture region 16a6. The bandpass filter 16b7 which transmits the light beam of one type of the wavelength range λ21 is provided in the outer peripheral aperture region 16a7.

The polarization filters (18b1, 18b2, and 18b3) are provided in the aperture regions (central aperture region 18a1 and outer peripheral aperture region 18a2, 18a3, 18a4, 18a5, 18a6, and 18a7) of the polarization filter unit 18. Specifically, the polarization filter 18b1 which transmits the light beam of the polarization direction θ1 is provided in the central aperture region 18a1. The polarization filter 18b3 which transmits the light beam of the polarization direction θ2 is provided in the outer peripheral aperture regions 18a2, 18a4, and 18a6. The polarization filter 18b2 which transmits the light beam of the polarization direction θ3 is provided in the outer peripheral aperture regions 18a3, 18a5, and 18a7.

Generally, in the lens, the aberration is smaller and an image quality is higher as the lens is closer to the center (optical axis). Therefore, by setting the transmission wavelength range of each region in response to the required image quality, the image quality of the obtained image can be controlled for each wavelength range. For example, for the wavelength range that requires high image quality, the image quality can be controlled for each wavelength range by the allocation to the central aperture region.

For the setting of the aperture region (aspect of splitting the pupil region), various aspects, such as an aspect of splitting concentrically, an aspect of splitting along the circumferential direction, and an aspect of splitting in a grid, can be adopted. In addition, the sizes (areas) of the aperture regions do not have to be the same, and may be different for each aperture region.

Other Embodiments

[Configuration of Imaging Optical System]
In the embodiments described above, the configuration has been adopted in which the bandpass filter unit and the polarization filter unit are configured by optical elements, respectively, but a configuration can be adopted in which the bandpass filter unit and the polarization filter unit are configured by one optical element having the functions of the bandpass filter unit and the polarization filter unit. For example, a configuration can be adopted in which the bandpass filter and the polarization filter are held in one frame.

[Configuration of Image Sensor]
The arrangement of the pixels configuring one pixel block is not limited to that of each of the embodiments described above. The arrangement of the pixels can be appropriately changed in response to the number of pixels configuring one pixel block and the like.

In addition, in the embodiments described above, the configuration has been adopted in which the polarization filter element and the spectral filter element are disposed between the photodiode and the micro lens, but a configuration can be adopted in which one or both of the polarization filter element and the spectral filter element are disposed in front of the micro lens (subject side). Note that by disposing the polarization filter element and the spectral filter element between the micro lens and the photodiode, it is possible to effectively prevent the light beams from being mixed into adjacent pixels. As a result, the interference can be further prevented.

[Interference Removal Processing in Signal Processing Unit]
The signal processing unit can also generate the image signal in each wavelength range without performing the interference removal processing. For example, as described above, depending on the combination of the transmission polarization direction of the polarization filter provided in the imaging optical system and the transmission polarization direction of the polarization filter element provided in the image sensor, the light beam of each wavelength range can be received without causing the interference. Therefore, in such a case, the image signal of each wavelength range can be generated without performing the interference removal processing. In addition, even in a case in which the interference occurs, in a case in which the influence is small or in a case in which a user recognizes the influence to be acceptable, it is possible to generate the image signal in each wavelength range without performing the interference removal processing.

[Configuration of Signal Processing Unit]

The function of the image generation unit 200B (arithmetic unit) in the signal processing unit 200 can be realized by using various processors. The various processors include, for example, a central processing unit (CPU), which is a general-purpose processor that executes software (program) to realize various functions. In addition, the various processors described above also include a graphics processing unit (GPU), which is a processor specialized in the image processing and a programmable logic device (PLD), which is a processor of which a circuit configuration can be changed after manufacturing such as a Field Programmable Gate Array (FPGA). Further, the various processors described above also include a dedicated electric circuit, which is a processor having a circuit configuration specially designed for executing specific processing, such as an application specific integrated circuit (ASIC).

The functions of the units may be realized by one processor, or may be realized by a plurality of processors of the same type or different types (for example, a plurality of FPGAs, or a combination of the CPU and the FPGA, or a combination of the CPU and the GPU). In addition, a plurality of the functions may be realized by one processor. As an example of configuring a plurality of functions with one processor, first, as represented by a computer such as a server, there is a form in which one processor is configured by a combination of one or more CPUs and software, and the processor realizes a plurality of functions. Second, as represented by a system on chip (SoC), there is a form in which a processor is used in which the functions of the entire system are realized by a single integrated circuit (IC) chip. In this way, the various functions are configured by one or more of the above various processors as a hardware structure. Further, the hardware structure of these various processors is, more specifically, an electric circuit (circuitry) in which the circuit elements such as semiconductor elements are combined. These electric circuits may be electric circuits that realize the functions described above by using logical sum, logical product, logical denial, exclusive logical sum, and logical operations combining the above.

In a case in which the processor described above or the electric circuit executes software (program), the processor (computer) readable code of the software to be executed is stored in a non-transitory recording medium such as a read only memory (ROM), and the processor refers to the software. The software stored in the non-transitory recording medium includes a program for executing image input, analysis, display control, and the like. The code may be recorded on the non-transitory recording medium such as various optical magnetic recording devices, a semiconductor memory, and the like, instead of the ROM. In a case of processing using the software, for example, a random access memory (RAM) can be used as a transitory storage region, and for example, refer to data stored in an electronically erasable and programmable read only memory (EEPROM) (not shown).

The coefficient storage unit 200C of the signal processing unit 200 can be realized by, for example, a memory such as the read-only memory (ROM), the electrically erasable programmable read-only memory (EEPROM), and the like.

[Configuration of Imaging Apparatus]

The imaging apparatus can also be configured as an interchangeable lens type imaging apparatus in which the imaging optical system can be exchanged. In this case, since the matrix A is uniquely determined for each lens (imaging optical system), the matrix A is prepared for each lens, and the coefficient group thereof is stored in the coefficient storage unit. In a case in which the lens is exchanged, the coefficient group of the matrix A corresponding to the exchanged lenses is read out from the coefficient storage unit, the arithmetic processing is executed, and each image is generated.

EXPLANATION OF REFERENCES

1: imaging apparatus
10: imaging optical system
12: lens
16: bandpass filter unit
16A: frame
16A1: first aperture region
16A2: second aperture region
16A3: third aperture region
16A4: fourth aperture region
16A5: fifth aperture region
16A6: sixth aperture region
16A7: seventh aperture region
16B1: first bandpass filter
16B2: second bandpass filter
16B3: third bandpass filter
16B4: fourth bandpass filter
16B5: fifth bandpass filter
16B6: sixth bandpass filter
16B7: seventh bandpass filter
16a1: central aperture region
16a2: outer peripheral aperture region
16a3: outer peripheral aperture region
16a4: outer peripheral aperture region
16a5: outer peripheral aperture region
16a6: outer peripheral aperture region
16a7: outer peripheral aperture region
16b2: bandpass filter
16b3: bandpass filter
16b4: bandpass filter
16b5: bandpass filter
16b6: bandpass filter
16b7: bandpass filter
18: polarization filter unit
18A: frame
18A1: first aperture region
18A2: second aperture region
18A3: third aperture region
18B1: first polarization filter
18B2: second polarization filter
18B3: third polarization filter
18a1: central aperture region
18a2: outer peripheral aperture region
18a3: outer peripheral aperture region
18a4: outer peripheral aperture region
18a5: outer peripheral aperture region
18a6: outer peripheral aperture region
18a7: outer peripheral aperture region
18b1: polarization filter
18b2: polarization filter
18b3: polarization filter 22: wavelength range
32B: spectral filter element
100: image sensor
110: pixel array layer
112: photodiode
120: polarization filter element array layer
122A: first polarization filter element
122B: second polarization filter element
122C: third polarization filter element
122D: fourth polarization filter element
130: spectral filter element array layer
132A: first spectral filter element
132B: second spectral filter element
132C: third spectral filter element
132D: fourth spectral filter element
140: micro lens array layer
142: micro lens
200: signal processing unit
200A: analog signal processing unit
200B: image generation unit
200C: coefficient storage unit
P1: first pixel
P2: second pixel
P3: third pixel
P4: fourth pixel
P5: fifth pixel
P6: sixth pixel
P7: seventh pixel
P8: eighth pixel
P9: ninth pixel
P10: tenth pixel
P11: eleventh pixel
P12: twelfth pixel
P13: thirteenth pixel
P14: fourteenth pixel
P15: fifteenth pixel
P16: sixteenth pixel
PB (X, Y): pixel block

What is claimed is:

1. An imaging apparatus comprising:
an imaging optical system including a first optical element having a plurality of aperture regions of which at least one transmits light beams of a plurality of types of wavelength ranges, and a second optical element that polarizes the light beams transmitted through the first optical element in a plurality of directions, in a vicinity of a pupil of the imaging optical system;
an image sensor that receives the light beams transmitted through the imaging optical system, the image sensor receiving light beams transmitted through a plurality of types of third optical elements having different transmission wavelength ranges and a plurality of types of fourth optical elements having different transmission polarization directions; and
a signal processing unit that processes signals output from the image sensor to generate a plurality of image signals,
wherein the number of transmission wavelength ranges of at least one of the aperture regions of the first optical element is equal to or less than the number of transmission wavelength ranges of the third optical element.

2. The imaging apparatus according to claim 1, wherein all of the aperture regions of the first optical element transmits light beams of the plurality of types of wavelength ranges.

3. The imaging apparatus according to claim 1, wherein at least one of the aperture regions of the first optical element transmits a light beam of one type of a wavelength range.

4. The imaging apparatus according to claim 1, wherein the second optical element allows a part of the light beams transmitted through the first optical element to pass as an unpolarized light beam.

5. The imaging apparatus according to claim 1, wherein the number of aperture regions provided in the first optical element is equal to or less than the number of transmission polarization directions of the fourth optical element, and
all of the aperture regions have the same number of transmission wavelength ranges as the number of transmission wavelength ranges of the third optical element.

6. The imaging apparatus according to claim 1, wherein at least one of the aperture regions of the first optical element has a transmission wavelength range that partially overlaps with a plurality of the wavelength ranges of the third optical element.

7. The imaging apparatus according to claim 1, wherein in a case in which the number of transmission wavelength ranges of the imaging optical system is defined as k, the number of transmission wavelength ranges of the third optical element is defined as m, and the number of transmission polarization directions of the fourth optical element is defined as n, the imaging optical system and the image sensor satisfy a relationship of k≤m×n.

8. The imaging apparatus according to claim 1, wherein at least one set of the aperture regions of the first optical element transmits light beams of the same wavelength ranges.

9. The imaging apparatus according to claim 1, wherein at least one of the aperture regions of the first optical element is disposed on an optical axis.

10. The imaging apparatus according to claim 1, wherein the signal processing unit performs interference removal processing to generate the plurality of image signals.

* * * * *